United States Patent
Jang et al.

(10) Patent No.: US 12,218,876 B2
(45) Date of Patent: Feb. 4, 2025

(54) METHOD AND APPARATUS FOR SIMULTANEOUS ACTIVATION OF DOWNLINK CONTROL INFORMATION TRANSMISSION BEAM IN WIRELESS COMMUNICATION SYSTEM

(71) Applicant: Samsung Electronics Co., Ltd., Suwon-si (KR)

(72) Inventors: Youngrok Jang, Suwon-si (KR); Ameha Tsegaye Abebe, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 17/734,854

(22) Filed: May 2, 2022

(65) Prior Publication Data

US 2022/0385425 A1 Dec. 1, 2022

(30) Foreign Application Priority Data

May 4, 2021 (KR) .................. 10-2021-0058113

(51) Int. Cl.
*H04L 5/00* (2006.01)
*H04W 76/30* (2018.01)

(52) U.S. Cl.
CPC .......... *H04L 5/0051* (2013.01); *H04W 76/30* (2018.02)

(58) Field of Classification Search
CPC ..... H04L 5/0051; H04L 5/0023; H04L 5/001; H04L 5/0053; H04L 5/0098; H04W 76/30;

(Continued)

(56) References Cited

U.S. PATENT DOCUMENTS

2020/0153497 A1 5/2020 Tsai et al.
2021/0105860 A1 4/2021 Tsai et al.
(Continued)

FOREIGN PATENT DOCUMENTS

WO 2020/146737 A1 7/2020
WO 2021/066635 A1 4/2021

OTHER PUBLICATIONS

International Search Report and Written Opinion of the International Searching Authority dated Aug. 10, 2022 in connection with International Patent Application No. PCT/KR2022/006295, 9 pages.

(Continued)

*Primary Examiner* — Candal Elpenord

(57) ABSTRACT

The disclosure relates to a 5G or 6G communication system for supporting a higher data transmission rate. A method performed by a terminal in a wireless communication system is provided. The method may include: receiving, from a base station via MAC CE, information associated with activation of one or more TCI states, wherein the information associated with the activation of one or more TCI states indicates a first serving cell ID, a CORESET index, and one or more TCI state IDs; and in case that the first serving cell ID is included in a list of a plurality of serving cells that are configured to be simultaneously updated for a TCI relation with the MAC CE, activating the one or more TCI state IDs for the CORESET index of each of the first serving cell ID and at least one second serving cell ID included in the list.

14 Claims, 28 Drawing Sheets

(58) Field of Classification Search
CPC ... H04W 72/044; H04W 72/51; H04W 72/23; H04B 7/0617; H04B 7/024; H04B 7/0628
USPC .................................................. 370/329–330
See application file for complete search history.

(56) References Cited

U.S. PATENT DOCUMENTS

| | | |
|---|---|---|
| 2021/0119741 A1 | 4/2021 | Zhou et al. |
| 2021/0226688 A1* | 7/2021 | Khoshnevisan ...... H04L 5/0092 |
| 2022/0225370 A1 | 7/2022 | Park et al. |
| 2023/0140056 A1* | 5/2023 | Zhou ........................ H04L 5/001 370/330 |
| 2023/0370238 A1* | 11/2023 | Liu ...................... H04B 7/0639 |
| 2023/0379902 A1* | 11/2023 | Matsumura ........... H04W 16/28 |
| 2023/0392335 A1* | 12/2023 | Gempler ................. E02B 11/02 |
| 2024/0072981 A1* | 2/2024 | Zhu ....................... H04L 5/0094 |

OTHER PUBLICATIONS

Supplementary European Search Report dated Sep. 11, 2024, in connection with European Application No. 22799085.0, 5 pages.
Vivo, "Maintenance on multi beam related issues," R1-2102946, 3GPP TSG RAN WG1 #104b-c, e-Meeting, Apr. 12-20, 2021, 8 pages.

\* cited by examiner

RRC configured TCI states

MAC-CE activated TCI states for PDSCH

TCI state for PDSCH

MAC-CE structure

| CORESET Pool ID | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| $T_{(N-2) \times 8+7}$ | $T_{(N-2) \times 8+6}$ | $T_{(N-2) \times 8+5}$ | $T_{(N-2) \times 8+4}$ | $T_{(N-2) \times 8+3}$ | $T_{(N-2) \times 8+2}$ | $T_{(N-2) \times 8+1}$ | $T_{(N-2) \times 8}$ | Oct N |

METHOD AND APPARATUS FOR SIMULTANEOUS ACTIVATION OF DOWNLINK CONTROL INFORMATION TRANSMISSION BEAM IN WIRELESS COMMUNICATION SYSTEM

CROSS-REFERENCE TO RELATED APPLICATION

This application is based on and claims priority under 35 U.S.C. § 119 to Korean Patent Application No. 10-2021-0058113, filed on May 4, 2021, in the Korean Intellectual Property Office, the disclosure of which is incorporated by reference herein in its entirety.

BACKGROUND

1. Field

The disclosure relates to user equipment (UE) and base station (BS) operations in a wireless communication system. More particularly, the disclosure relates to a method of simultaneous activation of downlink control information transmission beams and an apparatus for performing the method in a network cooperative communication.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Embodiments of the disclosure provide an apparatus and method for effectively providing simultaneous activation of downlink control information transmission beams in a wireless communication system.

In accordance with an embodiment of the disclosure, a method performed by a terminal in a wireless communication system is provided. The method may comprise: receiving, from a base station via a medium access control (MAC) control element (CE), information associated with activation of one or more transmission configuration indication (TCI) states, wherein the information associated with the activation of one or more TCI states indicates a first serving cell identifier (ID), a control resource set (CORESET) index, and one or more TCI state IDs; and in case that the first serving cell ID is included in a list of a plurality of serving cells that are configured to be simultaneously updated for a TCI relation with the MAC CE, activating the one or more TCI state IDs for the CORESET index of each of the first serving cell ID and at least one second serving cell ID included in the list.

In accordance with an embodiment of the disclosure, a terminal in a wireless communication system is provided. The terminal may comprise: a transceiver; and at least one processor coupled to the transceiver and configured to: receive, from a base station via the transceiver, information associated with activation of one or more transmission configuration indication (TCI) states via a medium access control (MAC) control element (CE), wherein the information associated with the activation of one or more TCI states indicates a first serving cell identifier (ID), a control resource set (CORESET) index, and one or more TCI state IDs; and in case that the first serving cell ID is included in a list of a plurality of serving cells that are configured to be simultaneously updated for a TCI relation with the MAC CE, activate the one or more TCI state IDs for the CORESET index of each of the first serving cell ID and at least one second serving cell ID included in the list Additional aspects will be set forth in part in the description which follows and, in part, will be apparent from the description, or may be learned by practice of the presented embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
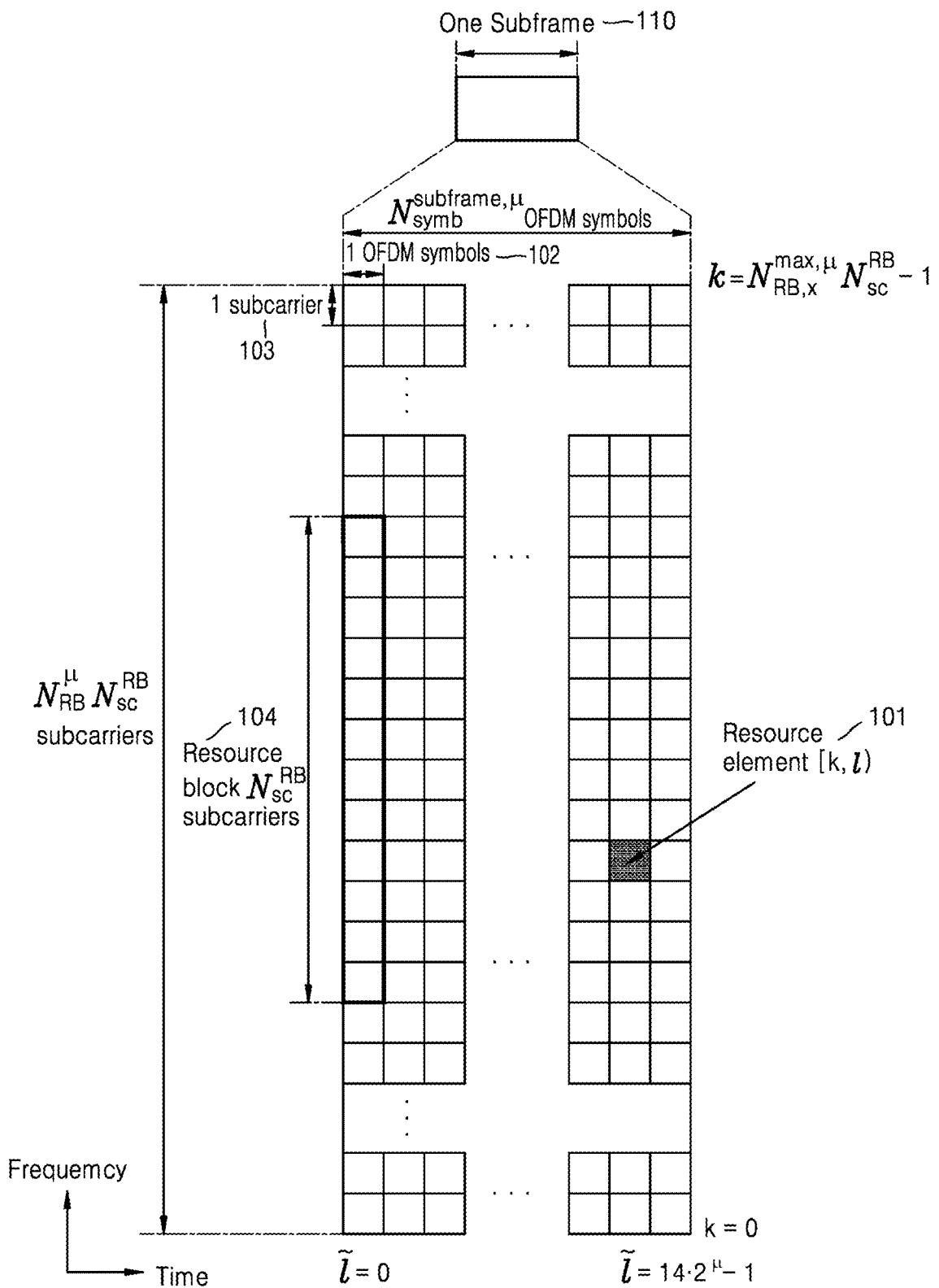
FIG. 1 illustrates a basic structure of a time-frequency domain in a wireless communication system, according to an embodiment of the disclosure.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In the following description, a base station is an entity for performing resource allocation for a terminal, and may be at least one of a gNB, an eNB, a Node B, a base station (BS), a radio access unit, a base station controller, or a network node. The terminal may include a UE, an MS, a cellular phone, a smart phone, a computer, or a multimedia system capable of performing a communication function. Herein, downlink (DL) refers to a radio transmission path for a signal transmitted from a BS to a UE, and uplink (UL) refers to a radio transmission path for a signal transmitted from a UE to a BS. Although the following embodiments will focus on the long term evolution (LTE) or LTE-Advanced (LTE-A) system as an example, they may be applied to other communication systems with similar technical backgrounds or channel types. For example, the 5th generation (5G) mobile communication technologies developed since the LTE-A, such as the 5G new radio (NR) may be included in the systems to which the embodiments of the disclosure may be applied, and the term "5G" as herein used may be a concept including the existing LTE, LTE-A, or other similar services. Furthermore, embodiments of the disclosure may also be applied to different communication systems with some modifications to such an extent that does not significantly deviate the scope of the disclosure when judged by skilled people in the art.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as third generation partnership project (3GPP) high speed packet access (HSPA), LTE or evolved universal terrestrial radio access (E-UTRA), LTE-A, LTE-Pro, 3GPP2 high rate packet data (HRPD), ultra-mobile broadband (UMB), and IEEE 802.16e communication standards.

As a representative example of such a broadband wireless communication system, an LTE system adopts Orthogonal Frequency Division Multiplexing (OFDM) for DL and Single Carrier Frequency Division Multiple Access (SC-FDMA) for UL. The UL refers to a radio link for a UE or MS to transmit data or a control signal to an eNode B or BS, and the DL refers to a radio link for a BS to transmit data or a control signal to a UE or MS. Such a multiple access scheme allocates and operates time-frequency resources for carrying data or control information for respective users not to overlap each other, i.e., to maintain orthogonality, thereby differentiating each user's data or control information.

As a future communication system after the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLLC), etc.

The eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Furthermore, the 5G communication system needs to provide increasing user perceived data rate while providing the peak data rate. To satisfy these requirements, various technologies for transmission or reception including multiple-input multiple-output (MIMO) transmission technologies are required to be more enhanced. While the LTE uses up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of terminals in a cell, enhanced coverage of the terminal, extended battery time, reduction in terminal price, etc., are required. Because the IoT is equipped in various sensors and devices to provide communication functions, it may be supposed to support a large number of UEs in a cell (e.g., 1,000,000 terminals/km$^2$). Furthermore, a terminal supporting the mMTC is more likely to be located in a shadow area, such as underground of a building, which may not be covered by a cell by the nature of the service, so the mMTC may require an even larger coverage than expected for other services provided by the 5G communication system. A terminal supporting the mMTC needs to be a low-cost terminal, and may require quite a long battery lifetime such as 10 to 15 years because it is difficult to frequently change the battery in the terminal.

Finally, URLLC is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency and very high reliability. For example, URLCC services need to satisfy sub-millisecond (less than 0.5 millisecond) air interface latency and simultaneously require packet error rates equal to or lower than $10^{-5}$. Hence, for the URLLC services, the 5G system needs to provide a smaller transmit time interval (TTI) than for other services, and simultaneously requires a design that allocates a wide range of resources for a frequency band to secure reliability of the communication link.

Those three services in 5G, eMBB, URLLC, and mMTC may be multiplexed in a single system for transmission. In this case, to meet different requirements for the three services, different transmission or reception schemes and parameters may be used between the services. 5G, however, is not limited to the three services.

The disclosure relates to a communication scheme and a system employing the same, which integrates an Internet of Things (IoT) technology with a 5th generation (5G) communication system to provide higher data transfer rates beyond the 4th generation (4G) system. The disclosure may be applied to intelligent services based on the 5G communication and IoT related technologies, e.g., smart home, smart buildings, smart cities, smart cars, connected cars, health care, digital education, smart retail, security and safety services. The embodiments herein disclose a method of coverage enhancement for a physical downlink control channel (PDCCH) in a wireless communication system.

A frame structure in a 5G system will now be described in more detail with reference to the accompanying drawings.

In other words, FIG. 1 illustrates a basic structure of the time-frequency domain, which is a radio resource domain in which data or a control channel is transmitted in a 5G system.

In FIG. 1, the horizontal axis represents the time domain, and the vertical axis represents the frequency domain. A basic resource unit in the time and frequency domain is a resource element (RE) 101, which may be defined as an OFDM symbol 102 on the time axis and a subcarrier 103 on the frequency axis. In the frequency domain, $N_{sc}^{RB}$ (e.g., 12) successive REs may constitute a single resource block (RB) 104.

Figure 2:
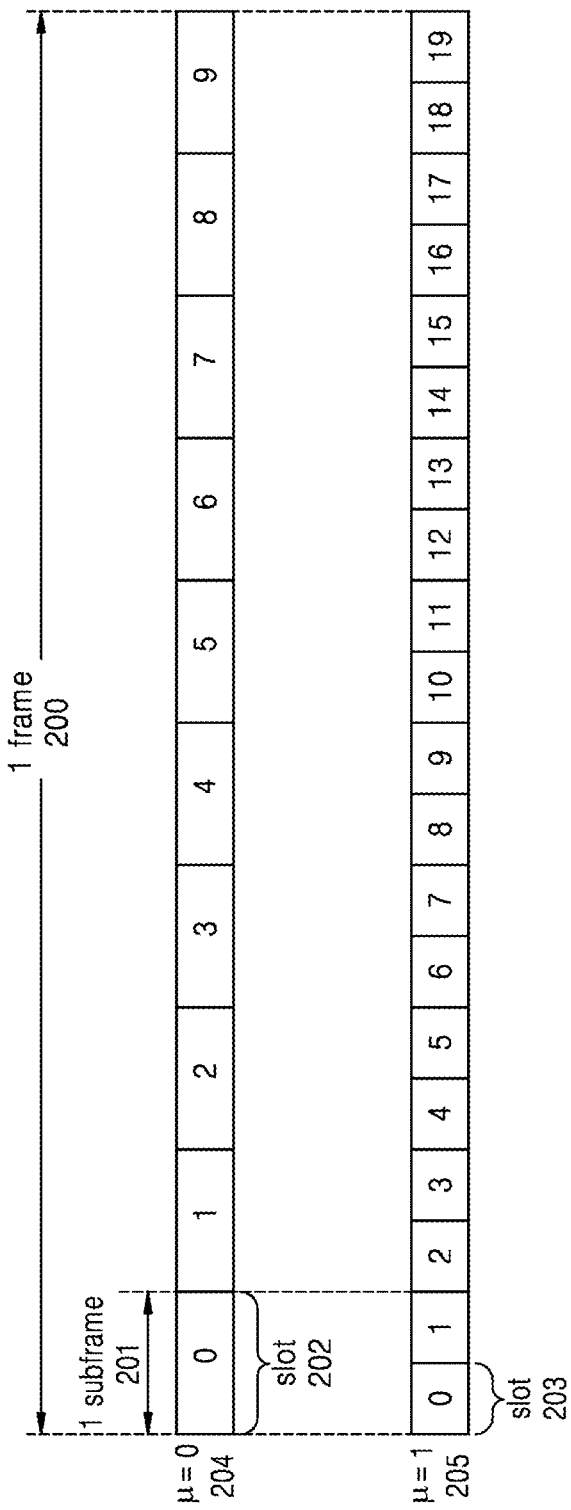
FIG. 2 illustrates a frame, subframe, and slot structure in a wireless communication system according to an embodiment of the present disclosure.

FIG. 2 illustrates a frame, subframe, and slot structure in a wireless communication system according to an embodiment of the present disclosure.

In FIG. 2, an example of structures of a frame 200, a subframe 201 and a slot 202 are shown. One frame 200 may be defined to be 10 ms long. One subframe 201 may be defined to be 1 ms, and thus a total of 10 subframes 201 may constitute one frame 200. One slot 202 or 203 may be defined to have 14 OFDM symbols (i.e., the number of symbols per 1 slot ($N_{symb}^{slot}$)=14). The one subframe 201 may include one or more slots 202 or 203, and the number of slots 202 and 203 per 1 subframe may vary depending on subcarrier spacing configuration values μ (204 and 205). In the example of FIG. 2, the subcarrier spacing configuration values are 0 and 1, i.e., μ=0 (204) and μ=1(205). In the case of μ=0 (204), one subframe 201 includes one slot 202, and in the case of μ=1(205), one subframe 201 includes two slots 203. That is, depending on the subcarrier spacing setting value μ, the number of slots per one subframe ($N_{slot}^{subframe,\mu}$) may vary and the number of slots per one frame ($N_{slot}^{frame,\mu}$) may vary accordingly. $N_{slot}^{subframe,\mu}$ and $N_{slot}^{frame,\mu}$ depending on the subcarrier spacing configuration value μ may be defined as in Table 1 below.

TABLE 1

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

How to configure bandwidth parts (BWPs) in the 5G communication system will now be described with reference to related drawings.

Figure 3:
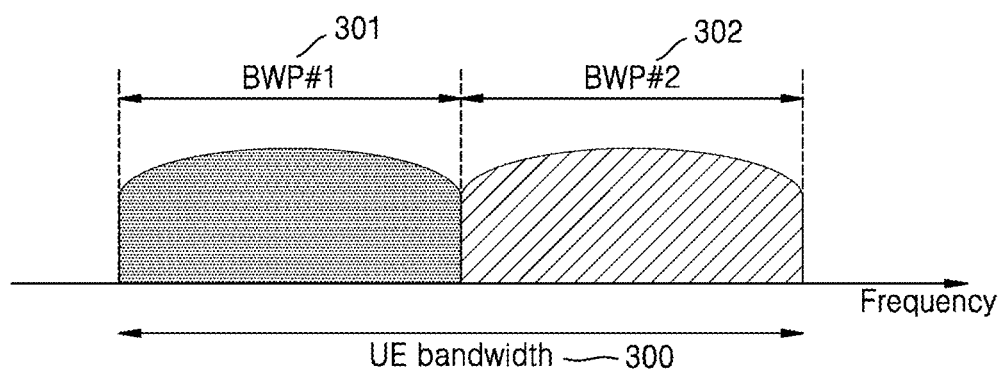
FIG. 3 illustrates an example of configuration of bandwidth parts (BWPs) in a wireless communication system according to an embodiment of the present disclosure.

FIG. 3 illustrates configuration of BWPs in a wireless communication system according to an embodiment of the present disclosure.

In an example of FIG. 3, UE bandwidth 300 is configured into two BWPs, BWP #1 301 and BWP #2 302. The BS may configure the UE with one or more BWPs, and configure a plurality of pieces of information below for each BWP.

TABLE 2

| BWP ::= | SEQUENCE { |
| --- | --- |
| bwp-Id | BWP-Id, |
| locationAndBandwidth | INTEGER (1. .65536) , |
| subcarrierSpacing | ENUMERATED {n0, n1, n2, n3, n4, n5} , |
| cyclicPrefix | ENUMERATED { extended } |
| } | |

Methods of configuring the UE are not limited thereto, and apart from the configuration information, various parameters related to the BWP may also be configured for the UE. The plurality of pieces of information may be transmitted from the BS to the UE through higher layer signaling, e.g., radio resource control (RRC) signaling. At least one of the configured one or more BWPs may be activated. Whether to activate a configured BWP may be notified from the BS to the UE semi-statically by RRC signaling or dynamically in DL control information (DCI).

In some embodiments of the disclosure, the UE may be configured by the BS with an initial BWP for initial access in a master information block (MIB) before the UE is RRC connected. Specifically, the UE may receive configuration information for a control resource set (or CORESET) and search space in which a PDCCH may be transmitted for receiving system information (corresponding to remaining system information (RMSI) or system information block 1 (SIB1)) required for initial access in the MIB in an initial access process. The control resource set and search space configured in the MIB may each be regarded with identity (ID) 0. The BS may notify the UE of configuration information, such as frequency allocation information, time allocation information, numerology, etc., for control resource set #0, in the MIB. The BS may also notify the UE of configuration information, such as a monitoring periodicity and occasion for the control resource set #0, i.e., configuration information for search space #0. The UE may regard a frequency area set to the control resource set #0 obtained from the MIB as the initial BWP for initial access. In this case, the ID of the initial BWP may be regarded as 0.

Such configuration of the BWP supported by the 5G may be used for various purposes.

In some embodiments of the disclosure, an occasion when the bandwidth supported by the UE is smaller than the system bandwidth may be addressed by the BWP configuration. For example, the BS may configure the UE with frequency location of the BWP (configuration information 2), thereby allowing the UE to transmit or receive data in the particular frequency location in the system bandwidth.

Furthermore, in some embodiments, for the purpose of supporting different numerologies, the BS may configure a plurality of BWPs for the UE. For example, to support data transmission and reception using both 15 KHz subcarrier spacing and 30 KHz subcarrier spacing for a UE, two BWPs may be configured with 15 KHz and 30 KHz subcarrier spacing, respectively. The different BWPs may be frequency division multiplexed, and for data transmission and reception with particular subcarrier spacing, a BWP configured with the subcarrier spacing may be activated.

Moreover, in some embodiments, for the purpose of reducing power consumption of the UE, the BS may configure BWPs with different bandwidth sizes for the UE. For example, when a UE supports very large bandwidth, e.g., 100 MHz bandwidth, and always transmits or receives data in the bandwidth, the UE may consume very large power. In a particular situation where there is no traffic, monitoring unnecessary DL control channel in the large 100 MHz bandwidth may be very inefficient in terms of power consumption. To reduce the power consumption of the UE, the BS may configure a BWP with relatively small bandwidth, e.g., a 20 MHz BWP, for the UE. In the situation that there is no traffic, the UE may perform monitoring in the 20 MHz BWP, and when data occurs, the UE may transmit or receive the data in the 100 MHz BWP under instructions from the BS.

In the method of configuring a BWP, UEs may receive configuration information for the initial BWP in the MIB in an initial access process before being RRC connected. Specifically, the UE may be configured with a control resource set (CORESET) for a DL control channel on which DCI may be transmitted to schedule a system information block (SIB) in the MIB of a physical broadcast channel (PBCH). Bandwidth of the control resource set configured in the MIB may be regarded as the initial BWP, and the UE may receive a physical downlink shared channel (PDSCH) on which the SIB is transmitted in the initial BWP. The initial BWP may also be used for other system information (OSI), paging, or random access apart from reception of the SIB.

BWP switching will now be described in detail.

When one or more BWPs are configured for the UE, the BS may indicate switching or transition of BWP by using a BWP indicator field in DCI to the UE. For example, when a BWP of the UE currently activated is BWP #1 301 in FIG. 3, the BS may indicate BWP #2 302 with a bandwidth indicator in DCI to the UE, and the UE may perform BWP switching to the BWP #2 302 indicated with the BWP indicator in the received DCI.

As the DCI based BWP switching may be indicated by DCI that schedules a PDSCH or PUSCH as described above, the UE may need to transmit or receive the PDSCH or the PUSCH scheduled by the DCI in the switched BWP without difficulty. For this, a standard defines a requirement for a delay time $T_{BWP}$ required for BWP switching, which may be defined, for example, as follows:

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirement for BWP switching delay time supports type 1 or type 2 depending on a capability of the UE. The UE may report a supportable BWP delay time type to the BS.

According to the requirement for the BWP switching delay time, the UE may complete switching to a new BWP indicated by the BWP switching indicator no later than slot n+$T_{BWP}$ when receiving DCI including the BWP switching indicator in slot n, and transmit or receive a data channel scheduled by the DCI in the new BWP. The BS may determine to allocate a time domain resource for the data channel by considering the BWP switching delay time of the UE to schedule the data channel with the new BWP. For example, as for a method of determining time domain resource allocation for a data channel, the BS may schedule the data channel after the BWP switching delay time in scheduling the data channel with the new BWP. Hence, the UE may not expect the DCI that indicates BWP switching to indicate a slot offset value (K0 or K2) smaller than the BWP switching delay time $T_{BWP}$.

When the UE receives DCI that indicates BWP switching (e.g., DCI format 1_1 or 0_1), the UE may not perform transmission or reception during a time interval from a third symbol of the slot in which a PDCCH including the DCI is received to a starting point of a slot indicated by a slot offset value (K0 or K2) indicated in a time domain resource allocation indicator field in the DCI. For example, when the UE has received DCI that indicates BWP switching in slot n and the slot offset value indicated by the DCI is K, the UE may not perform transmission or reception from the third symbol of the slot n to a symbol before slot n+k, i.e., the last symbol of slot n+K−1.

A synchronization signal (SS)/physical broadcast channel (PBCH) block in 5G will now be described.

An SS/PBCH block may refer to a physical layer channel block including primary SS (PSS), secondary SS (SSS), and PBCH, which are defined as follows:

- PSS: a reference signal for DL time/frequency synchronization, which provides partial information of a cell ID;
- SSS: a reference signal for DL time/frequency synchronization, which provides the rest of the cell ID information not provided by the PSS. It may also serve as another reference signal for demodulation of the PBCH;
- PBCH: a channel for providing essential system information required for transmission or reception of data channel and control channel for UE. The essential system information may include search-space-related control information indicating radio resource mapping information of the control channel, scheduling control information for an extra data channel that transmits system information; And/or
- SS/PBCH block: SS/PBCH block is a combination of PSS, SSS, and PBCH. One or more SS/PBCH blocks may be transmitted in 5 ms, and each of the SS/PBCH block may be distinguished by an index.

The UE may detect the PSS and the SSS in the initial access process, and decode the PBCH. The UE may obtain an MIB from the PBCH and may be configured with control resource set (CORESET) #0 (corresponding to a control resource set indexed by 0) through the MIB. The UE may assume that a demodulation reference signal (DMRS) transmitted in the selected SS/PBCH block and control resource set #0 is quasi-colocated (QCL), and may perform monitoring on the control resource set #0. The UE may receive system information in the DL control information transmitted in the control resource set #0. The UE may obtain random-access-channel (RACH) related configuration information required for initial access from the received system information. The UE may transmit a physical RACH (PRACH) to the BS in consideration of the selected SS/PBCH index, and on reception of the PRACH, the BS may obtain information about the SS/PBCH block index selected by the UE. The BS may identify that the UE has selected any of the respective SS/PBCH blocks and is monitoring the control resource set #0 associated with the selected SS/PBCH.

DCI in the 5G system will now be described in detail.

In the 5G system, scheduling information for UL data (or physical uplink shared channel (PUSCH)) or DL data (or physical downlink shared channel (PDSCH)) is transmitted from the BS to the UE in the DCI. The UE may monitor a fallback DCI format and a non-fallback DCI format for PUSCH or PDSCH. The fallback DCI format may include a fixed field predefined between the BS and the UE, and the non-fallback DCI format may include a configurable field.

DCI may be transmitted on a PDCCH after going through channel coding and modulation processes. Cyclic redundancy check (CRC) may be appended to a DCI message payload, and the CRC may be scrambled by a radio network temporary identifier (RNTI) that corresponds to an ID of the UE. Depending on the use of the DCI message, e.g., UE-specific data transmission, power control command, random access response, or the like, different RNTIs may be used. In other words, the RNTI is transmitted not explicitly but in a CRC calculation process. On reception of a DCI message transmitted on the PDCCH, the UE may check CRC with an allocated RNTI, and determine that the DCI message is transmitted to the UE when the CRC check result is correct.

For example, DCI that schedules a PDSCH for system information (SI) may be scrambled by SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies a transmit power control (TPC) may be scrambled by a TPC-RNTI. DCI that schedules UE-specific PDSCH or PUSCH may be scrambled by a Cell RNTI (C-RNTI).

DCI format 0_0 may be used for the fallback DCI that schedules a PUSCH, in which case the CRC may be scrambled by a C-RNTI. The DCI format 0_0 with the CRC scrambled by the C-RNTI may include, e.g., the following information.

TABLE 4

- Identifier for DCI formats-[1] bit
- Frequency domain resource assignment-
 [[$\log_2(N_{RB}^{UL,BWP} (N_{RB}^{UL,BWP} + 1)/2)$]] bits
- Time domain resource assignment-X bits
- Frequency hopping flag-1 bit.
- Modulation and coding scheme-5 bits
- New data indicator-1 bit
- Redundancy version-2 bits
- HARQ process number-4 bits
- TPC command for scheduled PUSCH-[2] bits
- UL/SUL indicator-0 or 1 bit DCI format 0_1 may be used for the non-fallback DCI that schedules a PUSCH, in which case the CRC may be scrambled by a C-RNTI. The DCI format 0_1 with the CRC scrambled by the C-RNTI may include, e.g., the following information.

TABLE 5

```
- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
  • For resource allocation type 0, ⌈N_RB^{UL,BWP}/P⌉bits
  • For resource allocation type 1,
    ⌈log_2(N_RB^{UL,BWP} (N_RB^{UL,BWP} + 1)/2)⌉ bits
- Time domain resource assignment -
1, 2, 3, or 4 bits
- VRB-to-PRB mapping - 0 or 1 bit,
only for resource allocation type 1.
  • 0 bit if only resource allocation
  type 0 is configured;
  • 1 bit otherwise.
- Frequency hopping flag - 0 or 1 bit,
only for resource allocation type 1.
  • 0 bit if only resource allocation
  type 0 is configured;
  • 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  • 1 bit for semi-static HARQ-ACK codebook;
  • 2 bits for dynamic HARQ-ACK codebook
  with single HARQ-ACK codebook.
- 2nd downlink assignment index - 0 or 2 bits
  • 2 bits for dynamic HARQ-ACK codebook
  with two HARQ-ACK sub-codebooks;
  • 0 bit otherwise.
- TPC command for scheduled PUSCH - 2 bits
- SRS resource indicator -⌈log_2
(Σ_{k=1}^{Lmax} (N_k^{SRS}))⌉ or ⌈log_2(N_SRS)⌉ bits
  • ⌈log_2(Σ_{k=1}^{Lmax}(N_k^{SRS}))⌉ bits for non-
  codebook based PUSCH transmission;
  • ⌈log_2(N_SRS)⌉bits for codebook based
  PUSCH transmission.
- Precoding information and number
of layers -up to 6 bits
- Antenna ports - up to 5 bits
- SRS request - 2 bits
- CSI request - 0, 1, 2, 3, 4, 5, or 6 bits
- CBG transmission information -
0, 2, 4, 6, or 8 bits
- PTRS-DMRS association - 0 or 2 bits.
- beta_offset indicator - 0 or 2 bits
- DMRS sequence initialization - 0 or 1 bit
```

DCI format 1_0 may be used for the fallback DCI that schedules a PDSCH, in which case the CRC may be scrambled by a C-RNTI. The DCI format 1_0 with the CRC scrambled by the C-RNTI may include, e.g., the following information.

TABLE 6

```
- Identifier for DCI formats - [1] bit
- Frequency domain resource assignment
[[⌈log_2(N_RB^{DL,BWP} (N_RB^{DL,BWP} + 1 )/2)⌉]] bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing
indicator - [3] bits
```

DCI format 1_1 may be used for the non-fallback DCI that schedules a PDSCH, in which case the CRC may be scrambled by a C-RNTI. The DCI format 1_1 with the CRC scrambled by the C-RNTI may include, e.g., the following information.

TABLE 7

```
- Carrier indicator - 0 or 3 bits
- Identifier for DCI formats - [1] bits
- Bandwidth part indicator - 0, 1 or 2 bits
- Frequency domain resource assignment
  • For resource allocation type 0,
  [N_RB^{DL,BWP}/P]bits
  • For resource allocation type 1,
  [log_2(N_RB^{DL,BWP} (N_RB^{DL,BWP} + 1)/2)]bits
- Time domain resource assignment -
1, 2, 3, or 4 bits
- VRB-to-PRB mapping - 0 or 1 bit,
only for resource allocation type 1.
  • 0 bit if only resource allocation
  type 0 is configured;
  • 1 bit otherwise.
- PRB bundling size indicator - 0 or 1 bit
- Rate matching indicator - 0, 1, or 2 bits
- ZP CSI-RS trigger - 0, 1, or 2 bits
For transport block 1:
  - Modulation and coding scheme - 5 bits
  - New data indicator - 1 bit
  - Redundancy version - 2 bits
For transport block 2:
  - Modulation and coding scheme - 5 bits
  - New data indicator - 1 bit
  - Redundancy version - 2 bits
- HARQ process number - 4 bits
- Downlink assignment index - 0 or 2 or 4 bits
- TPC command for scheduled PUCCH - 2 bits
```

TABLE 7-continued

```
- PUCCH resource indicator - 3 bits
- PDSCH-to-HARQ feedback
timing indicator - 3 bits
- Antenna ports - 4, 5 or 6 bits
- Transmission configuration indication -
0 or 3 bits
- SRS request - 2 bits
- CBG transmission information -
0, 2, 4, 6, or 8 bits
- CBG flushing out information - 0 or 1 bit
- DMRS sequence initialization - 1 bit
```

A DL control channel in the 5G communication system will now be described in detail with reference to related drawings.

Figure 4:
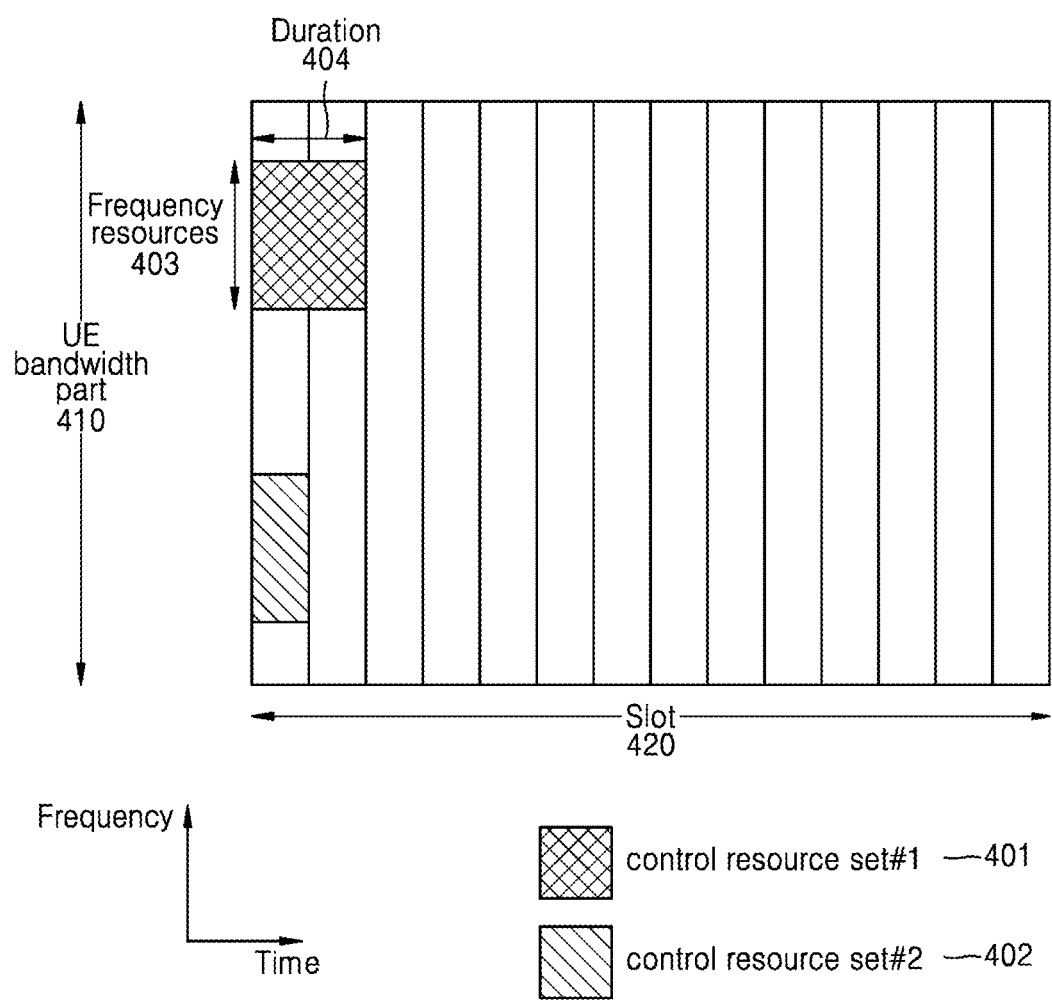
FIG. 4 illustrates an example of configuration of control resource sets of a downlink (DL) control channel in a wireless communication system according to an embodiment of the present disclosure.

Specifically, FIG. 4 shows an example of control resource sets (or CORESETs) in which a DL control channel is transmitted in the 5G wireless communication system.

In the example of FIG. 4, UE BWP 410 is configured on the frequency axis, and two control resource sets, control resource set #1 401 and control resource set #2 402, are configured on the time axis in a slot 420.

The control resource set 401 and 402 may be configured in a particular frequency resource 403 in the entire UE BWP 410 on the frequency axis. One or more OFDM symbols may be configured on the time axis, and defined as control resource set duration 404. In the example of FIG. 4, the control resource set #1 401 is configured to have the control resource set duration of two symbols, and the control resource set #2 402 is configured to have the control resource set duration of one symbol.

As described above, in 5G, the control resource set may be configured by the BS for the UE through higher layer signaling, e.g., system information (SI), MIB, or radio resource control (RRC) signaling. Configuring the UE with a control resource set means providing the UE with information such as a control resource set ID, a frequency location of the control resource set, length of symbols of the control resource set, etc. For example, the configuration information may include what are listed in Table 8 below.

TABLE 8

| | |
|---|---|
| ControlResourceSet ::= | SEQUENCE { |
| -- Corresponds to L1 parameter 'CORESET-ID' | |
| ControlResourceSetId | ControlResourceSetId, |
| frequencyDomainResources | BIT STRING (SIZE (45) ) , |
| duration | INTEGER (1. .maxCoReSetDuration) , |
| cce-REG-MappingType | CHOICE { |
| interleaved | SEQUENCE { |
| reg-BundleSize | ENUMERATED {n2, n3, n6} , |
| precoderGranularity | ENUMERATED {sameAsREG-bundle, |
| allContiguousRBs} , | |
| interleaverSize | ENUMERATED {n2, n3, n6} |
| shiftindex | |
| INTEGER(0. .maxNrofPhysicalResourceBlocks-1) | |
| OPTIONAL | |
| } , | |
| nonInterleaved | NULL |
| } , | |
| tci-StatesPDCCH | SEQUENCE(SIZE (1. .maxNrofTCI- |
| StatesPDCCH) ) OF TCI-StateId | OPTIONAL, |
| tci-PresentInDCI | ENUMERATED |
| {enabled} | OPTIONAL, -- Need S |
| } | |

In Table 8, tci-StatesPDCCH (simply called transmission configuration indication (TCI) state) configuration information may include information about one or more SS/PBCH block indexes having a QCL relation with a DMRS transmitted in the corresponding control resource set or channel state information reference signal (CSI-RS) indexes.

Figure 5A:
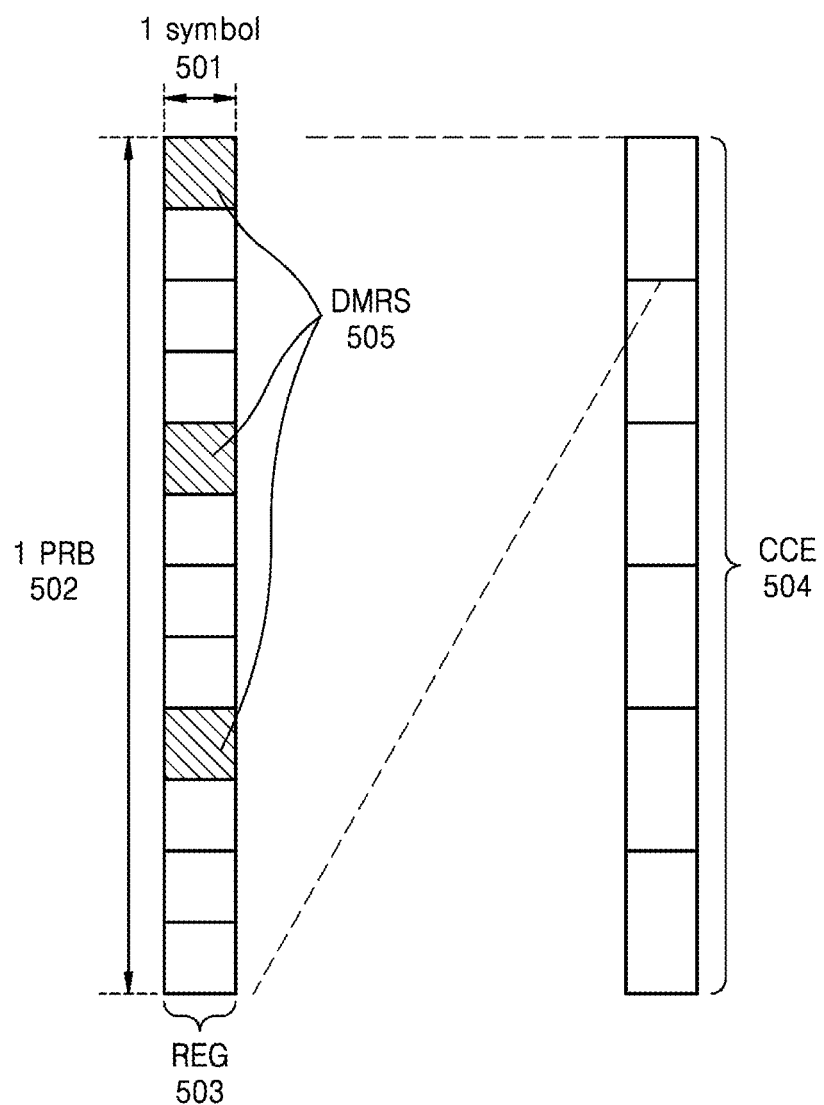
FIG. 5A illustrates a structure of a DL control channel in a wireless communication system according to an embodiment of the present disclosure.

FIG. 5A illustrates an example of a basic unit of time and frequency resource that forms a DL control channel to be used in 5G.

Referring to FIG. 5A, a basic unit of time and frequency resources that form a control channel is referred to as a resource element group (REG) 503. The REG 503 may be defined by one OFDM symbol 501 in the time domain and one physical resource block (PRB) 502, i.e., 12 subcarriers on the frequency domain. The BS may configure a DL control channel allocation unit by connecting REGs 503.

In FIG. 5A, when the DL control channel allocation unit is called a control channel element (CCE) 504 in 5G, the one CCE 504 may include a plurality of REGs 503. For example, as shown in FIG. 5A, the REG 503 may include 12 REs, and when one CCE 504 includes 6 REGs 503, the one CCE 504 may include 72 REs. When the DL control resource set is configured, the DL control resource set may include a plurality of CCEs 504, and a particular DL control channel may be transmitted by being mapped to one or more CCEs 504 based on an aggregation level (AL) in the control resource set. The CCEs 504 in the control resource set may be distinguished by numbers, which may be allocated to the CCEs 504 in a logical mapping method.

The basic unit of the DL control channel as shown in FIG. 5A, i.e., the REG 503, may include both REs to which DCI is mapped and an area, to which DMRS 505 that is a reference signal for decoding the DCI, is mapped. As shown in FIG. 5A, three DMRSs 505 may be transmitted in one REG 503. The number of CCEs required to transmit the PDCCH may be 1, 2, 4, 8, or 16 depending on the aggregation level AL, and different numbers of CCEs may be used to implement link adaptation of the DL control channel. For example, when AL=L, a single DL control channel may be transmitted in L CCEs. The UE needs to detect a signal without knowing of information about the DL control channel, and search space representing a set of CCEs is defined for the blind decoding. The search space is a set of DL control channel candidates that includes CCEs on which the UE needs to try decoding at a given AL, and the UE may have a plurality of search spaces because there are various ALs each making a bundle with 1, 2, 4, 8, or 16 CCEs. A search space set may be defined as a set of search spaces at all the set ALs.

The search spaces may be classified into common search spaces and UE-specific search spaces. A certain group of UEs or all the UEs may check into a common search space of the PDCCH to dynamically schedule the system information or receive cell-common control information, such as a paging message. For example, the UE may receive PDSCH scheduling allocation information for transmitting an SIB including cell operator information or the like by checking into the common search space of the PDCCH. For the common search space, a certain group of UEs or all the UEs need to receive the PDCCH, so the common search space may be defined as a set of pre-appointed CCEs. UE-specific PDSCH or PUSCH scheduling allocation information may be received by checking into the UE-specific search space of the PDCCH. The UE-specific search space may be UE-specifically defined as a function of various system parameters and an ID of the UE.

In 5G, parameters of the search space of the PDCCH may be set by the BS for the UE in higher layer signaling (e.g., SIB, MIB, or RRC signaling). For example, the BS may configure the number of PDCCH candidates at each AL, monitoring periodicity for the search space, monitoring occasion in symbols in the slot for the search space, a type of the search space (common search space or UE-specific search space), a combination of a DCI format to be monitored in the search space and an RNTI, a control resource set index to monitor the search space, etc., for the UE. For example, the configuration information may include what are listed in Table 9.

TABLE 9

```
SearchSpace ::=              SEQUENCE {
-- Identity of the search space.
SearchSpaceId = 0 identifies the
  SearchSpace configured via PBCH
  (MIB) or ServingCellConfigCommon.
searchSpaceId               SearchSpaceId,
controlResourceSetId        ControlResourceSetId,
monitoringSlot-             CHOICE {
PeriodicityAndOffset
  sl1                       NULL,
  sl2                       INTEGER (0..1),
  sl4                       INTEGER (0..3),
  sl5                       INTEGER (0..4),
  sl8                       INTEGER (0..7) ,
  sl10                      INTEGER (0..9),
  sl16                      INTEGER (0..15),
  sl20                      INTEGER (0..19)
}
                            OPTIONAL,
duration                    Integer (2..2559)
monitoringSymbols-          BIT STRING (SIZE
WithinSlot
  (14))
                            OPTIONAL,
nrofCandidates              SEQUENCE {
  aggregationLevel1         ENUMERATED
  {n0, n1, n2 , n3, n4, n5, n6, n8},
  aggregationLevel2         ENUMERATED
  {n0, n1, n2 , n3, n4, n5, n6, n8} ,
  aggregationLevel4         ENUMERATED
  {n0, n1, n2 , n3, n4, n5 , n6, n8} ,
  aggregationLevel8         ENUMERATED
  {n0, n1, n2 , n3, n4, n5, n6, n8),
  aggregationLevel16        ENUMERATED
  {n0, n1, n2, n3, n4, n5, n6, n8)
},
searchSpaceType             CHOICE {
-- Configures this search space as
common search space (CSS) and DCI
formats to monitor.
  common                    SEQUENCE {
  }
  ue-Specific               SEQUENCE {
  -- Indicates whether the UE monitors in
  this USS for DCI formats 0-0
  and 1-0 or for formats 0-1 and 1-1.
    formats                 ENUMERATED
    {formats0-0-And-1-0, formats0-1-And-1-1} ,
    ...
  }
```

Based on the configuration information, the BS may configure the UE with one or more search space sets. In some embodiments of the disclosure, the BS may configure search space set 1 and search space set 2 for the UE. The BS may configure the UE to monitor DCI format A scrambled by an X-RNTI in the search space set 1 in the common search space and monitor DCI format B scrambled by a Y-RNTI in the search space set 2 in the UE-specific search space.

The configuration information may indicate that there is one or more search space sets in the common or UE-specific search space. For example, search space set #1 and search space set #2 may be configured as the common search space, and search space set #3 and search space set #4 may be configured as the UE-specific search space.

In the common search space, the following combinations of DCI formats and RNTIs may be monitored. It is, of course, not limited to the following example:

DCI format 0_0/1_0 with CRC scrambled by C-RNTI, CS-RNTI, SP-CSI-RNTI, RA-RNTI, TC-RNTI, P-RNTI, SI-RNTI;

DCI format 2_0 with CRC scrambled by SFI-RNTI;

DCI format 2_1 with CRC scrambled by INT-RNTI;

DCI format 2_2 with CRC scrambled by TPC-PUSCH-RNTI, TPC-PUCCH-RNTI; and/or

DCI format 2_3 with CRC scrambled by TPC-SRS-RNTI.

In the UE-specific search space, the following combinations of DCI formats and RNTIs may be monitored. It is, of course, not limited to the following example:

DCI format 0_0/1_0 with CRC scrambled by C-RNTI, CS-RNTI, TC-RNTI; and/or

DCI format 1_0/1_1 with CRC scrambled by C-RNTI, CS-RNTI, TC-RNTI.

The enumerated RNTIs may follow the following definitions and uses:

C-RNTI (Cell RNTI): used for UE-specific PDSCH scheduling;

TC-RNTI (Temporary Cell RNTI): used for UE-specific PDSCH scheduling;

CS-RNTI (Configured Scheduling RNTI): used for semi-statically configured UE-specific PDSCH scheduling;

RA-RNTI (Random Access RNTI): used for PDSCH scheduling in a random access process;

P-RNTI (Paging RNTI): used for scheduling a PDSCH on which paging is transmitted;

SI-RNTI (System Information RNTI): used for scheduling a PDSCH on which system information is transmitted;

INT-RNTI (Interruption RNTI): used for indicating whether to puncture the PDSCH;

TPC-PUSCH-RNTI (transmit power control for PUSCH RNTI): used for indicating power control command for a PUSCH;

TPC-PUCCH-RNTI (Transmit Power Control for PUCCH RNTI): used for indicating power control command for a PUCCH;

TPC-SRS-RNTI (Transmit Power Control for SRS RNTI): used for indicating power control command for an SRS.

The aforementioned DCI formats may conform to the following definitions in Table 10.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, with control resource set p and search space set s, a search space at aggregation level L may be expressed as in the following equation:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \quad \text{[Equation 1]}$$

L: aggregation level (AL);

$n_{CI}$: carrier index;

$N_{CCE,p}$: a total number of CCEs present in the CORESET p;

$n_{s,f}^\mu$: slot Index;

$M_{s,max}^{(L)}$: the number of PDCCH candidate groups at aggregation level L;

$$m_{s,n_{CI}} = 0, \ldots ,$$

$M_{s,max}^{(L)}-1$: PDCCH candidate group index at aggregation level L;

$i=0, \ldots, L-1;$ $Y_{p,n_{s,f}^\mu} = (A_p \cdot Y_{p,n_{s,f}^\mu-1}) \bmod D$, $Y_{p,-1} = n_{RNTI} \neq 0$, $A_p = 39827$
for p mod 3=0, $A_p = 39829$ for p mod 3=1,
$A_p = 39839$ for p mod 3=2, $D = 65537$ $n_{RNTI}$: UE identifier.

A value of $Y_{p,n_{s,f}^\mu}$ may correspond to 0 for common search space.

A value of $Y_{p,n_{s,f}^\mu}$ may correspond to a value that changes by a UE Identity (C-RNTI or ID configured by the BS for the UE) and time index for the UE-specific search space.

As it is possible to configure a plurality of search space sets with different parameters (e.g., the parameters in Table 9) in 5G, the UE may monitor a different search space set every time. For example, when the search space set #1 is configured with X-slot periodicity and the search space set #2 is configured with Y-slot periodicity, where X and Y are different, the UE may monitor both the search space set #1 and the search space set #2 in a particular slot, and monitor one of the search space set #1 and the search space set #2 in another particular slot.

A span will now be described.

The UE may report UE capability at each SCS about a case of having a plurality of PDCCH monitoring occasions in a slot, in which case a concept of span may be used. A span refers to successive symbols in which the UE may monitor a PDCCH in a slot, and each PDCCH monitoring occasion is in one span. The span may be represented by (X, Y), where X refers to a minimum number of symbols between first symbols of two successive spans and Y refers to the number of successive symbols in which to monitor the PDCCH in one span. In this case, the UE may monitor the PDCCH in a section in Y symbols from the first symbol of the span within the span.

Figure 5B:
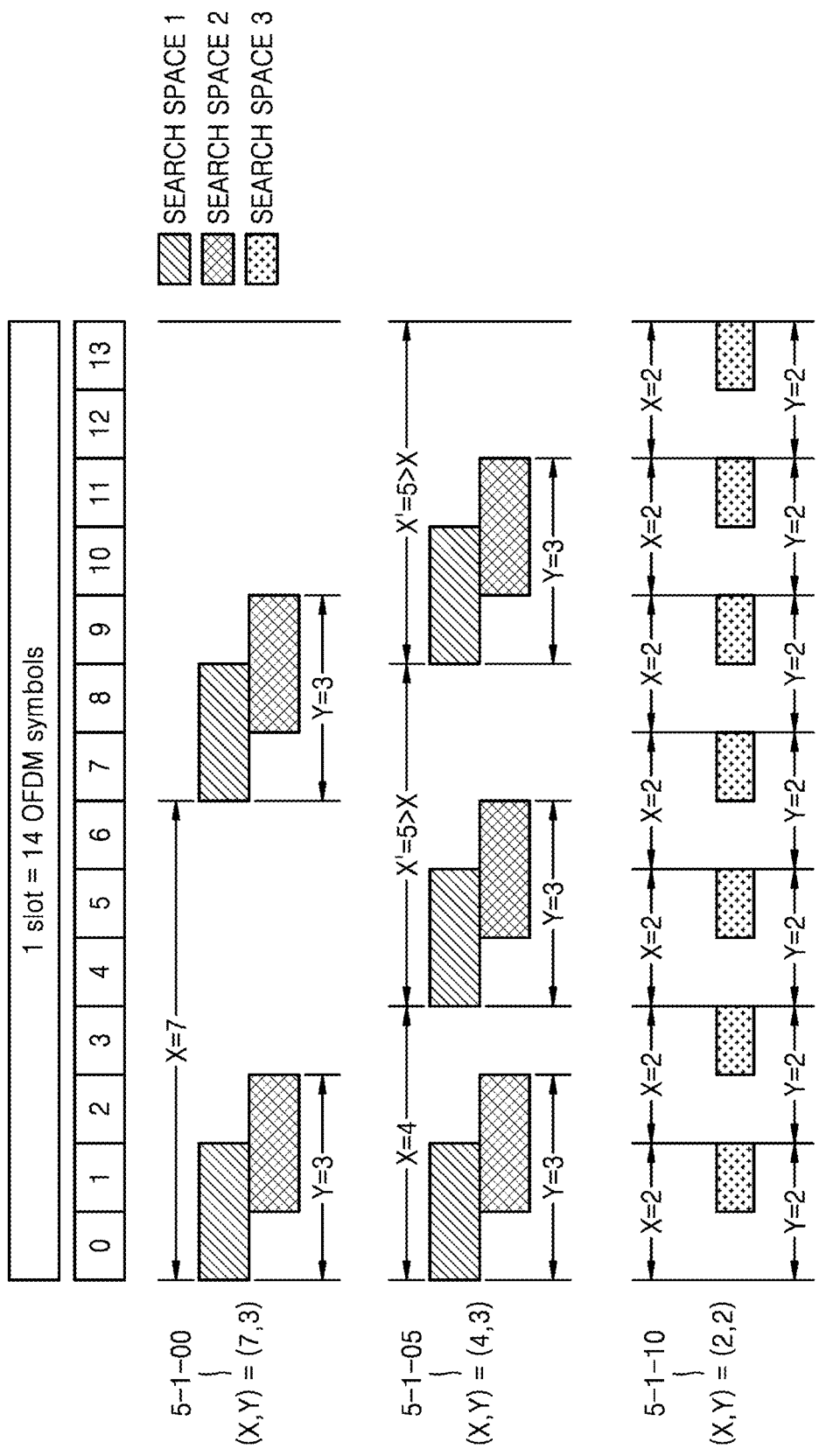
FIG. 5B illustrates a case that a user equipment (UE) may have a plurality of PDCCH monitoring occasions in a slot in a wireless communication system in terms of spans according to an embodiment of the present disclosure.

FIG. 5B illustrates a case that a UE may have a plurality of PDCCH monitoring occasions in a slot in a wireless communication system in terms of spans, according to an embodiment of the disclosure. There may be spans (X, Y)=(7, 3), (4, 3), (2, 2), and these three cases are represented by 5-1-00, 5-1-05 and 5-1-10. For example, 5-1-00 denotes a case that there are two spans that may be represented by (7,3) in a slot. A gap between first symbols of the two spans are represented by X=7, and there may be a PDCCH monitoring occasion and search spaces 1 and 2 in a total of Y=3 symbols from the first symbol of each span. In another example, 5-1-05 denotes a case that there are a total of three spans represented by (4,3) in a slot, and a gap between the second and third spans has 5 symbols (X'=5) greater than X=4.

A discontinuous reception operation (DRX) will now be described in connection with FIG. 6.

Figure 6:
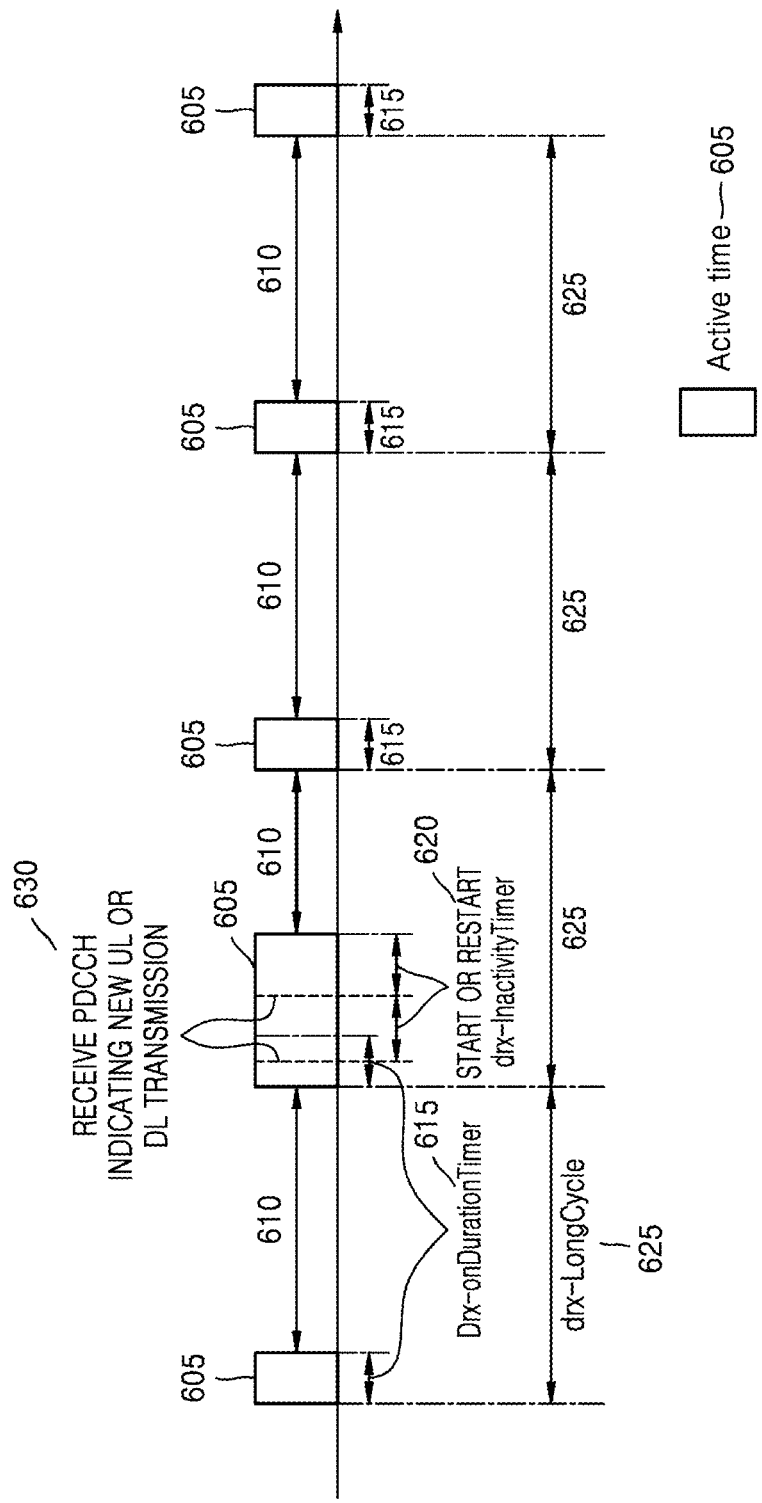
FIG. 6 illustrates an example of a discontinuous reception (DRX) operation in a wireless communication system according to an embodiment of the present disclosure.

FIG. 6 is a diagram for explaining DRX.

DRX is an operation of the UE, which is using a service, to discontinuously receive data while in an RRC connected state in which a radio link is set up between the UE and the BS. When the DRX is applied, the UE may turn on a receiver at a particular time to monitor a control channel and turn off the receiver when receiving no data for a certain period of time, thereby reducing power consumption of the UE. The DRX operation may be controlled by a media access control (MAC) layer device based on various parameters and timers.

Referring to FIG. 6, active time 605 is a period of time in which the UE wakes up in every DRX cycle and monitors a PDCCH. The active time 605 may be defined as follows:

drx-onDurationTimer or drx-InactivityTimer or drx-RetransmissionTimerDL or drx-RetransmissionTimerUL or ra-ContentionResolutionTimer is running;

a Scheduling Request is sent on PUCCH and is pending; or a PDCCH indicating a new transmission addressed to the C-RNTI of the MAC entity has not been received after successful reception of a random access response for the random access preamble not selected by the MAC entity among the contention-based random access preamble.

drx-onDurationTimer, drx-InactivityTimer, drx-RetransmissionTimerDL, drx-RetransmissionTimerUL, ra-ContentionResolutionTimer, etc., are timers whose values are set by the BS, and have a function to configure the UE to monitor a PDCCH when a certain condition is met.

drx-onDurationTimer 615 is a parameter to set a minimum time for which the UE stays awake. drx-InactivityTimer 620 is a parameter to set an extra period of time for which the UE additionally stays awake when a PDCCH indicating new UL or DL transmission is received (630). drx-RetransmissionTimerDL is a parameter to set a maximum period of time for which the UE stays awake to receive DL retransmission in a DL HARQ process. drx-RetransmissionTimerUL is a parameter to set a maximum period of time for which the UE stays awake to receive UL retransmission grant in a UL HARQ process. The drx-onDurationTimer, drx-InactivityTimer, drx-RetransmissionTimerDL, and drx-RetransmissionTimerUL may be set with e.g., time, the number of subframes, or the number of slots. ra-ContentionResolutionTimer is a parameter to monitor the PDCCH in a random access procedure.

Inactivation time (InActive Time) 610 is a time configured not to monitor the PDCCH or not to receive the PDCCH during a DRX operation, and may correspond to a rest of the entire time performing the DRX operation excluding the Active Time 605. The UE may go into the sleep or inactive state to reduce power consumption while not monitoring the PDCCH during the Active Time 605.

The DRX cycle refers to a cycle in which the UE wakes up and monitors a PDCCH. Specifically, it refers to a time gap from after the UE monitors the PDCCH to a time to monitor the next PDCCH, or an occurrence cycle of on duration. The DRX cycle have two types: short DRX cycle and long DRX cycle. The short DRX cycle may be optionally applied.

The long DRX cycle 625 is a longer one of two DRX cycles configured for the UE. The UE starts drx-onDuration Timer 615 again at a point in time after the lapse of Long DRX cycle 625 from a starting point (e.g., a start symbol) of drx-onDurationTimer 615 during the long DRX operation. While operating in the long DRX cycle 625, the UE may start the drx-onDurationTimer 615 in a slot after drx-SlotOffset from a subframe that satisfies the following equation 2. The drx-SlotOffset refers to a delay before the drx-onDurationTimer 615 starts. The drx-SlotOffset may be set with e.g., time, the number of slots, etc.:

[Equation 2]

$$[(SFN \times 10) + \text{subframe number}] \bmod (drx\text{-Long-Cycle}) = drx\text{-StartOffset}.$$

Where drx-LongCycleStartOffset may be used to define the Long DRX cycle 625 and drx-StartOffset may be used to define a subframe to start the Long DRX cycle 625. The drx-LongCycleStartOffset may be set with e.g., time, the number of subframes, the number of slots, etc.

UE capability reporting will now be described.

A slot position where the aforementioned common search space and UE-specific search space are located is indicated by monitoringSymbolsWithinSlot parameter of Table 11-1, and a symbol position in the slot is indicated by a bitmap through the monitoringSymbolsWithinSlot parameter of Table 9. A symbol position in a slot where the UE is able to monitor a search space may be reported to the BS through the following UE capabilities:

UE capability 1 (hereinafter, represented as FG 3-1).

The UE capability refers to, when there is one monitoring occasion (MO) for type 1 and type 3 common search spaces or UE-specific search spaces in a slot as in Table 11-1 below, a capability to monitor the MO when the MO is located in the first three symbols in the slot. The UE capability is mandatory capability supported by every UE that supports NR, and whether to support the UE capability is not explicitly reported to the BS.

TABLE 11-1

| Index | Feature group | Components | Field name in TS 38.331 [2] |
|---|---|---|---|
| 3-1 | Basic DL control channel | 1) One configured CORESET per BWP per cell in addition to CORESET0<br>- CORESET resource allocation of 6RB bit-map and duration of 1-3 OFDM symbols for FR1<br>- For type 1 CSS without dedicated RRC configuration and for type 0, 0A, and 2 CSSs, CORESET resource allocation of 6RB bit-map and duration 1-3 OFDM symbols for FR2<br>- For type 1 CSS with dedicated RRC configuration and for type 3 CSS, UE specific SS, CORESET resource allocation of 6RB bit-map and duration 1-2 OFDM symbols for FR2<br>- REG-bundle sizes of 2/3 RBs or 6 RBs<br>- interleaved and non- | n/a |

TABLE 11-1-continued

| Index | Feature group | Components | Field name in TS 38.331 [2] |
|---|---|---|---|
| | | interleaved CCE-to-REG mapping<br>- Precoder-granularity of REG-bundle size<br>- PDCCH DMRS scrambling determination<br>- TCI state(s) for a CORESET configuration<br>2) CSS and UE-SS configurations for unicast PDCCH transmission per BWP per cell<br>- PDCCH aggregation levels 1, 2, 4, 8, 16<br>- UP to 3 search space sets in a slot for a scheduled SCell per BWP<br>This search space limit is before applying all dropping rules,<br>- For type 1 CSS with dedicated RRC configuration, type 3 CSS, and UE-SS, the monitoring occasion is within the first 3 OFDM symbols of a slot<br>- For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter, represented as FG 3-2). The UE capability refers to, when there is one monitoring occasion (MO) for common search spaces or UE-specific search spaces in a slot as in Table 11-2 below, a capability of monitoring no matter where the start symbol position of the MO is. The UE capability is optionally supported by the UE, and whether to support the UE capability is explicitly reported to the BS.

TABLE 11-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoring-SingleOccasion |

UE capability 3 (hereinafter, represented as FG 3-5, 3-5a and 3-5b). The UE capability refers to, when there are a plurality of monitoring occasions (MOs) for common search spaces or UE-specific search spaces in a slot as in Table 11-3 below, an MO pattern that may be monitored by the UE. The pattern is comprised of a gap between start symbols of different MOs, X, and the maximum symbol length for one MO, Y. Combinations of (X, Y) supported by the UE may be one or more of {(2, 2), (4, 3), (7, 3)}. The UE capability is optionally supported by the UE, and whether to support the UE capability and the combination (X, Y) are explicitly reported to the BS.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-Monitoring-AnyOccasions {<br>3-5.<br>withoutDCI-Gap<br>3-5a.<br>withDCI-Gap<br>} |
| 3-5a | For type 1 CSS with dedicated RRC config- | For type 1 CSS with dedicated RRC configuration, type 3 CSS and UE-SS, | |

TABLE 11-3-continued

| Feature group | Index | Components | Field name in TS 38.331 [2] |
|---|---|---|---|
| | | uration, type 3 CSS, and UE-SS, monitoring occasion can be any OFDM symbol(s) of a slot for Case 2 with a cross-slot DCI gap | monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>- 2 OFDM symbols for 15 kHz<br>- 4 OFDM symbols for 30 kHz<br>- 7 OFDM symbols for 60 kHz with NCP<br>- 11 OFDM symbols for 120 kHz<br>Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol (s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(1), 0 <= 1 <= 13 is generated, where b(1) = 1 if symbol 1 of any slot is part of a monitoring occasion, b(1) = 0 otherwise. The first span in the span pattern begins at the smallest 1 for which b(1) = 1. The next span in the span pattern begins at the smallest 1 not included in the previous span(s) for which b(1) = 1. The span duration is max {maximum value of all | |

TABLE 11-3-continued

| Feature Indexgroup | Components | Field name in TS 38.331 [2] |
|---|---|---|
| | CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: • Processing one unicast DCI scheduling DL and one unicast DCI scheduling UL per scheduled CC across this set of monitoring occasions for FDD • Processing one unicast DCI scheduling DL and two unicast DCI scheduling UL per scheduled CC across this set of monitoring occasions for TDD • Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among | |

TABLE 11-3-continued

| Feature Indexgroup | Components | Field name in TS 38.331 [2] |
|---|---|---|
| | values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether to support UE capability 2 and/or the UE capability 3 and associated parameters to the BS. The BS may perform time domain resource allocation for the common search space and the UE-specific search space based on the reported UE capability. In allocating a resource, the BS may not place the MO in a position where the UE is unable to perform monitoring.

The maximum number of PDCCH candidate groups to be monitored by the UE and the maximum number of CCEs included in the entire search spaces will now be described.

When a plurality of search space sets are configured for the UE, the following conditions may be taken into account in a method for determining a search space set to be monitored by the UE.

When the UE is configured with a value of higher layer signaling "monitoringCapabilityConfig-r16" in "r15monitoringcapability," the UE defines maximum values of the number of PDCCH candidate groups to be monitored and the number of CCEs that make up the entire search spaces (the term entire search spaces refer to an entire CCE set corresponding to a union region of a plurality of search space sets) for each slot, and when the UE is configured with a value of "monitoringCapabilityConfig-r16" in "r15monitoringcapability," the UE defines maximum values of the number of PDCCH candidate groups to be monitored and the number of CCEs that make up the entire search spaces (the term entire search spaces refer to an entire CCE set corresponding to a union region of a plurality of search space sets) for each span.

[Condition 1: Restriction on the Maximum Number of PDCCH Candidate Groups]

The maximum number $M^\mu$ of PDCCH candidate groups to be monitored by the UE may follow Table 12-1 below when defined on a slot basis and follow Table 12-2 below when defined on a span basis in a cell with $15 \cdot 2^\mu$ kHz SCS configured, depending on the configuration value of higher layer signaling as described above.

TABLE 12-1

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 12-2

| | Maximum number $M^\mu$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

[Condition 2: Restriction on the Maximum Number of CCEs]

The maximum number $C^\mu$ of CCEs that make up the entire search spaces (referring to an entire CCE set corresponding to a union region of a plurality of search space sets) may follow Table 12-3 below when defined on a slot basis and follow Table 12-4 below when defined on a span basis in a cell with $15 \cdot 2^\mu$ kHz SCS configured, depending on the configuration value of higher layer signaling as described above.

TABLE 12-3

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 12-4

| | Maximum number $C^\mu$ of non-overlapped CCEs per span for combination (X, Y) and per serving cell | | |
|---|---|---|---|
| $\mu$ | (2, 2) | (4, 3) | (7, 3) |
| 0 | 18 | 36 | 56 |
| 1 | 18 | 36 | 56 |

For convenience of explanation, a situation that satisfies both conditions 1 and 2 at a particular time is defined to be "condition A." Accordingly, failing to satisfy the condition A may mean that at least one of the condition 1 or the condition 2 is not satisfied.

Selecting a search space set in an overbooking occasion will now be described.

Depending on how the BS configures the search space sets, there may be an occasion when the condition A is not satisfied at a particular time. On the occasion when the condition A is not satisfied at the particular time, the UE may select and monitor some of the search space sets, which are configured to satisfy the condition A at the time, and the BS may transmit a PDCCH in the selected search space set.

Selecting some of the entire search space sets may be performed in the following methods.

In a case that the condition A for the PDCCH is not satisfied at a particular time (slot), the UE may select a search space set having the search space type set to the common search space over a search space set, which is set to the UE-specific search space, from among the search space sets that exist at the time.

When all the search space sets set to the common search space are selected (i.e., when the condition A is satisfied even after all the search space sets set to the common search space is selected), the UE (or the BS) may select search space sets set to the UE-specific space. In this case, when there are a plurality of search space sets set to the UE-specific search space, a search space set with a lower search space index may have higher priority. Considering the priorities, UE-specific search space sets may be selected as long as they satisfy the condition A.

Quasi co-location (QCL) configuration and a TCI state will now be described.

One or more different antenna ports (which may be replaced by one or more channels, signals, or combinations thereof, but for convenience of explanation of the disclosure, collectively called different antenna ports) may be associated with one another according to QCL configurations in Table 13 below in a wireless communication system. The TCI state is to announce a QCL relation between a PDCCH (or PDCCH DMRS) and other RS or channel, and the expression that a reference antenna port A (reference RS #A) and other target antenna port B (target RS #B) are QCLed with each other means that the UE is allowed to apply some or all of large-scale channel parameters estimated from the antenna port A to channel measurements from the antenna port B. QCL may need to associate different parameters depending on a situation such as 1) time tracking affected by average delay and delay spread, 2) frequency tracking affected by Doppler shift and Doppler spread, 3) radio resource management affected by an average gain, 4) beam management affected by a spatial parameter, etc. Hence, NR supports four types of QCL relations as in Table 13 below.

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter is a collective term for some or all of various parameters such as angle of arrival (AoA), power angular spectrum (PAS) of AoA, angle of departure (AoD), PAS of AoD, transmit/receive channel correlation, transmit/receive beamforming, spatial channel correlation, etc.

The QCL relation may be configured for the UE through an RRC parameter TCI-state and QCL-Info as in Table 14 below. Referring to Table 14, the BS may configure the UE with one or more TCI states to inform the UE about up to two QCL relations (qcl-Type1 and qcl-Type2) for an RS that refers to an ID of the TCI state, i.e., a target RS. In this case, QCL information (QCL-Info) included in each of the TCI states includes a BWP index and a serving cell index of a reference RS indicated by the QCL information, a type and ID of the reference RS, and a QCL type as in the above Table 13.

TABLE 14

```
TCI-State : :=      SEQUENCE {
    tci-StateId         TCI-StateId,
    qcl-Type1           QCL-Info,
    qcl-Type2           QCL-Info              OPTIONAL,   -- Need R
    ...
}
QCL-Info : :=       SEQUENCE {
    cell                ServCellIndex         OPTIONAL,   -- Need R
    bwp-Id              BWP-Id                OPTIONAL,  -- cond CSI-RS-Indicated
    referenceSignal     CHOICE {
        csi-rs              NZP-CSI-RS-ResourceId,
        ssb                 SSB-Index
    },
    qcl-Type            ENUMERATED {typeA, typeB, typeC, typeD} ,
    ...
}
```

Figure 7:
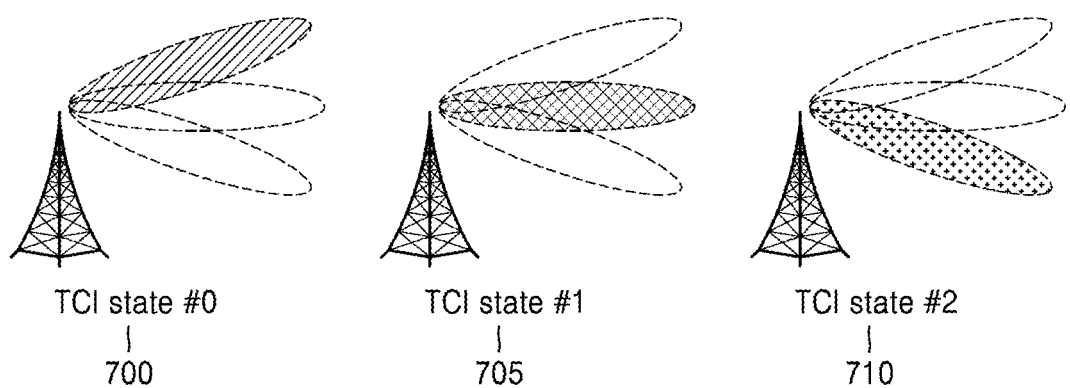
FIG. 7 illustrates an example of base station (BS) beam allocation based on transmission configuration indicator (TCI) state configuration in a wireless communication system according to an embodiment of the present disclosure.

FIG. 7 illustrates examples of BS beam allocation according to TCI state configurations.

Referring to FIG. 7, the BS may deliver information about N different beams to the UE through N different TCI states. For example, in a case of N=3 as shown in FIG. 7, the BS may announce that antenna ports referring to the different TCI states 700, 705, and 710 are associated with different spatial Rx parameters, i.e., different beams by associating qcl-type2 parameters included in the three TCI states 700, 705, and 710 with CSI-RSs or SSBs corresponding to the different beams and setting the qci-Type2 parameters to QCL type D.

Tables 15-1 to 15-5 below represent valid TCI state configurations according to target antenna port types.

Table 15-1 represents a valid TCI state configuration when the target antenna port is a CSI-RS for tracking (TRS). The TRS refers to NZP CSI-RS with no repetition parameter configured and trs-Info set to "true" among CSI-RSs. In Table 15-1, the third configuration may be used for an aperiodic TRS.

TABLE 15-1 valid TCI state configuration when the target antenna port is a TRS

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 15-2 represents a valid TCI state configuration when the target antenna port is a CSI-RS for CSI. The CSI-RS for CSI refers to an NZP CSI-RS with no parameter indicating repetition (e.g., a repetition parameter) configured and trs-Info not set to "true" among CSI-RSs.

TABLE 15-2 valid TCI state configuration when the target antenna port is CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 15-3 represents a valid TCI state configuration when the target antenna port is a CSI-RS for beam management (meaning the same as BM, CSI-RS for L1 RSRP reporting). The CSI-RS for BM refers to NZP CSI-RS with a repetition parameter configured and having a value of "on" or "off" and trs-Info not set to "true" among CSI-RSs.

TABLE 15-3 valid TCI state configuration when the target antenna port is CSI-RS for BM (for L1 RSRP reporting)

| Valid TCI state Configuration | DL RS 1 | qcl-Type1 | DLRS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 15-4 represents a valid TCI state configuration when the target antenna port is a PDCCH DMRS.

TABLE 15-4

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RSI) | QCL-TypeD |

Table 15-5 represents a valid TCI state configuration when the target antenna port is a PDSCH DMRS.

TABLE 15-5 valid TCI state configuration when the target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method according to Tables 15-1 to 15-5 is to set and operate a target antenna port and a reference antenna port in each stage as follows: "SSB"→"TRS"→"CSI-RS for CSI, CSI-RS for BM, PDCCH DMRS, or PDSCH DMRS" This may associate statistical characteristics that may be measured from the SSB and TRS with the respective antenna ports, enabling to help reception operation of the UE.

Specifically, a TCI state combination applicable to a PDCCH DMRS antenna port is as in Table 16 below. In Table 16, the fourth row indicates a combination assumed by the UE before RRC configuration, and post RRC configuration thereof is not possible.

TABLE 16

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (csi) | QCL-TypeA | | |
| 4 | SS/PBCH Block | QCL-TypeA | SS/PBCH Block | QCL-TypeD |

Figure 8:
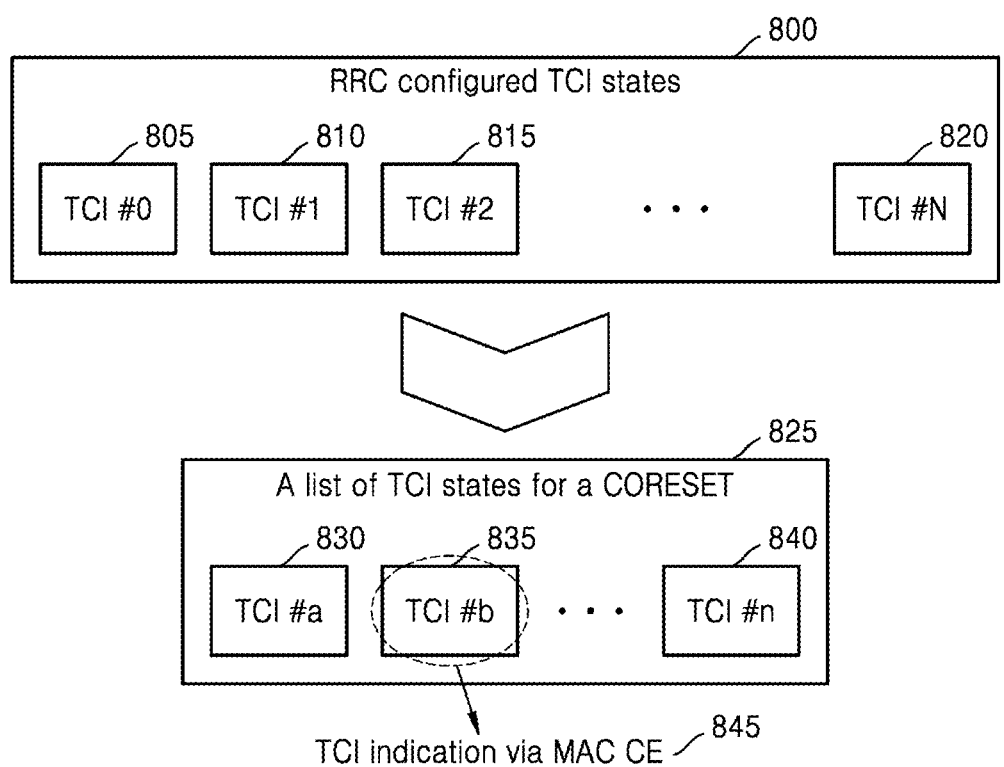
FIG. 8 illustrates an example of TCI state allocation method for a physical downlink control channel (PDCCH) in a wireless communication system according to an embodiment of the present disclosure.

FIG. 8 illustrates an example of TCI state allocation method for a PDCCH in a wireless communication system according to an embodiment of the present disclosure.

NR supports a hierarchical signaling method as shown in FIG. 8 for dynamic allocation of PCCH beams. Referring to FIG. 8, the BS may configure N TCI states 805, 810, . . . , 820 for the UE through RRC signaling 800, and configure some of them as TCI states for a CORESET in 825. Subsequently, the BS may indicate one of the TCI states 830, 835, . . . , 840 for the CORESET to the UE through MAC CE signaling in 845. After this, the UE receives a PDCCH based on beam information included in the TCI state indicated by the MAC CE signaling.

Figure 9:
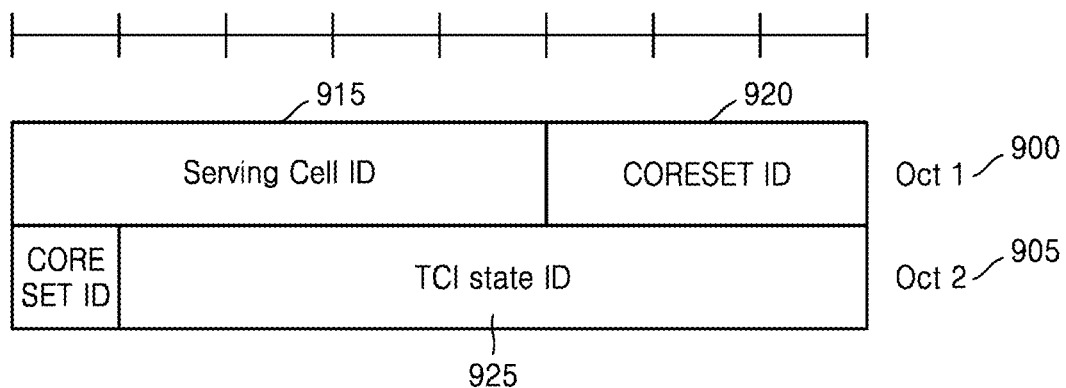
FIG. 9 illustrates a TCI indication medium access control (MAC) control element (CE) signaling structure for a PDCCH demodulation reference signal (DMRS) in a wireless communication system according to an embodiment of the present disclosure.

FIG. 9 illustrates a TCI indication MAC CE signaling structure for the PDCCH DMRS.

Referring to FIG. 9, TCI indication MAC CE signaling for the PDCCH DMRS is two bytes (16 bits) long, and includes a serving cell ID 915 of five bits, a CORESET ID 920 of four bits, and a TCI state ID 925 of seven bits. For example, the TCI indication MAC CE signaling for the PDCCH DMRS may include a first octet 900 and a second octet 905.

Figure 10:
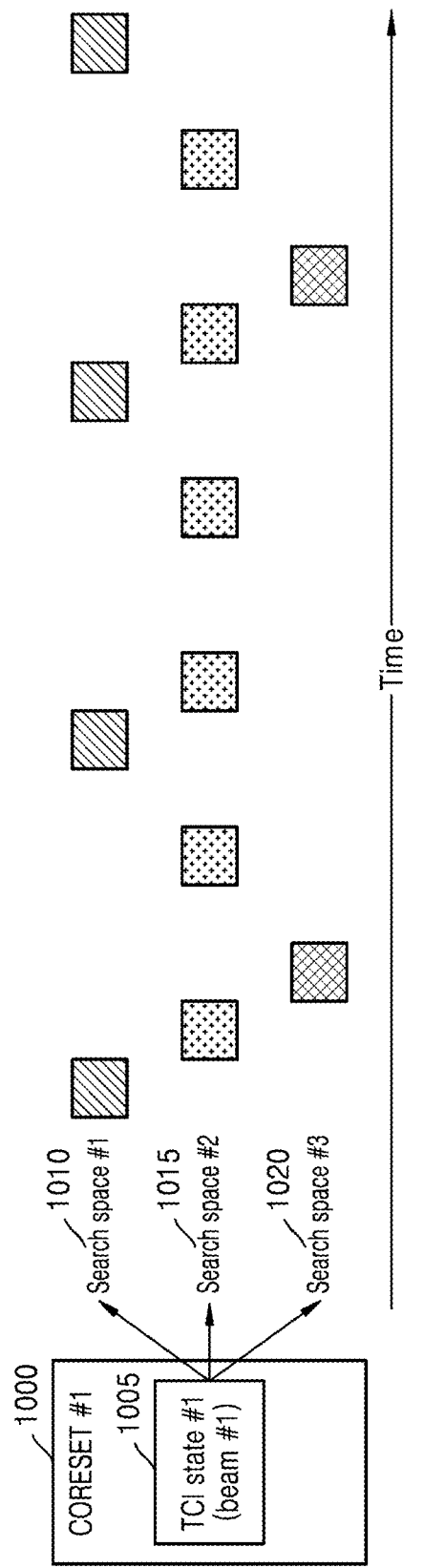
FIG. 10 illustrates an example of beam configuration of a control resource set and search spaces in a wireless communication system, according to an embodiment of the disclosure.

FIG. 10 illustrates an example of beam configuration of a CORESET and search space as described above.

Referring to FIG. 10, the BS may indicate a TCI state 1005 from among a TCI state list included in a CORESET configuration 1000 through MAC CE signaling. After this, the UE considers that same QCL information (beam #1 1005) is applied to all of one or more search spaces 1010, 1015 and 1020 associated with the CORESET until another TCI state is indicated for the CORESET through another MAC CE signaling. The aforementioned PDCCH beam allocation method has difficulty in indicating a beam change earlier than the MAC CE signaling delay and has a shortcoming of applying the same beam uniformly for each CORESET without regard to search space characteristics, thereby making it difficult for flexible PDCCH beam operation. The following embodiments of the disclosure provide a more flexible PDCCH beam configuration and operation method. Although several distinct examples will now be described for convenience of explaining the embodiments of the disclosure, the examples are not mutually exclusive but may be applied in a suitable combination thereof depending on the situation.

The BS may configure the UE with one or more TCI states for a particular CORESET, and activate one of the configured TCI states through an MAC CE activation command. For example, TCI states {TCI state #0, TCI state #1 and TCI state #2} are configured for CORESET #1, and the BS may transmit, to the UE, an activation command to assume TCI state #0 for the TCI state for CORESET #1 through MAC CE. The UE may correctly receive a DMRS of the CORESET based on QCL information in the activated TCI state based on the activation command for the TCI state received in the MAC CE.

When the UE fails to receive the MAC CE activation command for a TCI state for a CORESET indexed with 0, i.e., the CORESET #0, the UE may assume that a DMRS transmitted in CORESET #0 is QCLed with an SS/PBCH block identified in an initial access procedure or in a non-contention based random access procedure, which is not triggered by a PDCCH command.

As for a CORESET configured with a different index value (CORESET #X) instead of index 0, when the UE is not configured with a TCI state for the CORESET #X or is configured with one or more TCI states but fails to receive the MAC CE activation command for activating one of them, the UE may assume that a DMRS transmitted in CORESET #X is QCLed with an SS/PBCH block identified in an initial access procedure.

An operation of determining QCL priority for a PDCCH will now be described in detail.

When the UE operates with carrier aggregation in a single cell or a band and a plurality of CORESETs present in an activated BWP in the single or multiple cells have the same or different QCL-typeD characteristics and overlap in time in a particular PDCCH monitoring occasion, the UE may select a particular CORESET according to the QCL priority determination operation and monitor CORESETs having the same QCL-TypeD characteristics as the selected CORESET. For example, the UE may receive only one QCL-TypeD characteristic when the plurality of CORESETs overlap in time. In this case, criteria for determining QCL priority may be as follows:

criterion 1: A CORESET associated with the common search space of the lowest index in a cell corresponding to the lowest index among cells including the common search space; And/or criterion 2: A CORESET associated with the UE-specific search space of the lowest index in a cell corresponding to the lowest index among cells including the UE-specific search space.

When one of the criteria is not satisfied, the next one of them is applied. For example, in a case that CORESETs overlap in time in a particular PDCCH monitoring occasion, when all the CORESETs are not associated with the common search space but with the UE-specific search space, i.e., when the criterion 1 is not satisfied, the UE may skip application of the criterion 1 and apply the criterion 2.

When the UE selects a CORESET according to the aforementioned criteria, the UE may additionally take into account the following two conditions for QCL information configured for the CORESET.

First, when CORESET #1 has CSI-RS1 #1 as a reference signal having QCL-TypeD association and a reference signal having QCL-TypeD association with the CSI-RS #1 is SSB1, and CORESET #2 has a reference signal SSB #1 having QCL-TypeD association, the UE may consider that the two CORESETs #1 and #2 have different QCL-TypeD characteristics.

Second, when CORESET #1 has CSI-RS #1 configured for cell #1 as a reference signal having QCL-TypeD association and a reference signal having QCL-TypeD association with the CSI-RS #1 is SSB #1, and CORESET #2 has a reference signal CSI-RS #2 configured for cell #2 as a reference signal having QCL-TypeD association and a reference signal having the QCL-TypeD association with CSI-RS #2 is the same SSB #1, the UE may consider that the two CORESETs #1 and #2 have the same QCL-TypeD characteristics.

Figure 11:
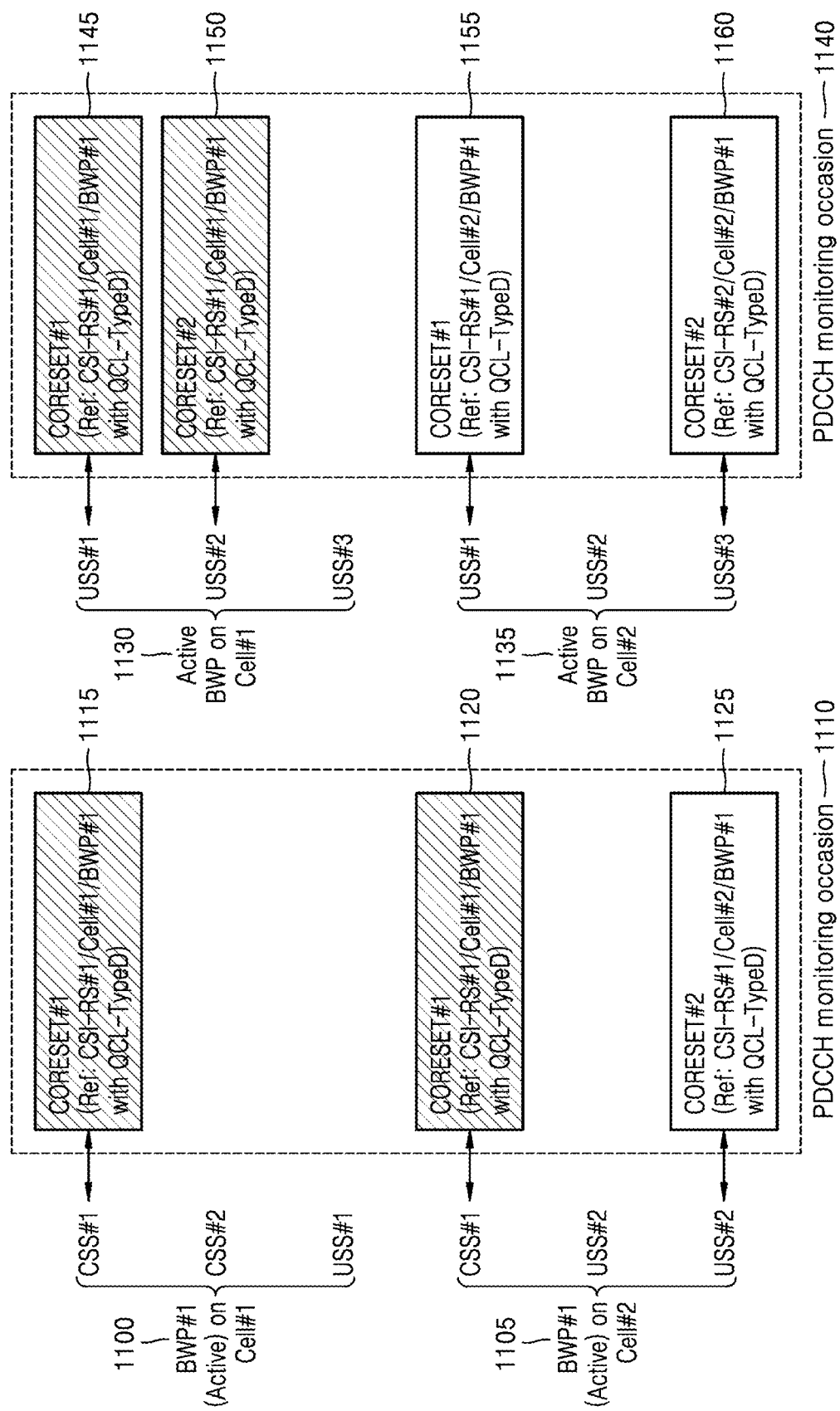
FIG. 11 illustrates a diagram for describing how a UE selects a receivable control resource set by considering priorities in receiving a DL control channel in a wireless communication system according to an embodiment of the present disclosure.

FIG. 11 is a diagram for describing how a UE selects a receivable CORESET by considering priorities in receiving a DL control channel in a wireless communication system according to an embodiment of the present disclosure.

For example, the UE may be configured to receive a plurality of CORESETs overlapping in time in a particular PDCCH monitoring occasion 1110, and the plurality of CORESETs may be associated with the common search space for a plurality of cells or the UE-specific search space. There may be CORESET #1 1115 associated with common search space #1 in BWP #1 1100 of cell #1, and there may be CORESET #1 1120 associated with common search space #1 and CORESET #2 1125 associated with UE-specific search space #2 in BWP #1 1105 of cell #2. The CORESET #1 1115 corresponding to the BWP #1 1100 of the cell #1 and the CORESET #1 1120 corresponding to the BWP #1 1105 of the cell #2 may each have QCL-TypeD association with CSI-RS resource #1 configured in the BWP #1 of the cell #1, and the CORESET #2 1125 may have QCL-TypeD association with CSI-RS resource #1 configured in the BWP #1 of the cell #2. Hence, when the criterion 1 is applied to the PDCCH monitoring occasion 1110, any other CORESETs having a reference signal of the same QCL-TypeD as the CORESET #1 may be received. Accordingly, the UE may receive the CORESETs 1115 and 1120 in the PDCCH monitoring occasion 1210.

In another example, the UE may be configured to receive a plurality of CORESETs overlapping in time in a particular PDCCH monitoring occasion 1140, and the plurality of CORESETs may be associated with the common search space for a plurality of cells or the UE-specific search space. In the PDCCH monitoring occasion, there may be CORESET #1 1145 associated with UE-specific search space #1 and CORESET #2 1150 associated with UE-specific search space #2 in BWP #1 1130 of the cell #1, and there may be CORESET #1 1155 associated with UE-specific search space #1 and CORESET #2 1160 associated with UE-specific search space #3 in BWP #1 1135 of the cell #2.

As for the BWP #1 1130 of the cell #1, the CORESET #1 1145 and the CORESET #2 1150 may have QCL-TypeD association with the CSI-RS resource #1 configured in the BWP #1 of the cell #1.

As for the BWP #1 1135 of the cell #2, the CORESET #1 1115 may have QCL-TypeD association with the CSI-RS resource #1 configured in the BWP #1 of the cell #2, and the CORESET #2 1160 may have QCL-TypeD association with the CSI-RS resource #2 configured in the BWP #1 of the cell #2. In the meantime, there is no common search space when the criterion 1 is applied to the PDCCH monitoring occasion 1140, so the next criterion 2 may be applied. When the criterion 2 is applied to the PDCCH monitoring occasion 1140, any other CORESETs having a reference signal of the same QCL-TypeD as the CORESET #1 1145 may be received. Accordingly, the UE may receive the CORESETs #1 and #2 1145 and 1150 associated with the BWP #1 1130 of the cell #1 in the PDCCH monitoring occasion 1140.

Rate matching and puncturing operations will now be described in detail.

When time and frequency resource A in which to transmit symbol sequence A overlaps time and frequency resource set B, rate matching and puncturing operations may be considered for transmission and reception operations in channel A in consideration of resource C corresponding to the overlapping portion of the resource A and resource B. Details may be as follows.

Rate Matching Operation

The BS may transmit the symbol sequence A by mapping the symbol sequence A to the entire resource A in which to transmit the symbol sequence A to the UE, with the exception of a portion corresponding to the resource C overlapping the resource B. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the BS may transmit the symbol sequence A by sequentially mapping the symbol sequence A to resources {resource #1, resource #2, and resource #4} of the resource A excluding {resource #3} corresponding to the resource C. As a result, the BS may transmit the symbol sequence {symbol #1, symbol #2, and symbol #3} by mapping them to {resource #1, resource #2, and resource #4}, respectively.

The UE may determine the resource A and the resource B from scheduling information for the symbol sequence A from the BS, and may determine the resource C corresponding to an overlapping portion between the resource A and the resource B. The UE may receive the symbol sequence A on the assumption that the symbol sequence A is transmitted by being mapped to the entire resource A except for the resource C. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the UE may receive the symbol sequence A on the assumption that the symbol sequence A is sequentially mapped to resources {resource #1, resource #2, and resource #4} of the resource A excluding {resource #3} corresponding to the resource C. As a result, the UE may assume that the symbol sequence {symbol #1, symbol #2, and symbol #3} is transmitted by being mapped to {resource #1, resource #2, and resource #4}, respectively, and perform a series of next operations.

Puncturing Operation

When there is the resource C corresponding to an overlapping portion between the entire resource A in which to transmit the symbol sequence A to the UE and the resource B, the BS may map the symbol sequence A to the entire resource A but may perform transmission in the resource portions of the resource A except for the resource C without performing transmission in the resource portion corresponding to the resource C. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the BS may map the symbol sequence A {symbol #1, symbol #2, symbol #3, and symbol #4} to the resource A {resource #1, resource #2, resource #3 and resource #4}, and transmit a symbol sequence {symbol #1, symbol #2, and symbol #4} corresponding to resource portions {resource #1, resource #2, and resource #4} of the resource A excluding {resource #3} corresponding to the resource C without transmitting {symbol #3} mapped to {resource #3} corresponding to the resource C. As a result, the BS may transmit the symbol sequence {symbol #1, symbol #2, and symbol #4} by mapping them to {resource #1, resource #2, and resource #4}, respectively.

The UE may determine the resource A and the resource B from scheduling information for the symbol sequence A from the BS, and may determine the resource C corresponding to an overlapping portion between the resource A and the resource B. The UE may receive the symbol sequence A on the assumption that the symbol sequence A is mapped to the entire resource A but transmitted in all the portions of the resource A with the exception of the resource C. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the UE may perform reception while assuming that the symbol sequence A {symbol #1, symbol #2, symbol #3, and symbol #4} are mapped to the resource A {resource #1, resource #2, resource #3 and resource #4}, but {symbol #1, symbol #2, and symbol #4} of the symbol sequence A mapped to {resource #1, resource #2, and resource #4} are transmitted without {symbol #3} mapped to {resource #3} corresponding to the resource C. As a result, the UE may assume that the symbol sequence {symbol #1, symbol #2, and symbol #4} is transmitted by being mapped to {resource #1, resource #2, and resource #4}, respectively, and perform a series of next operations.

A method of configuring a rate matching resource for the purpose of rate matching in a 5G communication system will now be described. Rate matching refers to regulating the magnitude of a signal by taking into account a quantity of resource in which to transmit the signal. For example, rate matching of a data channel may refer to regulating the size of data by not mapping and transmitting the data channel to a particular time and frequency resource portion.

Figure 12:
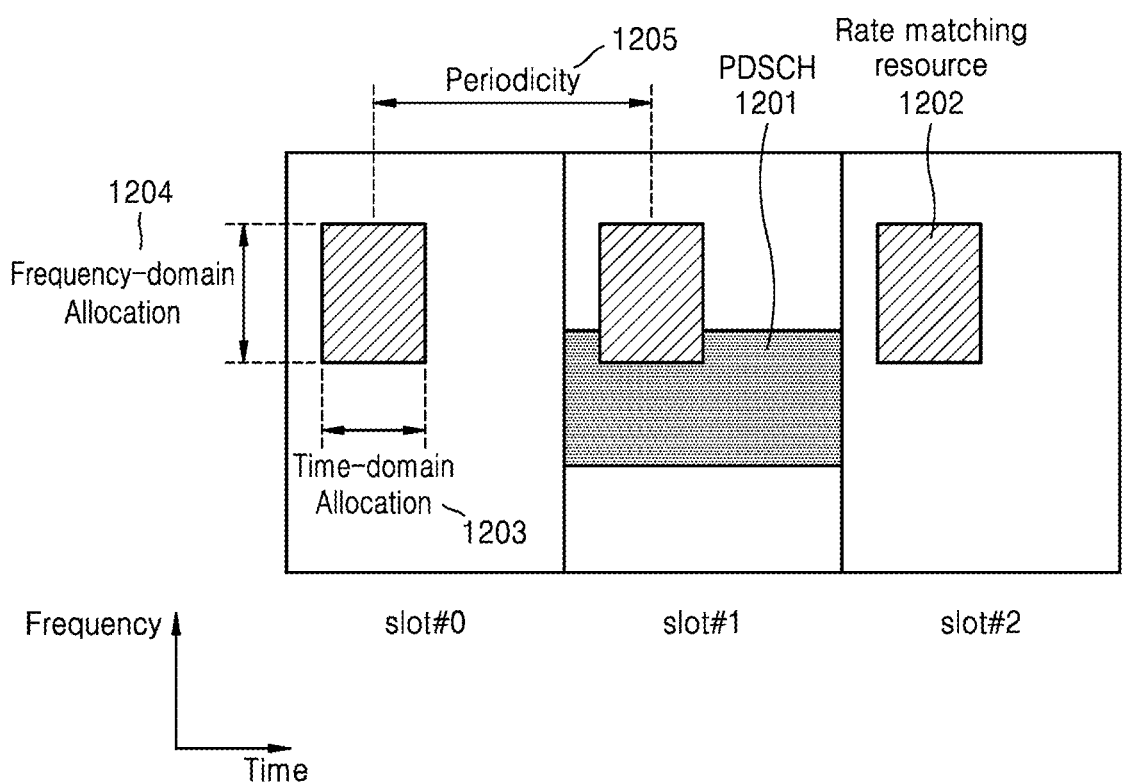
FIG. 12 illustrates a diagram for describing how a BS and a UE transmit or receive data by considering a DL data channel and a rate matching resource in a wireless communication system according to an embodiment of the present disclosure.

FIG. 12 is a diagram for describing how the BS and the UE transmit or receive data by considering a DL data channel and a rate matching resource.

In FIG. 12, shown are a DL data channel (PDSCH) 1201 and a rate matching resource 1202. The BS may configure the UE with one or more rate matching resources 1202 through higher layer signaling (e.g., RRC signaling). Configuration information for the rate matching resource 1202 may include time domain resource allocation information 1203, frequency domain resource allocation information 1204, and periodicity information 1205. In the following description, a bitmap corresponding to the frequency domain resource allocation information 1204 will be denoted as a "first bitmap," a bitmap corresponding to the time domain resource allocation information 1203 a "second bitmap," and a bitmap corresponding to the periodicity information 1205 a "third bitmap." When all or some of time and frequency resources of the scheduled data channel 1201 overlap the configured rate matching resource 1202, the BS may transmit the data channel 1201 by rate matching of the data channel 1201 in a portion of the rate matching resource 1202 and the UE may assume that the data channel 1201 was rate matched in the portion of the rate matching resource 1202 and then receive and decode the data channel 1201.

Through an additional configuration, the BS may dynamically notify whether to perform rate matching on the data channel in the portion of the configured rate matching resource to the UE through DCI (corresponding to the "rate matching indicator" in the DCI format as described above). Specifically, the BS may select and group some of the configured rate matching resources into a rate matching resource group, and indicate whether to perform rate matching on the data channel for each rate matching resource group to the UE by DCI in a bitmap form. For example, when there are four rate matching resources configured, e.g., RMR #1, RMR #2, RMR #3, and RMR #4, the BS may configure rate matching groups RMG #1={RMR #1, RMR #2} and RMG #2={RMR #3, RMR #4} and use two bits in a DCI field to indicate whether to perform rate matching in each of RMG #1 and RMG #2 to the UE in a bitmap. For example, it may be indicated with "1" when the rate matching needs to be performed, and "0" when the rate matching does not need to be performed.

5G supports "RB symbol level" and "RE level" granularities for a method of configuring the UE with the rate matching resource. Specifically, it may follow the following configuration method.

RB Symbol Level

The UE may be configured with up to four RateMatchPatterns for each BWP by higher layer signaling, and one RateMatchPattern may include the following information:

for a reserved resource in a BWP, a resource configured with time and frequency resource region of the reserved resource in a combination of a symbol level bitmap and an RB level bitmap in the frequency domain may be included. The reserved resource may span one or two slots. A time domain pattern (periodicityAndPattern) in which a time and frequency region comprised of an RB-level and symbol-level bitmap pair is repeated may be additionally configured; and/or a time and frequency domain resource region configured with a CORESET in a BWP and a resource region corresponding to a time domain pattern configured with a search space configuration in which the time and frequency domain resource region is repeated may be included.

RE Level

The UE may be configured with the following configurations through higher layer signaling.

- configuration information (lte-CRS-ToMatchAround) for an RE corresponding to an LTE cell-specific reference signal or common reference signal (CRS) pattern, which may include the number of LTE CRS ports (nrofCRS-Ports), an LTE-CRS-vshift(s) value (v-shift), center subcarrier location information (carrierFreqDL) of an LTE carrier from a reference frequency point (e.g., reference point A), bandwidth size information of an LTE carrier (carrierBandwidthDL), subframe configuration information (mbsfn-SubframConfigList) corresponding to a multicast-broadcast single-frequency network (MB SFN). The UE may determine a location of a CRS in an NR slot corresponding to an LTE subframe based on the aforementioned information; and/or
- configuration information about a resource set corresponding to one or multiple zero power (ZP) CSI-RSs in a BWP.

A rate matching process on the LTE CRS will now be described in detail.

For coexistence of LTE and NR (or LTE-NR coexistence), NR provides a function to configure an NR UE with a CRS pattern of LTE. Specifically, the CRS pattern may be provided by RRC signaling including at least one parameter in a ServingCellConfig information element (IE) or a ServingCellConfigCommon IE. As an example of the parameter, there may be lte-CRS-ToMatchAround, lte-CRS-PatternList1-r16, lte-CRS-PatternList2-r16, crs-RateMatch-PerCORESETPoolIndex-r16, etc.

Rel-15 NR provides a function to configure one CRS pattern for each serving cell through the parameter lte-CRS-ToMatchAround. The function is extended to be able to configure a plurality of CRS patterns for each serving cell in Rel-16 NR. Specifically, one CRS pattern for one LTE carrier may be configured for a single transmission and reception point (TRP) configured UE, and two CRS patterns for one LTE carrier may be configured for a multi-TRP configured UE. For example, up to three CRS patterns for each serving cell may be configured for the single TRP configured UE through the parameter lte-CRS-PatternList1-r16. In another example, the multi-TRP configured UE may be configured with a CRS for each TRP. For example, a CRS pattern for TRP1 may be configured through the parameter lte-CRS-PatternList1-r16, and a CRS pattern for TRP2 may be configured through the parameter lte-CRS-PatternList2-r16. In such a case that two TRPs are configured, whether to apply both CRS patterns of the TRP1 and the TRP2 or a CRS pattern of one TRP to a particular PDSCH is determined through the parameter crs-RateMatch-PerCORESETPoolIndex-r16, in which case when the parameter crs-RateMatch-PerCORESETPoolIndex-r16 is set to "enabled," a CRS pattern of one TRP is applied, and otherwise, both CRS patterns of the two TRPs are applied.

Table 17 represents a ServingCellConfig IE including the CRS pattern, and Table 18 represents a RateMatchPatternLTE-CRS IE including at least one parameter for a CRS pattern.

TABLE 17

| | |
|---|---|
| ServingCellConfig : := | SEQUENCE { |
| tdd-UL-DL-ConfigurationDedicated | TDD-UL-DL-ConfigDedicated |
| OPTIONAL, -- Cond TDD | |
| initialDownlinkBWP | BWP-DownlinkDedicated |
| OPTIONAL, -- Need M | |
| downlinkBWP-ToReleaseList | SEQUENCE (SIZE (1..maxNrofBWPs)) OF BWP-Id |
| OPTIONAL, -- Need N | |
| downlinkBWP-ToAddModList | SEQUENCE (SIZE (1. .maxNrofBWPs)) OF BWP-Downlink |
| OPTIONAL, -- Need N | |
| firstActiveDownlinkBWP- Id | BWP-Id |
| OPTIONAL, --Cond SyncAndCellAdd | |
| bwp-InactivityTimer | ENUMERATED {ms2, ms3, ms4, ms5, ms6, ms8, ms10, ms20, ms30, ms40,ms50, ms60, ms80,ms100, ms200,ms300, ms500, ms750, ms1280, ms1920, ms2560, spare10, spare9, spare8, spare7, spare6, spare5, spare4, spare3, spare2, spare1 } |
| OPTIONAL, --Need R | |
| defaultDownlinkBWP-Id | BWP-Id |
| OPTIONAL, -- Need S | |
| uplinkConfig | UplinkConfig |
| OPTIONAL, -- Need M | |
| supplementaryUplink | UplinkConfig |
| OPTIONAL, -- Need M | |
| pdcch-ServingCellConfig | SetupRelease { PDCCR-ServingCellConfig } |
| OPTIONAL, -- Need M | |
| pdsch-ServingCellConfig | SetupRelease { PDSCH-ServingCellConfig } |
| OPTIONAL, -- Need M | |
| csi-MeasConfig | SetupRelease { CSI-MeasConfig } |
| OPTIONAL, -- Need M | |
| sCellDeactivationTimer | ENUMERATED (ms20, ms40, ms80, ms160, ms200, ms240, ms320, ms400, ms480, ms520, ms640, ms720, ms840, ms1280, spare2, spare1) OPTIONAL, -- Cond |
| ServingCellWithoutPUCCH | |
| crossCarrierSchedulingConfig | CrossCarrierSchedulingConfig |
| OPTIONAL, -- Need M | |
| tag-Id | TAG-Id, |
| dummy | ENUMERATED {enabled} |
| OPTIONAL, -- Need R | |
| pathlossReferenceLinking | ENUMERATED (spCell , sCell) |
| OPTIONAL, -- Cond SCellOnly | |
| servingCellMO | MeasObjectId |
| OPTIONAL, -- Cond MeasObject | |
| ..., | |

TABLE 17-continued

```
[[
  lte-CRS-ToMatchAround                    SetupRelease { RateMatchPatternLTE-CRS }
OPTIONAL, -- Need M
  rateMatchPatternToAddModList             SEQUENCE (SIZE (1..maxNrofRateMatchPatterns)) OF RateMatchPattern
OPTIONAL, -- Need N
  rateMatchPatternToReleaseList            SEQUENCE (SIZE (1..maxNrofRateMatchPatterns)) OF RateMatchPat-
                                             ternId
OPTIONAL, -- Need N
  downlinkChannelBW-PerSCS-List            SEQUENCE (SIZE (1..maxSCSs) ) OF SCS-SpecificCarrier
OPTIONAL -- Need S
]],
[[
  supplementaryUplinkRelease               ENUMERATED (true)
OPTIONAL, -- Need N
  tdd-UL-DL-ConfiqurationDedicated-IAB-MT-r16 TDD-UL-DL-ConfigDedicated-IAB-MT-r16
OPTIONAL, -- Cond TDD_IAB
  dormantBWP, Confiq-r16                   SetupRelease ( DormantBWP-Config-r16 )
OPTIONAL, -- Need M
  ca-SlotOffset-r16                        CHOICE {
    refSCS15kHz                              INTEGER(-2..2),
    refSCS30KHz                              INTEGER(-5..5),
    refSCS60KHz                              INTEGER(-10..10),
    refSCS120KHz                             INTEGER(-20..20)
  }                                          OPTIONAL,
-- Cond AsyncCA
  channelAccessConfig-r16                  SetupRelease ( ChannelAccessConfig-r16 )
OPTIONAL, -- Need M
  intraCellGuardBandsDL-List-r16           SEQUENCE (SIZE (1..maxSCSs)) OF IntraCellGuardBandsPerSCS-r16
OPTIONAL, -- Need S
  intraCellGuardBandsUL-List-r16           SEQUENCE (SIZE (1..maxSCSs)) OF IntraCellGuardBandsPerSCS-r16
OPTIONAL, - - Need S
  csi-RS-ValidationWith-DCI-r16            ENUMERATED (enabled)
OPTIONAL, -- Need R
  lte-CRS-PatternList1-r16                 SetupRelease { LTE-CRS-PatternList-r16 }
OPTIONAL, -- Need M
  lte-CRS-PatternList2-r16                 SetupRelease { LTE-CRS-PatternList-r16 }
OPTIONAL, -- Need M
  crs-RateMatch-PerCORESETPoolIndex-r16    ENUMERATED (enabled)
OPTIONAL, -- Need R
  enableTwoDefaultTCI-States-r16           ENUMERATED (enabled)
OPTIONAL, -- Need R
  enableDefaultTCI-StatePerCoresetPoolIndex-r16 ENUMERATED {enabled}
OPTIONAL, -- Need R
  enableBeamSwitchTiming-r16               ENUMERATED (true)
OPTIONAL, -- Need R
  cbg-TxDiffTBsProcessingType1-r16         ENUMERATED {enabled}
OPTIONAL, -- Need R
  cbg-TxDiffTBsProcessingType2-r16         ENUMERATED {enabled}
OPTIONAL -- Need R
]]
}
```

TABLE 18

```
-  RateMatchPatternLTE-CRS
The IE RateMatchPatternLTE-CRS is used to configure a pattern to rate match around LTE CRS.
See TS 38.214 [19], clause 5.1.4.2.
                            RateMatchPatternLTE-CRS information element
-- ASN1START
-- TAG-RATEMATCHPATTERNLTE-CRS-START
RateMatchPatternLTE-CRS : :=       SEQUENCE {
  carrierFreqDL                      INTEGER (0..163831) ,
  carrierBandwidthDL                 ENUMERATED {n6, n15, n25, n50, n75, n100, spare2,
spare1} ,
  mbsfn-SubframeConfigList           EUTRA-MBSFN-SubframeConfigList
OPTIONAL,   -- Need M
  nrofCRS-Ports                      ENUMERATED {n1, n2, n4} ,
  v-Shift                            ENUMERATED {n0, n1, n2, n3, n4, n5}
}
LTE-CRS-PatternList-r16 : :=       SEQUENCE (SIZE (1..maxLTE-CRS-Patterns-r16) ) OF
RateMatchPatternLTE-CRS
-- TAG-RATEMATCHPATTERNLTE-CRS-STOP
-- ASN1STOP
                            RateMatchPatternLTE-CRS field descriptions
carrierBandwidthDL
BW of the LTE carrier in number of PRBs (see TS 38.214 [19], clause 5.1.4.2).
```

TABLE 18-continued carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).

Figure 13:
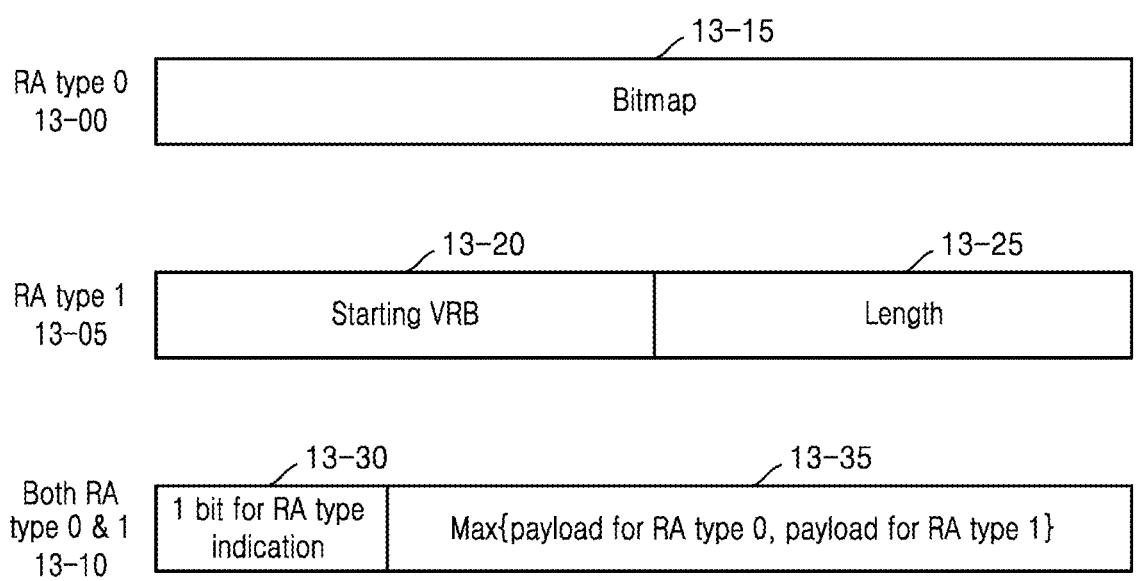
FIG. 13 illustrates an example of frequency domain resource allocation of a physical downlink shared channel (PDSCH) in a wireless communication system according to an embodiment of the present disclosure.

FIG. 13 illustrates an example of PDSCH frequency domain resource allocation in a wireless communication system, according to an embodiment of the disclosure.

Specifically, FIG. 13 shows three frequency domain resource allocation methods, which are type 0 13-00, type 1 13-05, and dynamic switching 13-10, which are configurable through a higher layer in NR wireless communication system.

Referring to FIG. 13, when the UE is configured by higher layer signaling to use resource type 0 only (13-00), some DCI to allocate a PDSCH for the UE has a bitmap including NRBG bits. Conditions for this will be described later. The NRGB refers to the number of resource block groups (RBGs) determined as in Table 19 below according to a size of a BWP allocated by the BWP indicator and an upper layer parameter rbg-Size, and data is transmitted in an RBG represented by 1 based in the bitmap.

TABLE 19

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured by higher layer signaling to use resource type 1 only (13-05), some DCI to allocate a PDSCH for the UE includes frequency domain resource allocation information including $[\log_2(N_{RB}^{DL,BWP}(N_{RB}^{DL,BWP}+1)/2)]$ bits. Conditions for this will be described later. This may allow the BS to set a starting VRB 13-20 and length of frequency domain resources 13-25 successively allocated from the starting VRB 6-20.

When the UE is configured to use both the resource type 0 and the resource type 1 through higher layer signaling (13-10), some DCI to allocate a PDSCH for the UE includes frequency domain resource allocation information in bits 13-35 corresponding to a larger one of a payload 13-15 for configuring the resource type 0 and a payload 13-20 for configuring the resource type 1. Conditions for this will be described later. In this case, one bit may be added to the most significant bit (MSB) of the frequency domain allocation information in the DCI, and when the bit has a value of "0," it indicates that the resource type 0 is used, and when the bit has a value of "1," it indicates that the resource type 1 is used. For example, when the UE is configured to use both the resource type 0 and the resource type 1 through higher layer signaling (13-10), some DCI to allocate a PDSCH for the UE may include 1-bit information (13-30) for indicating a resource allocation type.

A time domain resource allocation method for a data channel in the next generation mobile communication system (5G or NR system) will now be described.

The BS may configure the UE with a table of time domain resource allocation information for a DL data channel (physical downlink shared channel, PDSCH) and a UL data channel (physical uplink shared channel, PUSCH) by higher layer signaling (e.g., RRC signaling). For the PDSCH, a table including up to 16 (maxNrofDL-Allocations=16) entries may be configured, and for the PUSCH, a table including up to 16 (maxNrofUL-Allocations=16) entries may be configured. In an embodiment of the disclosure, the time domain resource allocation information may include PDCCH-to-PDSCH slot timing (corresponding to a time interval in slots between PDCCH reception time and PDSCH transmission time scheduled on the received PDCCH, and denoted as K0), PDCCH-to-PUSCH slot timing (corresponding to a time interval in slots between PDCCH reception time and PUSCH transmission time scheduled on the received PDCCH, and denoted as K2), information about location and length of a start symbol scheduled on the PDSCH or the PUSCH in the slot, a mapping type of PDSCH or PUSCH, etc. For example, information as in Table 20 or Table 21 below may be transmitted from the BS to the UE.

TABLE 20

PDSCH-TimeDomainResourceAllocationList information element
PDSCH-TimeDomainResourceAllocationList : := SEQUENCE (SIZE (1. .maxNrofDL-Allocations) ) OF PDSCH-
TimeDomainResourceAllocation
PDSCH-TimeDomainResourceAllocation : :=  SEQUENCE {
  k0                              INTEGER(0. .32)                          OPTIONAL, --
Need S
  mappingType                     ENUMERATED {typeA, typeB} ,
  startSymbolAndLength            INTEGER (0. .127)
}

TABLE 21

PUSCH-TimeDomainResourceAllocation information element
PUSCH-TimeDomainResourceAllocationList : := SEQUENCE (SIZE(1. .maxNrofUL-Allocations) ) OF PUSCH-
TimeDomainResourceAllocation
PUSCH-TimeDomainResourceAllocation : := SEQUENCE {

TABLE 21-continued

| | | |
|---|---|---|
| k2 | INTEGER(0. .32) | OPTIONAL, --Need S |
| mappingType | ENUMERATED {TypeA, typeB} , | |
| startSymbolAndLength | INTEGER (0. .127) | |
| } | | |

The BS may notify the UE of at least one of the entries in the table about the time domain resource allocation information by L1 signaling (e.g., in DCI, especially in a "time domain resource allocation" field in the DCI). The UE may obtain the time domain resource allocation information for the PDSCH or the PUSCH based on the DCI received from the BS.

Figure 14:
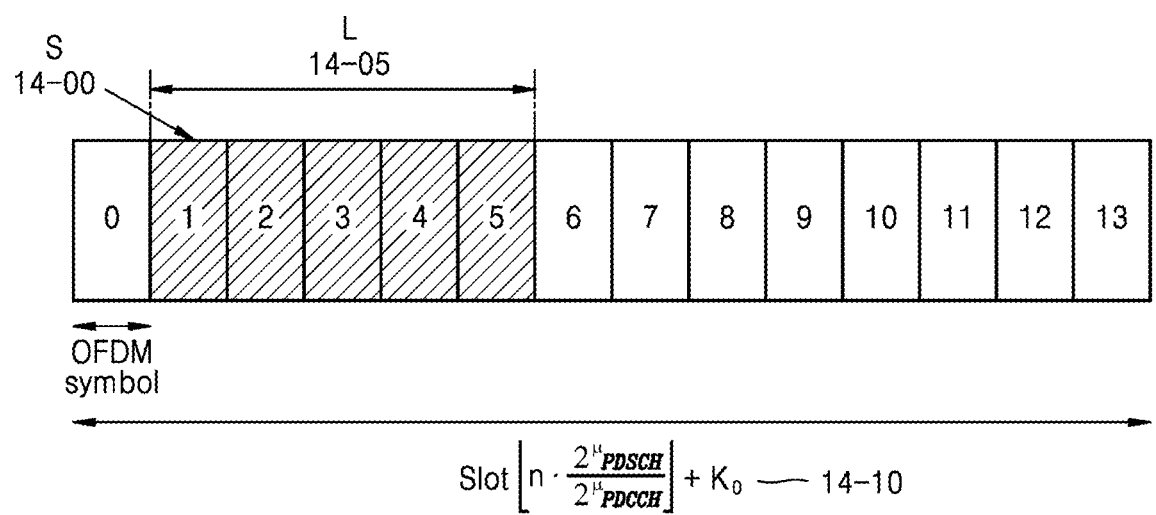
FIG. 14 illustrates an example of time domain resource allocation of a PDSCH in a wireless communication system according to an embodiment of the present disclosure.

FIG. 14 illustrates an example of PDSCH time domain resource allocation in a wireless communication system according to an embodiment of the present disclosure.

Referring to FIG. 14, the BS may indicate a position of a PDSCH resource in the time domain based on subcarrier spacings (SCSs) ($\mu_{PDSCH}$, $\mu_{PDCCH}$) on a data channel and a control channel and a scheduling offset $K_0$, which are configured using a higher layer, and a starting position 14-00 and length 14-05 of OFDM symbols in a slot dynamically indicated in DCI.

Figure 15:
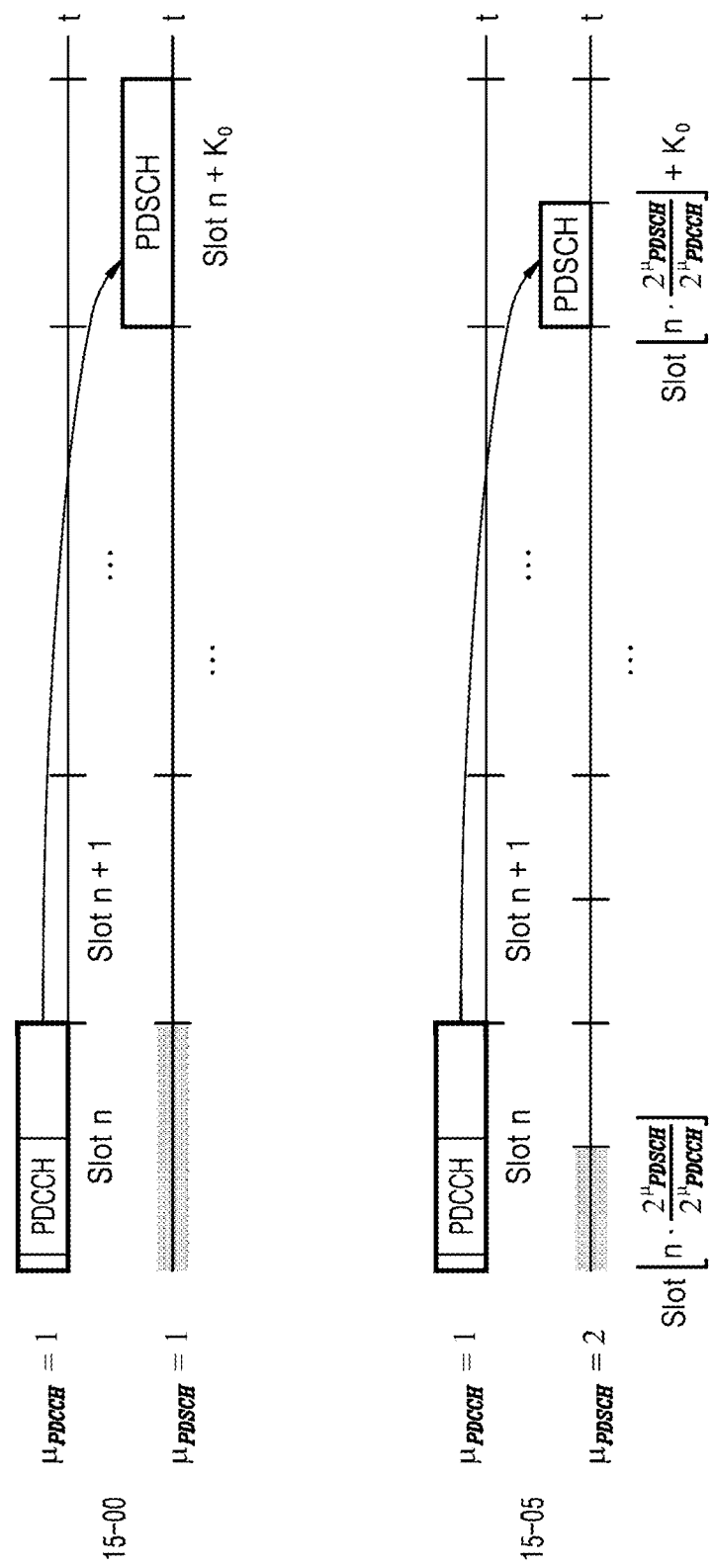
FIG. 15 illustrates an example of time domain resource allocation based on subcarrier spacing (SCS) on a data channel and a control channel in a wireless communication system according to an embodiment of the present disclosure.

FIG. 15 illustrates an example of time domain resource allocation based on SCS of a data channel and a control channel in a wireless communication system according to an embodiment of the present disclosure.

Referring to FIG. 15, when the data channel and the control channel have the same SCS 15-00 ($\mu_{PDSCH}=\mu_{PDCCH}$), slot numbers are the same for data and control, so the BS and the UE may generate a scheduling offset to match the preset slot offset $K_0$. On the other hand, when the data channel and the control channel have different SCSs 15-05 ($\mu_{PDSCH}\neq\mu_{PDCCH}$), slot numbers are different for data and control, so the BS and the UE may generate a scheduling offset to match the preset slot offset K0 based on the SCS of the PDCCH.

[PDSCH Processing Time]

Next, a PDSCH processing procedure time will be described. When the BS schedules to transmit a PDSCH to the UE by using DCI format 1_0, 1_1 or 1-2, the UE may need a PDSCH processing time to receive the PDSCH by applying a transmission method (a modulation/demodulation and coding indicator index (MCS), information relating to a demodulation reference signal, time and frequency resource allocation information, etc.) indicated by DCI. Taking this into account, NR has defined a PDSCH processing time. The PDSCH processing time of the UE may follow the following equation 3:

[Equation 3]

$$T_{proc,1}=(N_1+d_{1,1}+d_2)(2048+144) K2^{-\mu}T_c+T_{ext}$$

Variables in $T_{proc,1}$ expressed in equation 3 may have the following meanings:

$N_1$: the number of symbols determined according to UE processing capability 1 or 2 and numerology μ. It may have a value in Table 22 when the UE capability 1 is reported in a UE capability report, and a value in Table 23 when the UE capability 2 is reported in the UE capability report and the UE capability 2 is configured as being available by higher layer signaling. The numerology μ may correspond to the smallest of $\mu_{PDCCH}$, $\mu_{PDSCH}$, and $\mu_{UL}$ to maximize $T_{proc,1}$, and $\mu_{PDCCH}$, $\mu_{PDSCH}$, and $\mu_{UL}$ may refer to numerology of the PDCCH that schedules the PDSCH, a numerology of the scheduled PDSCH, and a numerology of a UL channel on which to transmit HARQ-ACK, respectively.

TABLE 22

PDSCH processing time for PDSCH processing capability 1

| | PDSCH decoding time $N_1$ [symbols] | |
|---|---|---|
| μ | Both PDSCH mapping types A and B are dmrs-AdditionalPosition = pos0 in higher layer signaling DMRS-DownlinkConfig | Both PDSCH mapping types A and B are not dmrs-AdditionalPosition = pos0 in higher layer signaling DMRS-DownlinkConfig or higher layer parameter is not configured |
| 0 | 8 | $N_{1,0}$ |
| 1 | 10 | 13 |
| 2 | 17 | 20 |
| 3 | 20 | 24 |

TABLE 23

PDSCH processing time for PDSCH processing capability 2

| $\mu$ | PDSCH decoding time $N_1$ [symbols] Both PDSCH mapping types A and B are dmrs-AdditionalPosition = pos0 in higher layer signaling DMRS-DownlinkConfig |
|---|---|
| 0 | 3 |
| 1 | 4.5 |
| 2 | 9 for frequency range 1 |

K:64;

Text: when the UE uses a shared spectrum channel access scheme, the UE calculates Text to be applied to the PDSCH processing time. Otherwise, Text is assumed to be 0;

N1,0 of Table 22 has a value of 14 when 11 indicating a location value of a PDSCH DMRS is 12, and a value of 13 otherwise;

for PDSCH mapping type A, the last symbol of the PDSCH is i-th symbol in a slot in which the PDSCH is transmitted, and d1,1 is 7-i when i<7, and 0 otherwise; and/or d2: when a PUCCH having a high priority index and a PUCCH or PUSCH having a low priority index overlap in time, d2 of the PUCCH having the high priority index may be set to a value reported from the UE. Otherwise, d2 is 0.

When PDSCH mapping type B is used for UE processing capability 1, a value of d1,1 may be determined according to the number L of symbols of the scheduled PDSCH and the number d of overlapping symbols between the scheduling PDCCH and the scheduled PDSCH as follows:

when L≥7, d1,1=0;
when L≥4 and L≤6, d1,1=7-L;
when L=3, d1,1=min (d, 1); and/or
when L=2, d1,1=3+d.

When PDSCH mapping type B is used for UE processing capability 2, a value of d1,1 may be determined according to the number L of symbols of the scheduled PDSCH and the number d of overlapping symbols between the scheduling PDCCH and the scheduled PDSCH as follows:

when L≥7, d1,1=0;
when L≥4 and L≤6, d1,1=7- L;
when L=2;
when the scheduling PDCCH is present in a CORESET comprised of three symbols and the CORESET and the scheduled PDSCH have the same starting symbol, d1,1=3;
otherwise, d1,1=d; and/or
for the UE that supports capability 2 in a given serving cell, a PDSCH processing time according to the UE processing capability 2 may be applied when higher layer signaling for the cell, processingType2Enabled, is set to "enabled."

When a position of the first UL transmission symbol of a PUCCH including HARQ-ACK information (K1 defined as a transmission point in time of the HARQ-ACK, a PUCCH resource used for HARQ-ACK transmission, and a timing advance effect may be taken into account for the position of the first UL transmission symbol) is not started earlier than the first UL transmission symbol that comes in a time of Tproc,1 after the last symbol of the PDSCH, the UE needs to transmit a valid HARQ-ACK message. In other words, the UE needs to transmit a PUCCH including HARQ-ACK only when the PDSCH processing time is sufficient. Or else, the UE may not provide valid HARQ-ACK corresponding to the scheduled PDSCH to the BS. Tproc, 1 may be used for both normal and extended CP. For a PDSCH having two PDSCH transmission positions in one slot, d1,1 is calculated based on the first PDSCH transmission position in the slot.

Next, a PDSCH reception preparation time of the UE, $N_{pdsch}$, defined for a time gap between the PDCCH and the PDSCH will be described for cross-carrier scheduling where the numerology $\mu_{PDCCH}$ for transmitting the scheduling PDCCH and the numerology $\mu_{PDSCH}$ for transmitting the scheduled PDSCH are different.

When $\mu_{PDCCH} < \mu_{PDSCH}$, the scheduled PDSCH may be transmitted earlier than the first symbol of a slot that comes after $N_{pdsch}$ symbols from the last symbol of the PDCCH that schedules the PDSCH. The PDSCH transmission symbol may include a DMRS.

When $\mu_{PDCCH} > \mu_{PDSCH}$, the scheduled PDSCH may be transmitted after $N_{pdsch}$ symbols from the last symbol of the PDCCH that schedules the PDSCH. The PDSCH transmission symbol may include a DMRS.

TABLE 24

$N_{pdsch}$ according to scheduled PDCCH SCS

| $\mu_{PDCCH}$ | $N_{pdsch}$ [symbols] |
|---|---|
| 0 | 4 |
| 1 | 5 |
| 2 | 10 |
| 3 | 14 |

Next, a beam configuration method for a PDSCH will be described.

Figure 16:
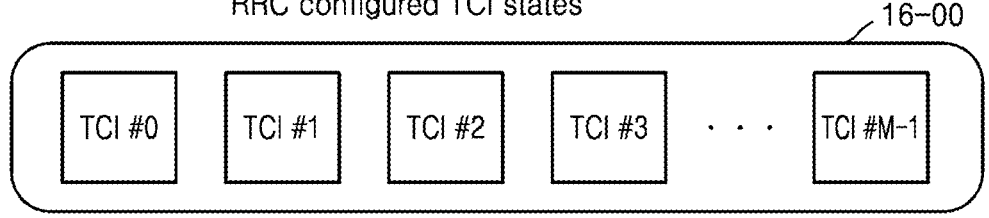
FIG. 16 illustrates a procedure for beam configuration and activation for a PDSCH according to an embodiment of the present disclosure.
Figure 16:
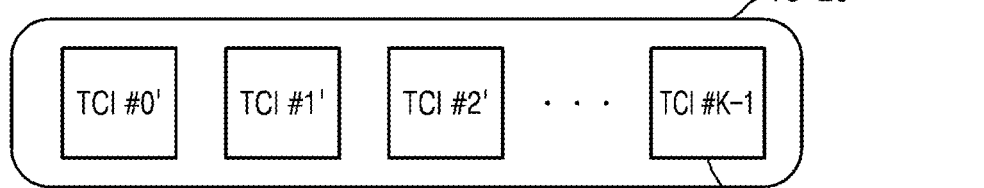
Figure 16:
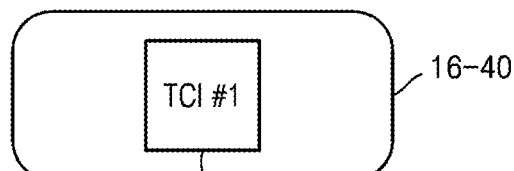

FIG. 16 illustrates a procedure for beam configuration and activation for a PDSCH.

In operation 16-00, a TCI state list for a PDSCH may be indicated through a higher layer list such as RRC. The TCI state list may be indicated, e.g., by tci-StatesToAddModList and/or tci-StatesToReleaseList in a PDSCH-Config IE for each BWP.

In operation 16-20, some TCI states in the TCI state list may be activated through an MAC CE. The maximum number of TCI states to be activated may be determined by a capability reported by the UE.

In operation 16-40, a TCI state for a PDSCH may be determined according to DCI based beam selection.

FIG. 16 illustrates an example of an MAC CE structure 16-50 for PDSCH TCI state activation/deactivation.

Meaning and configurable values of each field in the MAC CE are as follows:

---

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;

T$_i$ (TCI state ID): If there is a TCI state with TCI-StateId i as specified in TS 38.331 [5], this field indicates
the activation/deactivation status of the TCI state with TCI-StateId i, otherwise MAC entity shall ignore the
Ti field. The Ti field is set to 1 to indicate that the TCI state with TCI-StateId i shall be activated and mapped
to the codepoint of the DCI Transmission Configuration Indication field, as specified in TS 38.214 [7]. The Ti
field is set to 0 to indicate that the TCI state with TCI-StateId i shall be deactivated and is not mapped to the
codepoint of the DCI Transmission Configuration Indication field. The codepoint to which the TCI State is
mapped is determined by its ordinal position among all the TCI States with Ti field set to 1, i.e. the first TCI
State with T$_i$ field set to 1 shall be mapped to the codepoint value 0, second TCI State with Ti field set to 1
shall be mapped to the codepoint value 1 and so on. The maximum number of activated TCI states is 8;
CORESET Pool ID: This field indicates that mapping between the activated TCI states and the codepoint of
the DCI Transmission Configuration Indication set by field Ti is specific to the ControlResourceSetId
configured with CORESET Pool ID as specified in TS 38.331 [5]. This field set to 1 indicates that this MAC
CE shall be applied for the DL transmission scheduled by CORESET with the CORESET pool ID equal to
1, otherwise, this MAC CE shall be applied for the DL transmission scheduled by CORESET pool ID equal
to 0. If the coresetPoolIndex is not configured for any CORESET, MAC entity shall ignore the CORESET
Pool ID field in this MAC CE when receiving the MAC CE. If the Serving Cell in the MAC CE is configured
in a cell list that contains more than one Serving Cell, the CORESET Pool ID field shall be ignored when
receiving the MAC CE.

---

A UL channel estimation method based on sounding reference signal (SRS) transmission of the UE will now be described. The BS may configure the UE with at least one SRS configuration for each UL BWP to send configuration information for SRS transmission, and at least one SRS resource set for each SRS configuration. For example, the BS and the UE may exchange the following higher layer signaling information to send information about the SRS resource set:
  srs-ResourceSetId: SRS resource set index;
  srs-ResourceIdList: a set of SRS resource indexes referred to from the SRS resource set;
  resourceType: time domain transmission configuration of an SRS resource referred to from the SRS resource set, which may be set to one of "periodic," "semi-persistent," and "aperiodic." When it is configured to be "periodic" or "semi-persistent," associated CSI-RS information may be provided depending on the usage of the SRS resource set. When it is configured to be "aperiodic," an aperiodic SRS resource trigger list and slot offset information may be provided and associated CSI-RS information may be provided depending on the usage of the SRS resource set;
  usage: a configuration of usage of an SRS resource referred to from the SRS resource set, which may be set to one of "beamManagement," "codebook," "nonCodebook," and "antennaSwitching"; and/or
  alpha, p0, pathlossReferenceRS, srs-PowerControlAdjustmentStates: provides a parameter configuration for transmission power control of an SRS resource referred to from the SRS resource set.

The UE may interpret that an SRS resource included in a set of SRS resource indexes referred to from the SRS resource set follows information configured for the SRS resource set.

Furthermore, the BS and the UE may transmit or receive higher layer signaling information for delivering individual configuration information for an SRS resource. For example, the individual configuration information for the SRS resource may include time-frequency domain mapping information in a slot of the SRS resource, which may include information about intra-slot or inter-slot frequency hopping of the SRS resource. Furthermore, the individual configuration information for the SRS resource may include a time domain transmission configuration of the SRS resource, which may be set to one of "periodic," "semi-persistent," and "aperiodic." This may be limited to having the same time domain transmission configuration as the SRS resource set to which the SRS resource belongs. When the time domain transmission configuration of the SRS resource is set to "periodic" or "semi-persistent," additional SRS resource transmission periodicity and slot offset (e.g., periodicityAndOffset) may be included in the time domain transmission configuration.

The BS may activate or deactivate, or trigger SRS transmission to the UE through higher layer signaling including RRC signaling or MAC CE signaling, or L1 signaling (e.g., DCI). For example, the BS may activate or deactivate periodic SRS transmission to the UE through higher layer signaling. The BS may indicate activation of an SRS resource set with resourceType set to "periodic" through higher layer signaling, and the UE may transmit an SRS resource referred to from the activated SRS resource set. Time-frequency domain resource mapping of the SRS resource to be transmitted in a slot follows resource mapping information configured for the SRS resource, and slot mapping including transmission periodicity and slot offset follows periodicityAndOffset configured for the SRS resource. Furthermore, a spatial domain transmission filter applied to the SRS resource for transmission may refer to spatial relation info configured for the SRS resource or associated CSI-RS information configured for the SRS resource set to which the SRS resource belongs. The UE may transmit the SRS resource in a UL BWP activated for the periodic SRS resource activated by higher layer signaling.

For example, the BS may activate or deactivate semi-persistent SRS transmission to the UE through higher layer signaling. The BS may indicate activation of an SRS resource set through MAC CE signaling, and the UE may transmit an SRS resource referred to from the activated SRS resource set. The SRS resource set activated through MAC CE signaling may be limited to an SRS resource set with the resourceType set to "semi-persistent." Intra-slot time-frequency domain resource mapping of the SRS resource for transmission follows resource mapping information configured for the SRS resource, and slot mapping including transmission periodicity and slot offset follows periodicityAndOffset configured for the SRS resource.

Furthermore, a spatial domain transmission filter applied to the SRS resource for transmission may refer to spatial relation info configured for the SRS resource or associated CSI-RS information configured for the SRS resource set to which the SRS resource belongs. When spatial relation info is configured for the SRS resource, the spatial domain transmission filter may not follow the spatial relation info but may be determined by referring to configuration information about spatial relation info delivered through MAC CE signaling that activates semi-persistent SRS transmission. The UE may transmit the SRS resource in a UL BWP activated for the semi-persistent SRS resource activated by higher layer signaling.

For example, the BS may trigger aperiodic SRS transmission to the UE through DCI. The BS may indicate one of aperiodic SRS resource triggers (aperiodicSRS-Resource-Trigger) in an SRS request field of DCI. The UE may interpret that an SRS resource set including the aperiodic SRS resource triggers indicated by the DCI in the aperiodic SRS resource trigger list among configuration information of the SRS resource set has been triggered. The UE may transmit an SRS resource referred to from the triggered SRS resource set. Intra-slot time-frequency domain resource mapping of the SRS resource for transmission follows resource mapping information configured for the SRS resource.

Furthermore, slot mapping of the SRS resource for transmission may be determined by a slot offset between a PDCCH including the DCI and the SRS resource, which may refer to a value (or values) included in a slot offset set configured for the SRS resource set. Specifically, for the slot offset between the PDCCH including the DCI and the SRS resource, a value indicated in a time domain resource assignment field of the DCI among offset value(s) included in the slot offset set configured for the SRS resource set may be applied. Furthermore, a spatial domain transmission filter applied to the SRS resource for transmission may refer to spatial relation info configured for the SRS resource or associated CSI-RS information configured for the SRS resource set to which the SRS resource belongs. The UE may transmit the SRS resource in a UL BWP activated for the aperiodic SRS resource triggered by the DCI.

When the BS triggers aperiodic SRS transmission to the UE by DCI, a minimum time interval between a PDCCH including the DCI that triggers the aperiodic SRS transmission and an SRS to be transmitted may be required for the UE to transmit the SRS by applying configuration information for the SRS resource. The time interval for SRS transmission of the UE may be defined with the number of symbols between the last symbol of the PDCCH including the DCI that triggers the aperiodic SRS transmission and the first symbol to which an SRS resource to be transmitted for the first time among SRS resource(s) is mapped. The minimum time interval may be determined by referring to PUSCH preparation procedure time required for the UE to prepare PUSCH transmission.

Furthermore, the minimum time interval may have a different value depending on the usage of the SRS resource set including the SRS resource to be transmitted. For example, the minimum time interval may be determined to be N2 symbols defined by referring to a PUSCH preparation procedure time and considering a UE processing capability based on the UE capability. Moreover, in consideration of the usage of the SRS resource set including the SRS resource to be transmitted, the minimum time interval may be determined to have N2 symbols when the usage of the SRS resource set is set to "codebook" or "antennaSwitching," and the minimum time interval may be determined to have N2+14 symbols when the usage of the SRS resource set is set to "nonCodebook" or "beamManagement." The UE may transmit an aperiodic SRS when the time interval for aperiodic SRS transmission is equal to or greater than the minimum time interval, and may ignore the DCI that triggers the aperiodic SRS when the time interval for aperiodic SRS transmission is smaller than the minimum time interval.

TABLE 25

```
SRS-Resource ::=                    SEQUENCE {
    srs-ResourceId                      SRS-ResourceId,
    nrofSRS-Ports                       ENUMERATED {port1, ports2, ports4},
    ptrs-PortIndex                                  ENUMERATED {n0, n1 }
OPTIONAL,    --Need R
    transmissionComb                    CHOICE {
        n2                                  SEQUENCE {
            combOffset-n2                       INTEGER (0..1),
            cyclicShift-n2                      INTEGER (0..7)
        },
        n4                                  SEQUENCE {
            combOffset-n4                       INTEGER (0..3),
            cyclicShift-n4                      INTEGER (0..11)
        }
    },
    resourceMapping                     SEQUENCE {
        startPosition                       INTEGER (0..5),
        nrofSymbols                         ENUMERATED {n1, n2, n4},
        repetitionFactor                    ENUMERATED {n1, n2, n4}
    },
    freqDomainPosition              INTEGER (0..67),
    freqDomainShift                 INTEGER (0..268),
    freqHopping                     SEQUENCE {
        c-SRS                               INTEGER (0..63),
        b-SRS                               INTEGER (0..3),
        b-hop                               INTEGER (0..3)
    },
    groupOrSequenceHopping              ENUMERATED { neither, groupHopping,
sequenceHopping },
    resourceType                    CHOICE {
        aperiodic                           SEQUENCE {
            ...
        },
        semi-persistent                     SEQUENCE {
            periodicityAndOffset-sp             SRS-PeriodicityAndOffset,
            ...
        },
```

TABLE 25-continued

```
    periodic                    SEQUENCE {
        periodicityAndOffset-p          SRS-PeriodicityAndOffset,
        ...
    }
  },
  sequenceId                    INTEGER (0..1023),
  spatialRelationInfo                   SRS-SpatialRelationInfo
OPTIONAL,  -- Need R
  ...
}
```

Configuration information of spatialRelationInfo in Table 25 is to refer to one reference signal and apply beam information of the reference signal to a beam used for the SRS transmission. For example, the configuration of spatialRelationInfo may include information as in Table 26 below.

TABLE 26

```
SRS-SpatialRelationInfo ::=     SEQUENCE {
    servingCellId       ServCellIndex       OPTIONAL,  -- Need S
    referenceSignal     CHOICE {
        ssb-Index           SSB-Index,
        csi-RS-Index        NZP-CSI-RS-ResourceId,
        srs                 SEQUENCE {
            resourceId          SRS-ResourceId,
            uplinkBWP           BWP-Id
        }
    }
}
```

Referring to the spatialRelationInfo configuration, an SS/PBCH block index, a CSI-RS index or an SRS index may be set as an index of a reference signal to be referred to so as to use beam information of a particular reference signal. Higher layer signaling referenceSignal is configuration information indicating whether to refer to beam information of a reference signal for the SRS transmission, ssb-index refers to an index of an SS/PBCH, csi-RS-index refers to an index of a CSI-RS, and srs refers to an index of an SRS. When a value of the higher layer signaling referenceSignal is set to "ssb-Index," the UE may apply a receive beam that has been used to receive an SS/PBCH block corresponding to the ssb-index for a transmission beam for corresponding SRS transmission. When a value of the higher layer signaling referenceSignal is set to "csi-RS-Index," the UE may apply a receive beam that has been used to receive a CSI-RS corresponding to the csi-RS-index for a transmission beam for corresponding SRS transmission. When a value of the higher layer signaling referenceSignal is set to "srs," the UE may apply a transmission beam that has been used to transmit an SRS corresponding to the srs for a transmission beam for corresponding SRS transmission.

A PUSCH transmission scheduling scheme will now be described. PUSCH transmission may be dynamically scheduled by UL grant in DCI, or operated by configured grant Type 1 or Type 2. Dynamic scheduling indication for PUSCH transmission may be indicated by DCI format 0_0 or 0_1.

Configured grant Type 1 PUSCH transmission may be semi-statically configured not by receiving UL grant in DCI but by receiving configuredGrantConfig including rrc-ConfiguredUplinkGrant of Table 27 through higher layer signaling. Configured grant Type 2 PUSCH transmission may be semi-persistently scheduled by UL grant in DCI after reception of configuredGrantConfig that does not include rrc-ConfiguredUplinkGrant of Table 27 through higher layer signaling. When the PUSCH transmission is operated by configured grant, parameters applied to the PUSCH transmission are applied through higher layer signaling configuredGrantConfig of Table 27 with the exception of dataScramblingIdentityPUSCH, txConfig, codebookSubset, maxRank, scaling of UCI-OnPUSCH provided by higher layer signaling, pusch-Config of Table 28. When the UE receives transformPrecoder in higher layer signaling configuredGrantConfig of Table 27, the UE applies tp-pi2BPSK in pusch-Config of Table 28 for the PUSCH transmission operated by the configured grant.

TABLE 27

```
ConfiguredGrantConfig ::=   SEQUENCE {
    frequencyHopping            ENUMERATED (intraSlot, InterSlot)
OPTIONAL,  -- Need S,
    cg-DMRS-Configuration       DMRS-UplinkConfig,
    mcs-Table                   ENUMERATED {qam256, qam64LowSE}
OPTIONAL,  -- Need S
    mcs-TableTransformPrecoder  ENUMERATED {qam256, qam64LowSE}
OPTIONAL,  -- Need S
    uci-OnPUSCH                 SetupRelease { CG-UCI-OnPUSCH }
OPTIONAL,  -- Need M
    resourceAllocation          ENUMERATED { resourceAllocationType0, resourceAllocationType1, dynamicSwitch },
    rbg-Size                    ENUMERATED {config2}
OPTIONAL,  -- Need S
    powerControlLoopToUse       ENUMERATED {n0, n1},
    p0-PUSCH-Alpha              P0-PUSCH-AlphaSetId,
    transformPrecoder           ENUMERATED {enabled, disabled}
OPTIONAL,  -- Need S
    nrofHARQ-Processes          INTEGER(1..16),
    repK                        ENUMERATED {n1, n2, n4, n8},
    repK-RV                     ENUMERATED {s1-0231, s2-0303, s3-0000}
OPTIONAL,  -- Need R
    periodicity                 ENUMERATED {
```

TABLE 27-continued

|  |  |
|---|---|
| sym10x14, sym16x14, sym20x14,<br>sym160x14, sym256x14, sym320x14, sym512x14,<br>sym5120x14,<br>sym16x12, sym16x12, sym20x12, sym32x12,<br>sym256x12, sym320x12, sym512x12, sym640x12,<br>}, | sym2, sym7, sym1x14, sym2x14, sym4x14, sym5x14, sym8x14,<br>sym32x14, sym40x14, sym64x14, sym80x14, sym128x14,<br>sym640x14, sym1024x14, sym1280x14, sym2560x14,<br>sym6, sym1x12, sym2x12, sym4x12, sym5x12, sym8x12,<br>sym40x12, sym64x12, sym80x12, sym128x12, sym160x12,<br>sym1280x12, 2560x12 |
| configuredGrantTimer<br>OPTIONAL, -- Need R | INTEGER (1..64) |
| rrc-ConfiguredUplinkGrant | SEQUENCE { |
| timeDomainOffset | INTEGER (0..5119), |
| timeDomainAllocation | INTEGER (0..15), |
| frequencyDomainAllocation | BIT STRING (SIZE(18)), |
| antennaPort | INTEGER (0..31), |
| dmrs-SeqInitialization<br>OPTIONAL, -- Need R | INTEGER (0..1) |
| precodingAndNumberOfLayers | INTEGER (0..63), |
| srs-ResourceIndicator<br>OPTIONAL, -- Need R | INTEGER (0..15) |
| mcsAndTBS | INTEGER (0..31), |
| frequencyHoppingOffset<br>OPTIONAL, -- Need R | INTEGER (1..maxNrofPhysicalResourceBlocks-1) |
| pathlossReferenceIndex<br>...<br>}<br>OPTIONAL, -- Need R<br>...<br>} | INTEGER (0..maxNrofPUSCH-PathlossReferenceRSs-1), |

A PUSCH transmission method will now be described. A DMRS antenna port for PUSCH transmission is identical to an antenna port for SRS transmission. PUSCH transmission may follow a codebook based transmission method or a non-codebook based transmission method depending on whether a value of txConfig in higher layer signaling pusch-Config of Table 28 is "codebook" or "nonCodebook."

As described above, PUSCH transmission may be dynamically scheduled by DCI format 0_0 or 0_1, or semi-statically configured by the configured grant. When the UE receives an indication of scheduling of PUSCH transmission by DCI format 0_0, the UE performs beam configuration for PUSCH transmission by using pucch-spatialRelationInfoID corresponding to a UE-specific PUCCH resource corresponding to a smallest ID in an activated UL BWP in the serving cell, in which case the PUSCH transmission is based on a single antenna port. The UE does not expect scheduling for the PUSCH transmission by DCI format 0_0 in a BWP in which a PUCCH resource including pucch-spatialRelationInfo is not configured. When the UE is not configured with txConfig in the pusch-Config of Table 28, the UE does not expect to be scheduled in DCI format 0_1.

TABLE 28

| | |
|---|---|
| PUSCH-Config ::= | SEQUENCE { |
| dataScramislingIdentityPUSCH<br>OPTIONAL, -- Need S | INTEGER (0..1023) |
| txConfig<br>OPTIONAL, -- Need S | ENUMERATED {codebook, nonCodebook} |
| dmrs-UplinkForPUSCH-Mapping-TypeA<br>OPTIONAL, -- Need M | SetupRelease { DMRS-UplinkConfig } |
| dmrs-UplinkForPUSCH-Mapping-TypeB<br>OPTIONAL, -- Need M | SetupRelease { DMRS-UplinkConfig } |
| pusch-PowerControl<br>OPTIONAL, -- Need M | PUSCH-PowerControl |
| frequencyHopping<br>OPTIONAL, -- Need S | ENUMERATED {intraSlot, interSlot} |
| frequencyHoppingOffsetLists<br>OPTIONAL, -- Need M | SEQUENCE (SIZE (1..4)) OF INTEGER (1..maxNrofPhysicalResourceBlocks-1) |
| resourceAllocation | ENUMERATED { resourceAllocationType0, |
| dynamicSwitch), | resourceAllocationType1, |
| pusch-TimeDomainAllocationList<br>OPTIONAL, -- Need M | SetupRelease {PUSCH-TimeDomainResourceAllocationList } |
| pusch-AggregationFactor<br>OPTIONAL, -- Need S | ENUMERATED { n2, n4, n8 } |
| mcs-Table<br>OPTIONAL, -- Need S | ENUMERATED {qam256, qam64lowSE} |
| mcs-TableTransformPrecoder<br>OPTIONAL, -- Need S | ENUMERATED {qam256, qam64LowSE} |

TABLE 28-continued

| | | |
|---|---|---|
| transformPrecoder OPTIONAL, -- Need S | ENUMERATED {enabled, disabled} | |
| codebookSubset partialAndNonCoherent,nonCoherent} | ENUMERATED {fullyAndPartialAndNonCoherent, | OPTIONAL, |
| -- Cond codebookBased maxRank | INTEGER (1..4) | OPTIONAL, |
| -- Cond codebookBased rbg-Size OPTIONAL, -- Need S | ENUMERATED { config2} | |
| uci-OnPUSCH OPTIONAL, -- Need M | SetupRelease { UCI-OnPUSCH} | |
| tp-pi2BP5K OPTIONAL, -- Need S ... } | ENUMERATED {enabled} | |

Codebook based PUSCH transmission will now be described. Codebook based PUSCH transmission may be dynamically scheduled by DCI format 0_0 or 0_1, or semi-statically operated by the configured grant. When the codebook based PUSCH transmission is dynamically scheduled by DCI format 0_1 or semi-statically configured by the configured grant, the UE determines a precoder for PUSCH transmission based on an SRS resource indicator (SRI), a transmission precoding matrix indicator (TPMI), and a transmission rank (the number of PUSCH transmission layers).

The SRI may be given by a field in DCI, SRS resource indicator, or configured by higher layer signaling srs-ResourceIndicator. The UE may be configured with at least one and up to two SRS resources for codebook based PUSCH transmission. When the UE receives the SRI by DCI, an SRS resource indicated by the SRI refers to an SRS resource corresponding to the SRI among SRS resources transmitted before the PDCCH including the SRI. Furthermore, the TPMI and the transmission rank may be given by a field in the DCI, "precoding information and number of layers," or configured by higher layer signaling precodingAndNumberOfLayers. The TPMI is used to indicate a precoder to be applied for PUSCH transmission. When the UE is configured with one SRS resource, the TPMI is used to indicate a precoder to be applied in the SRS resource configured. When the UE is configured with a plurality of SRS resources, the TPMI is used to indicate a precoder to be applied in the SRS resource indicated by the SRI.

The precoder to be used for PUSCH transmission is selected from a UL codebook having the same number of antenna ports as a value of nrofSRS-Ports in higher layer singlaing SRS-Config. In the codebook based PUSCH transmission, the UE determines a codebook subset based on the TPMI and codebookSubset in higher layer signaling pusch-Config. The codebookSubset in the higher layer signaling pusch-Config may be configured as one of "fullyAndPartialAndNonCoherent," "partialAndNonCoherent," and "nonCoherent" based on the UE capability reported by the UE to the BS. When the UE reports "partialAndNonCoherent" in the UE capability, the UE does not expect that higher layer signaling, codebookSubset is configured to have a value of "fullyAndPartialAndNonCoherent." When the UE reports "nonCoherent" in the UE capability, the UE does not expect that higher layer signaling codebookSubset is configured to have a value of "fullyAndPartialAndNonCoherent" or "partialAndNonCoherent." When nrofSRS-Ports in higher layer signaling SRS-ResourceSet indicates two SRS antenna ports, the UE does not expect that higher layer signaling codebookSubset is configured to have a value of "partialAndNonCoherent."

The UE may be configured with one SRS resource set with a value of the usage in higher layer signaling SRS-ResourceSet set to "codebook," and one SRS resource in the SRS resource set may be indicated by the SRI. When several SRS resources in the SRS resource set with a value of the usage in higher layer signaling SRS-ResourceSet set to "codebook" are configured, the UE expects that nrofSRS-Ports in higher layer signaling SRS-Resource is configured to have the same value for all SRS resources.

The UE transmits, to the BS, one or multiple SRS resources included in the SRS resource set with a value of the usage set to "codebook" by higher layer signaling, and the BS selects one of the SRS resources transmitted from the UE and indicates that the UE is allowed to perform PUSCH transmission using transmission beam information of the SRS resource. In this case, for the codebook based PUSCH transmission, the SRI is used as information for selecting an index of the one SRS resource and included in DCI. Additionally, the BS may add information indicating a TPMI and a rank to be used by the UE for PUSCH transmission to the DCI. The UE uses the SRS resource indicated by the SRI to perform PUSCH transmission by applying the precoder indicated by the rank and the TPMI indicated based on the transmission beam of the SRS resource.

Non-codebook based PUSCH transmission will now be described. Non-codebook based PUSCH transmission may be dynamically scheduled by DCI format 0_0 or 0_1, or semi-statically operated by the configured grant. When at least one SRS resource in an SRS resource set with a value of the usage in higher layer signaling SRS-ResourceSet set to "nonCodebook" is configured, the UE may be scheduled for non-codebook based PUSCH transmission by DCI format 0_1.

For the SRS resource set with a value of the usage in higher layer signaling SRS-ResourceSet set to "nonCodebook," the UE may be configured with one associated non-zero power CSI-RS (NZP CSI-RS) resource. The UE may perform calculation on a precoder for SRS transmission by measuring the NZP CSI-RS resource associated with the SRS resource set. When a gap between the last reception symbol of an aperiodic NZP CSI-RS resource associated with the SRS resource set and the first symbol of aperiodic SRS transmission from the UE is less than 42 symbols, the UE does not expect updating of information about the precoder for SRS transmission.

When a value of resourceType in higher layer signaling SRS-ResourceSet is set to "aperiodic," an associated NZP CSI-RS is indicated in the field SRS request in DCI format 0_1 or 1_1. In this case, when the associated NZP CSI-RS resource is an aperiodic NZP CSI-RS resource, it indicates that there is an NZP CSI-RS associated for an occasion when the value of the field SRS request in DCI format 0_1 or 1_1 is not "00." In this case, the DCI is prevented from indicating cross carrier or cross BWP scheduling. Furthermore, when the value of the SRS request indicates the presence of an NZP CSI-RS, the NZP CSI-RS is located in a slot in which a PDCCH including the SRS request field is transmitted. In this case, TCI states configured for a scheduled subcarrier are not set to QCL-TypeD.

When a periodic or semi-persistent SRS resource set is configured, an associated NZP CSI-RS may be indicated by associatedCSI-RS in higher layer signaling SRS-ResourceSet. For non-codebook based transmission, the UE does not expect both the higher layer signaling spatialRelationInfo for an SRS resource and associatedCSI-RS in the higher layer signaling SRS-ResourceSet to be configured.

When configured with a plurality of SRS resources, the UE may determine a precoder and a transmission rank to be applied for PUSCH transmission based on the SRI indicated by the BS. In this case, the SRI may be indicated by a field in DCI, SRS resource indicator, or configured by higher layer signaling srs-ResourceIndicator. Similar to the codebook based PUSCH transmission, when the UE receives the SRI by DCI, an SRS resource indicated by the SRI refers to an SRS resource corresponding to the SRI among SRS resources transmitted before the PDCCH including the SRI. The UE may use one or more SRS resources for SRS transmission, and the maximum number of SRS resources available for simultaneous transmission in the same symbol in one SRS resource set and the maximum number of SRS resources are determined by UE capability reported by the UE to the BS. In this case, the SRS resources transmitted simultaneously by the UE occupy the same RB. The UE configures one SRS port for each SRS resource. Only one SRS resource set with a value of the usage in the higher layer signaling SRS-ResourceSet set to "nonCodebook" may be configured, and it is possible to configure up to four SRS resources for non-codebook based PUSCH transmission.

The BS transmits one NZP-CSI-RS associated with the SRS resource set to the UE, and the UE calculates a precoder to be used for transmission of one or more SRS resources in the SRS resource set based on a result of measurement during the NZP_CSI-RS reception. The UE may apply the precoder calculated to transmit one or more SRS resources in the SRS resource set with the usage set to "nonCodebook" to the BS, and the BS selects one or more of the received SRS resources. In this case, for the non-codebook based PUSCH transmission, the SRI indicates an index that may represent a combination of one or more SRS resources, and the SRI is included in DCI. The number of SRS resources indicated by the SRI transmitted from the BS may be the number of transmission layers of the PUSCH, and the UE transmits the PUSCH by applying the precoder applied for SRS resource transmission for each layer.

[PUSCH: Preparation Procedure Time]

A PUSCH preparation procedure time will now be described. When the BS schedules the UE to transmit a PUSCH using DCI format 0_0, 0_1 or 0-2, the UE may need a PUSCH preparation procedure time to transmit the PUSCH by applying a transmission method (an SRS resource transmission precoding method, the number of transmission layers, or a spatial domain transmission filter) indicated by DCI. Taking this into account, NR has defined a PUSCH preparation procedure time. The PUSCH preparation procedure time of the UE may follow the following equation 4:

[Equation 4]

$$T_{proc,2} = \max((N_2+d_{2,1}+d_2)(2048+144)\kappa 2^{-\mu}T_c+T_{ext}+T_{switch}, d2,2)$$

Variables in $T_{proc,2}$ expressed in equation 4 may have the following meanings:

N2: the number of symbols determined according to UE processing capability 1 or 2 of UE capability and numerology μ. It may have a value in Table 29 when the UE capability 1 is reported in a UE capability report, and a value in Table 30 when the UE capability 2 is reported in the UE capability report and the UE capability 2 is configured as being available by higher layer signaling.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 | d2,1: the number of symbols determined to be 0 when resource elements of the first OFDM symbol are all configured to be comprised of DMRSs, or 1 otherwise;

κ: 64;

μ: $\mu_{DL}$ or $\mu_{UL}$, which follows a value to make Tproc,2 larger. $\mu_{DL}$ refers to numerology of a DL in which a PDCCH including DCI that schedules the PUSCH is transmitted, and $\mu_{UL}$ refers to numerology of a UL in which the PUSCH is transmitted;

Tc: $1/(\Delta f_{max} \cdot N_f)$ $\Delta f_{max}=480 \cdot 10^3$ Hz, $N_f=4096$.

d2,2: follows a BWP switching time when the DCI scheduling the PUSCH indicates BWP switching, or has "0" otherwise;

d2: when OFDM symbols of a PUCCH, a PUSCH with a high priority index and a PUCCH with a low priority index overlap in time, d2 of the PUSCH with the high priority index may be used. Otherwise, d2 is 0;

Text: when the UE uses a shared spectrum channel access scheme, the UE calculates Text to be applied to the PUSCH preparation procedure time. Otherwise, Text is assumed to be 0; And/or Tswitch: Tswitch is assumed as a switching interval time when a UL switching interval is triggered. Otherwise, Tswitch is assumed to be 0.

The BS and the UE determine that the PUSCH preparation procedure time is not sufficient when the first symbol of the PUSCH starts earlier than the first UL symbol in which CP starts after $T_{proc,2}$ from the last symbol of a PDCCH including the DCI that schedules the PUSCH, in consideration of time domain resource mapping information of the PUSCH scheduled by the DCI and an influence of timing advance between the UL and the DL. Otherwise, the BS and the UE determine that the PUSCH preparation procedure time is sufficient. The UE may transmit the PUSCH only when the PUSCH preparation procedure time is sufficient, and may ignore the DCI that schedules the PUSCH when the PUSCH preparation procedure time is not sufficient.

UL data channel repetitive transmissions in the 5G system will now be described in detail. The 5G system supports two types of UL data channel repetitive transmission methods, i.e., PUSCH repetitive transmission type A and PUSCH repetitive transmission type B. The UE may be configured with one of the PUSCH repetitive transmission types A and B by higher layer signaling.

PUSCH Repetitive Transmission Type A

As described above, symbol length and a start symbol position of a UL data channel may be determined in a time domain resource allocation method in one slot, and the BS may notify the UE of the number of repetitive transmissions by higher layer signaling (e.g., RRC signaling) or L1 signaling (e.g., DCI).

The UE may repetitively transmit a UL data channel having the same configured length and start symbol of the UL data channel in successive slots based on the number of repetitive transmissions received from the BS. In this case, when a slot configured by the BS for the UE in a DL or at least one of symbols of a UL data channel configured for the UE is set to DL, the UE skips UL data channel transmission but counts the number of transmissions of the UL data channel.

PUSCH Repetitive Transmission Type B

As described above, a start symbol and length of a UL data channel may be determined in a time domain resource allocation method in one slot, and the BS may notify the UE of the number of repetitive transmissions, numberofrepetitions, by higher layer signaling (e.g., RRC signaling) or L1 signaling (e.g., DCI).

Based on the start symbol and length of the UL data channel configured earlier, nominal repetition of the UL data channel is determined as follows: A slot in which n-th nominal repetition starts is given by $$K_s + \left\lfloor \frac{S + n \cdot L}{N_{symb}^{slot}} \right\rfloor,$$

and a start symbol in the slot is given by $\mathrm{mod}(S+n\cdot L_0, N_{symb}^{slot})$. A slot in which the n-th nominal repetition ends is given by $$K_s + \left\lfloor \frac{S + (n+1) \cdot L - 1}{N_{symb}^{slot}} \right\rfloor,$$

and an end symbol in the slot is given by $\mathrm{mod}(S+(n+1)\cdot L-1, N_{symb}^{slot})$. Here, n=0, ..., numberofrepetitions-1, S denotes a start symbol of the configured UL data channel, and L denotes symbol length of the configured UL data channel. Ks denotes a slot in which the PUSCH transmission starts, and $N_{symb}^{slot}$ denotes the number of symbols per slot.

The UE determines an invalid symbol for the PUSCH repetitive transmission type B. A symbol set to DL by tdd-UL-DL-ConfigurationCommon or tdd-UL-DL-ConfigurationDedicated is determined as an invalid symbol for the PUSCH repetitive transmission type B. Furthermore, the invalid symbol may be configured in a higher layer parameter (e.g., InvalidSymbolPattern). The higher layer parameter (e.g., InvalidSymbolPattern) may provide a symbol-level bitmap spanning one or two slots to configure invalid symbols. In the bitmap "1" represents an invalid symbol. In addition, periodicity and a pattern of the bitmap may be configured in a higher layer parameter (e.g., periodicityAndPattern). When the higher layer parameter (e.g., InvalidSymbolPattern) is configured and parameter InvalidSymbolPatternIndicator-ForDCIFormat0_1 or InvalidSymbolPatternIndicator-ForDCIFormat0_2 indicates "1," the UE applies an invalid symbol pattern, and when the parameter indicates "0," the UE does not apply the invalid symbol pattern. When the higher layer parameter (e.g., InvalidSymbolPattern) is configured and the parameter InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, the UE may consider symbols other than the invalid symbol as valid symbols for each nominal repetition. When one or more valid symbols are included in each nominal repetition, the nominal repetition may include one or more actual repetitions. Each of the actual repetitions includes a set of successive valid symbols to be used for the PUSCH repetitive transmission type B in one slot.

Figure 17:
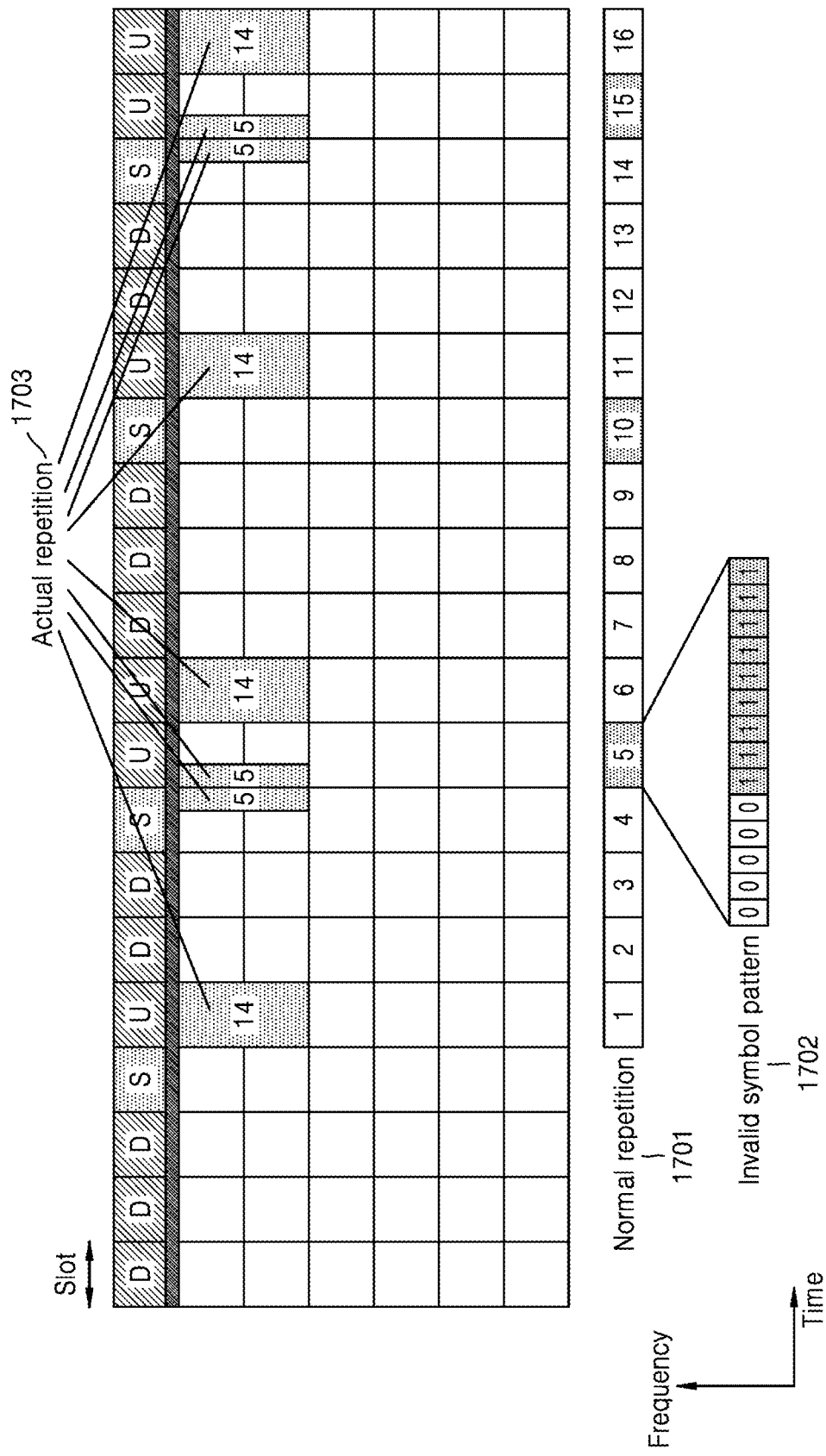
FIG. 17 illustrates an example of physical uplink shared channel (PUSCH) repetitive transmission type B in a wireless communication system according to an embodiment of the present disclosure.

FIG. 17 illustrates an example of PUSCH repetitive transmission type B in a wireless communication system according to an embodiment of the present disclosure.

The UE may be configured with a start symbol of a UL data channel as "0," length L of the UL data channel as "14," and the number of repetition times as "16." In this case, nominal repetition 1701 appears in successive 16 slots. The UE may then determine a symbol set to a DL symbol in each nominal repetition 170 as an invalid symbol. Furthermore, the UE determines symbols set to "1" in an invalid symbol pattern 1702 as invalid symbols. When there are one or more successive valid symbols in a slot other than the invalid symbol(s) in each nominal repetition, it is configured and transmitted as actual repetition 1703.

Moreover, for PUSCH repetitive transmission, the NR release 16 may define additional methods for UL-grant based PUSCH transmission and configured-grant based PUSCH transmission that cross a slot boundary as follows.

In one embodiment of method 1 (mini-slot level repetition), two or more PUSCH repetitive transmissions in one slot or across successive slots are scheduled through one UL grant. For the method 1, time domain resource allocation information in DCI indicates a resource for the first repetitive transmission. Furthermore, time domain resource information of the remaining repetitive transmissions may be determined according to the time domain resource information of the first repetitive transmission and the UL or DL direction determined for each symbol of each slot. Each repetitive transmission occupies successive symbols.

In one embodiment of method 2 (multi-segment transmission), two or more PUSCH repetitive transmissions in successive slots are scheduled through one UL grant. In this case, one transmission for each slot is designated, and each transmission may have a different start point or repetition length. In the method 2, time domain resource allocation information in DCI indicates start points and repetition lengths of all the repetitive transmissions. Furthermore, in a case that repetitive transmissions are performed in a single slot according to the method 2, when there are several groups of successive UL symbols in the slot, each repetitive transmission is performed for each of the UL symbol groups. When there is only one group of successive UL symbols in the slot, one PUSCH repetitive transmission is performed according to the method of NR release 15.

In one embodiment of method 3, two or more PUSCH repetitive transmissions in successive slots are scheduled through two or more UL grants. In this case, one transmission is designated for each slot, and the n-th UL grant may be received before the PUSCH transmission scheduled by the (n−1)-th UL grant is completed.

In one embodiment of method 4, through one UL grant or one configured grant, one or more PUSCH repetitive transmissions in a single slot or two or more PUSCH repetitive transmissions across successive slots may be supported. The number of repetitions indicated by the BS to the UE is a nominal value, and the actual number of PUSCH repetitions performed by the UE may be larger than the nominal number of repetitions. Time domain resource allocation information in DCI or configured grant refers to a resource of the first repetitive transmission indicated by the BS. The time domain resource information of the rest of repetitive transmissions may be determined by referring to at least the resource information of the first repetitive transmission and the UL or DL direction of the symbols. When the time domain resource information of the repetitive transmission indicated by the BS lies across slots or includes a UL/DL transition point, the repetitive transmission may be divided into multiple repetitive transmissions. In this case, one repetitive transmission may be included in each UL period in one slot.

Frequency hopping on a UL data channel (e.g., PUSCH) in the 5G system will now be described in detail.

5G supports two methods for each PUSCH repetitive transmission type as the frequency hopping method on a UL data channel. The PUSCH repetitive transmission type A supports intra-slot frequency hopping and inter-slot frequency hopping, and the PUSCH repetitive transmission type B supports inter-repetition frequency hopping and inter-slot frequency hopping.

The intra-slot frequency hopping method supported in the PUSCH repetitive transmission type A is a method by which the UE performs transmission by changing a resource allocated in the frequency domain by a configured frequency offset at two hops in one slot. In the intra-slot frequency hopping, a start RB at each hop may be represented in the following equation 5:

$$RB_{start} = \begin{cases} RB_{start} & i = 0 \\ (RB_{start} + RB_{offset}) \bmod N_{BWP}^{size} & i = 1 \end{cases} \quad \text{[Equation 5]}$$

In equation 5, i=0 and i=1 represent first and second hops, respectively, and $RB_{start}$ represents a start RB in a UL BWP and is calculated from the frequency resource allocation method. $RB_{offset}$ represents a frequency offset between two hops in a higher layer parameter. The number of symbols of the first hop may be represented by $[N_{symb}^{PUSCH,s}/2]$, and the number of symbols of the second hop may be represented by $N_{symb}^{PUSCH,s} - [N_{symb}^{PUSCH,s}/2]$. $N_{symb}^{PUSCH,s}$ is a length of PUSCH transmission in one slot and is represented by the number of OFDM symbols.

The inter-slot frequency hopping method supported in the PUSCH repetitive transmission types A and B is a method by which the UE performs transmission by changing a resource allocated in the frequency domain by a configured frequency offset in each slot. In the inter-slot frequency hopping, a start RB during slot $n_s^\mu$ may be represented in the following equation 6:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 6]}$$

In equation 6, $n_s^\mu$ is a current slot number in the multi-slot PUSCH transmission, and $RB_{start}$ represents a start RB in a UL BWP and is calculated from the frequency resource allocation method. $RB_{offset}$ represents a frequency offset between two hops in a higher layer parameter.

The inter-repetition frequency hopping method supported in the PUSCH repetitive transmission type B is to perform transmission by shifting a resource allocated in the frequency domain for one or more actual repetitions in each nominal repetition by a configured frequency offset. An index $RB_{start}(n)$ of the start RB in the frequency domain for one or more actual repetitions in the n-th nominal repetition may follow the following equation 7:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{[Equation 7]}$$

In equation 7, n represents an index of a nominal repetition, and $RB_{offset}$ represents an RB offset between two hops in a higher layer parameter.

[Relations of UE Capability Report]

In LTE and NR, the UE may perform a procedure for reporting a capability supported by the UE to a serving BS while connected to the serving BS. This will now be called UE capability report.

The BS may send the UE connected to the BS a UE capability inquiry message requesting to report UE capability report. The message may include a UE capability request for each radio access technology (RAT) type of the BS. The request for each RAT type may include e.g., supported frequency band combination information. Furthermore, in the case of the UE capability inquiry message, UE capability for each of the plurality of RAT types may be requested through an RRC message container transmitted by the BS, or the BS may send the UE capability inquiry message including UE capability request for each RAT type several times. In other words, the UE capability inquiry is repeated several times in a message, and the UE may form a corresponding UE capability information message and report the UE capability information message several times. In the next generation mobile communication system, a UE capability request for multi-RAT dual connectivity (MR-DC) as well as NR, LTE, E-UTRA-NR dual connectivity (EN-DC) may be made. It is common to initially transmit the UE capability inquiry message after the UE is connected to the BS, but the UE capability inquiry may be requested whenever needed by the BS in any condition.

Upon receiving a request to report the UE capability from the BS in the previous operation, the UE configures a UE capability according to an RAT type and band information requested from the BS. How the UE configures a UE capability in an NR system is summarized as follows:

1. When the UE receives an LTE and/or NR band list in the request for UE capability from the BS, the UE may configure a band combination (BC) for EN-DC and NR stand-alone (SA). Specifically, the UE configures a candidate BC list for the EN-DC and NR SA based on bands requested to the BS in FreqBandList. Priorities of the bands may be set in the order of being listed in FreqBandList;

2. When the BS requests a UE capability report by setting a flag "eutra-nr-only" or "eutra," the UE completely removes what are related to NR SA BCs from the configured candidate BC list. This may happen when an LTE eNB requests an "eutra" capability;

3. Subsequently, the UE removes fallback BCs from the configured candidate BC list. The fallback BC refers to a BC that may be obtained by removing a band corresponding to at least one SCell from an arbitrary BC, and may be omitted because the BC before removing the band corresponding to the at least one SCell may already cover the fallback BC. This operation is also applied in MR-DC, i.e., even to LTE bands. BCs left after this operation is a final "candidate BC list";

4. The UE selects BCs to be reported by selecting BCs that suit a requested RAT type from the final "candidate BC list." In this operation, the UE configures supportedBandCombinationList in a set order. Specifically, the UE may configure BCs and UE capability to be reported in order of preset RAT types. (nr→eutra-nr→eutra). Furthermore, the UE may configure featureSetCombination for the configured supportedBandCombinationList, and configure a "candidate feature set combination" list from the candidate BC list from which a list of the fallback BCs (including equal or low-level capability) is removed. The "candidate feature set combinations" include all feature set combinations for NR and EUTRA-NR BCs, and may be obtained from feature set combinations of UE-NR-Capabilities and UE-MRDC-Capabilities containers; and 5. Furthermore, when the requested RAT type is eutra-nr and has an influence, featureSetCombinations are all be included in both the UE-MRDC-Capabilities and UE-NR-Capabilities containers. However, NR feature sets exclusively includes UE-NR-Capabilities.

After the UE capability is configured, the UE sends a UE capability information message including the UE capability to the BS. The BS then performs scheduling and transmission/reception management suitable for the UE based on the UE capability received from the UE.

Figure 18:
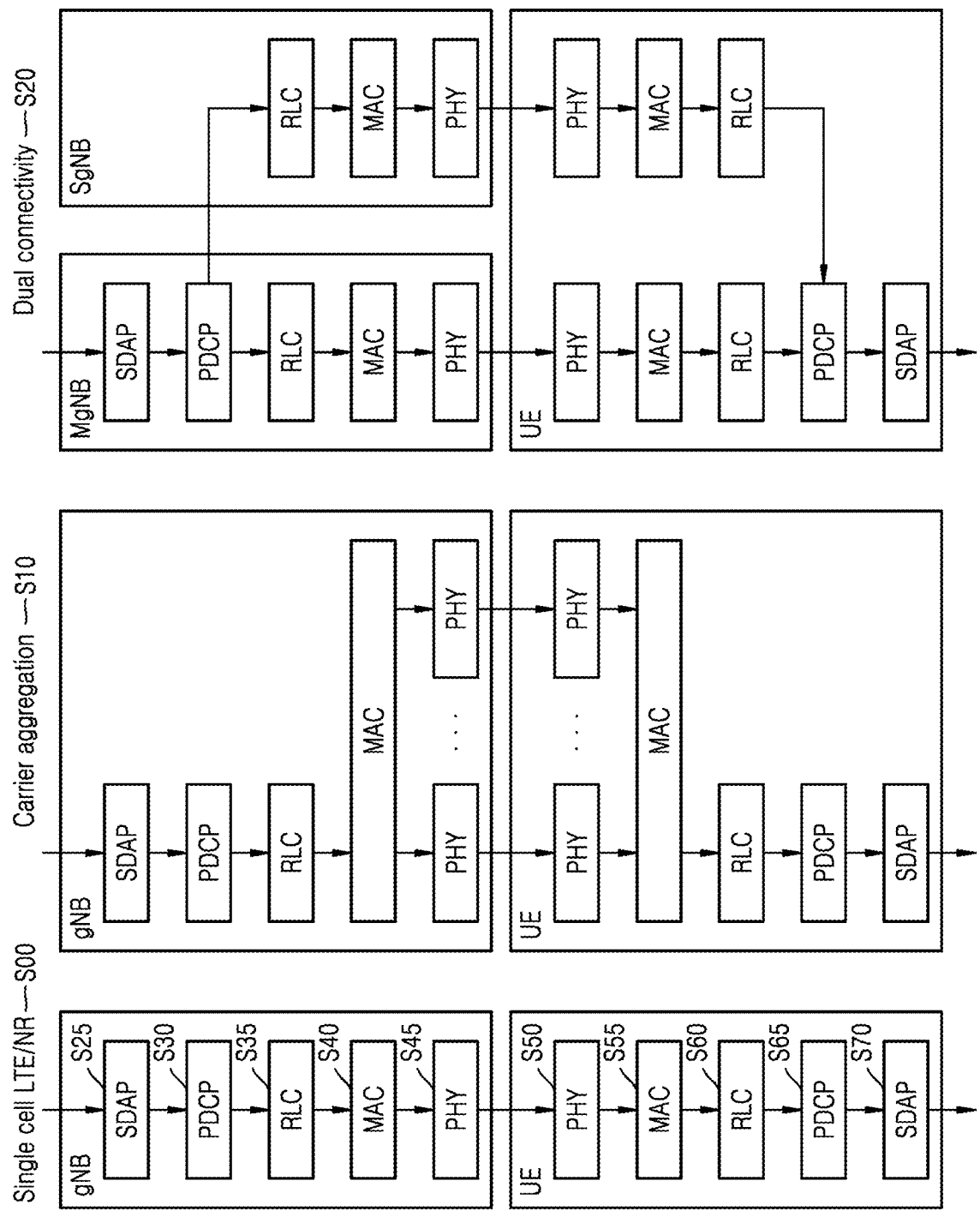
FIG. 18 illustrates a radio protocol architecture of a BS and a UE with conditions of a single cell, carrier aggregation and dual connectivity in a wireless communication system according to an embodiment of the present disclosure.

FIG. 18 illustrates a radio protocol architecture of a BS and a UE with conditions of a single cell, carrier aggregation and dual connectivity according to an embodiment of the present disclosure.

Referring to FIG. 18, a wireless protocol of a next generation mobile communication system in each of the UE and the NR BS may include an NR service data adaptation protocol (NR SDAP) S25 or S70, an NR packet data convergence protocol (NR PDCP) S30 or S65, an NR radio link control (NR RLC) S35 or S60, and an NR medium access control (NR MAC) S40 or S55.

Main functions of the NR SDAP S25 or S70 may include some of the following functions:
  transfer of user plane data;
  mapping between a QoS flow and a data bearer (DRB) for both DL and UL;
  marking QoS flow ID for both UL and DL packets; and/or
  reflective QoS flow to DRB mapping for UL SDAP PDUs.

For an SDAP layer device, the UE may receive configuration of whether to use a header of the SDAP layer device or whether to use a function of the SADP layer device for each PDCP layer device or each bearer or each logical channel in an RRC message, and when the SDAP header is configured, a 1-bit non-access stratum (NAS) reflective QoS indicator (NAS reflective QoS) and a 1-bit access stratum (AS) reflective QoS (AS reflective QoS) may indicate for the UE to update or reconfigure the mapping information between the QoS flow and the DRB for UL or DL. The SDAP header may include QoS flow ID information indicating QoS. The QoS flow ID information may be used for data processing priority, scheduling, etc., for smoother services.

Main functions of the NR PDCP S30 or S65 may include some of the following functions:
  header compression and decompression: ROHC only;
  transfer of user data;
  sequential delivery (e.g., in-sequence delivery of higher layer PDUs);
  non-sequential delivery (e.g., out-of-sequence delivery of higher layer PDUs);
  reordering (e.g., PDCP PDU reordering for reception);
  duplicate detection (e.g., duplicate detection of lower layer SDUs);
  retransmission (e.g., retransmission of PDCP SDUs);
  ciphering and deciphering; and/or
  timer-based SDU discarding (e.g., timer-based SDU discarding in uplink).

The reordering function of the NR PDCP device may refer to a function of reordering PDCP PDUs received from a lower layer based on PDCP sequence numbers (SNs), which may include a function of delivering data to a higher layer in the reordered sequence. Alternatively, the reordering function of the NR PDCP device may include a direct delivery function without considering the sequence, a function of reordering the sequence to record missing PDCP PDUs, a function of reporting status of missing PDCP PDUs to a transmitting end, and a function of requesting retransmission of missing PDCP PDUs.

Main functions of the NR RLC S35 or S60 may include some of the following functions:
  data transfer (e.g., transfer of upper layer PDUs);
  sequential delivery (e.g., in-sequence delivery of higher layer PDUs);
  non-sequential delivery (e.g., out-of-sequence delivery of higher layer PDUs);
  ARQ (e.g., error correction through ARQ);
  concatenation, segmentation, and reassembling (e.g., concatenation, segmentation and reassembly of RLC SDUs);
  re-segmentation (e.g., re-segmentation of RLC data PDUs);
  reordering (e.g., reordering of RLC data PDUs);
  duplicate detection;
  error detection (e.g., protocol error detection);
  RLC SDU discarding; and/or
  RLC re-establishment.

The sequential delivery function of the NR RLC device may refer to a function of delivering RLC SDUs received from a lower layer to a higher layer in sequence. The non-sequential delivery function of the NR RLC device may include, when several RLC SDUs split from an original RLC SDU are received, a function of reassembling them and delivering the result, a function of reordering the received RLC PDUs based on RLC SNs or PDCP SNs, a function of reordering the sequence to record missing RLC PDUs, a function of reporting status of missing RLC PDUs to a transmitting end, and a function of requesting retransmission of missing RLC PDUs. The sequential delivery function of the NR RLC device may include, when there is a missing RLC SUD, a function of delivering RLC SDUs before the missing RLC SDU to a higher layer in sequence, or when there is a missing RLC SDU but a timer is expired, a function of delivering all RLC SDUs received before the timer starts to a higher layer in sequence.

Alternatively, the sequential delivery function of the NR RLC device may include, when a certain timer has been expired even though there is a missing RLC SDU, a function of delivering all the RLC SDUs received until the present time to a higher layer in sequence. Furthermore, the sequential delivery function of the NR RLC device may deliver RLC PDUs to a PDCP device regardless of the sequence (out-of-sequence delivery) by processing the RLC PDUs in the order of reception (or in the order of arrival without regard to the order of the SNs), or when the RLC PDU is segmented, reassemble the segments stored in a buffer or to be received later into a complete RLC PDU, process and deliver the RLC PDU to a PDCP device. The NR RLC layer may not include the concatenation function, and the concatenation function may be performed in the NR MAC layer or replaced with the multiplexing function of the NR MAC layer.

The non-sequential delivery function of the NR RLC device may refer to a function of delivering RLC SDUs received from a lower layer directly to a higher layer without regard to the sequence of the RLC SDUs, and include a function of receiving, reassembling and delivering multiple RLC SDUs resulting from segmentation of an original RLC SDU, and a function of storing RLC SNs or PDCP SNs of the received RLC PDUs and reordering the received RLC PDUs based on the RLC SNs or PDCP SNs to record missing RLC PDUs.

The NR MAC S40 or S55 may be connected to multiple NR RLC layer devices configured in the same UE, and main functions of the NR MAC S40 or S55 may include some of the following functions:

mapping (e.g., mapping between logical channels and transport channels);
multiplexing and demultiplexing (e.g., multiplexing/demultiplexing of MAC SDUs);
scheduling information report;
HARQ (e.g., error correction through HARQ);
logical channel priority control (e.g., priority handling between logical channels of one UE);
UE priority control (e.g., priority handling between UEs by means of dynamic scheduling);
MBMS service identification;
transport format selection; and/or
padding.

The NR PHY layer S45 or S50 may perform channel coding and modulation on higher layer data, form the data into OFDM symbols and send them on a radio channel, or may demodulate OFDM symbols received on a radio channel, perform channel decoding on them and send the result to a higher layer.

Details of the radio protocol architecture may be variously changed according to carrier (or cell) operation schemes. For example, when the BS transmits data to the UE on a single carrier (or cell) basis, the BS and the UE use a protocol architecture having a single structure for each layer, as in S00. When the BS transmits data to the UE on a CA basis where a single transmission and reception point (TRP) uses multiple carriers, the BS and the UE use a protocol architecture having a single structure up to the RLC layer and having the PHY layer multiplexed through the MAC layer, as in S10. In another example, when the BS transmits data to the UE on a dual connectivity (DC) basis where multiple TRPs use multiple carriers, the BS and the UE use a protocol architecture having a single structure up to the RLC layer and having the PHY layer multiplexed through the MAC layer.

Referring to the above description related to PDCCH and beam configuration, current Rel-15 and Rel-16 NR do not support PDCCH repetitive transmission, thereby having difficulty in attaining required reliability in a scenario such as URLLC requiring high reliability. In the disclosure a PDCCH repetitive transmission method through multiple TRP points is provided to improve PDCCH reception reliability of the UE. Details of the method will now be described in the following embodiments.

Embodiments of the disclosure will now be described in conjunction with accompanying drawings. The disclosure may be applied to FDD and TDD systems. In the following description, higher layer signaling is a method of transferring a signal to the UE from the BS on a DL data channel of the physical layer or to the BS from the UE on a UL data channel of the physical layer, and may also be referred to as RRC signaling, PDCP signaling, or an MAC control element (CE).

In the disclosure, the UE may determine whether to apply the cooperative communication in various ways, by e.g., having PDCCH(s) that allocates a PDSCH, to which the cooperative communication is applied, have a particular format, having PDCCH(s) that allocates a PDSCH, to which the cooperative communication is applied, include a particular indicator to indicate whether the cooperative communication is applied, having PDCCH(s) that allocates a PDSCH, to which the cooperative communication is applied, scrambled by a particular RNTI, or assuming application of the cooperative communication in a particular section indicated by a higher layer. For convenience of explanation, receiving the PDSCH to which the cooperative communication is applied based on similar conditions to those as described above will now be referred to as a non-coherent joint transmission (NC-JT) case.

Determining priorities among A and B may refer to selecting one of A and B that has a higher priority according to a preset priority rule and performing a corresponding operation or omitting or dropping an operation for the other one that has a lower priority.

The above examples will now be described with several embodiments, in which case one or more embodiments may be applied simultaneously or in combination rather than separately.

In an embodiment of the disclosure, the NC-JT may be used for the UE to receive a PDSCH from multiple TRPs.

Unlike the existing communication system, 5G wireless communication systems may support not only services requiring higher transmission speed but also both services having very short latency and services requiring a higher connection density. In a wireless communication network including multiple cells, TRPs, or beams, cooperative communication between the respective cells, TRPs and/or beams may satisfy various service requirements by increasing intensity of a signal received by the UE or efficiently performing interference control between the respective cells, TRPs and/or beams.

Joint transmission (JT) is a representative transmission technology for the aforementioned cooperative communication, which transmits a signal to one UE through many different cells, TRPs or/and beams to increase strength or throughput of the signal received by the UE. In this case, the respective channels between the cells, TRPs and/or beams and the UE may differ significantly, and especially for NC JT that supports non-coherent precoding between the cells, the TRPs and/or the beams, individual precoding, MCS, resource allocation, TCI indication, etc., may be required according to a channel property for each link between the cells, the TRPs and/or the beams.

The NC-JT transmission may be applied to at least one of a DL data channel (e.g., PDSCH), a DL control channel (e.g., PDCCH), a UL data channel (e.g., PUSCH), or a UL control channel (e.g., PUCCH). Transmission information in PDSCH transmission, such as precoding, an MCS, resource allocation, TCI, etc., is indicated by DL DCI, and for NC-JT transmission, the transmission information needs to be separately indicated for each cell, TRP and/or beam. This may mainly cause an increase in payload required for DL DCI, which may lead to having an adverse effect on reception performance for a PDCCH that transmits the DCI. Hence, to support JT of the PDSCH, a tradeoff between an amount of DCI information and control information reception performance needs to be carefully designed.

Figure 19:
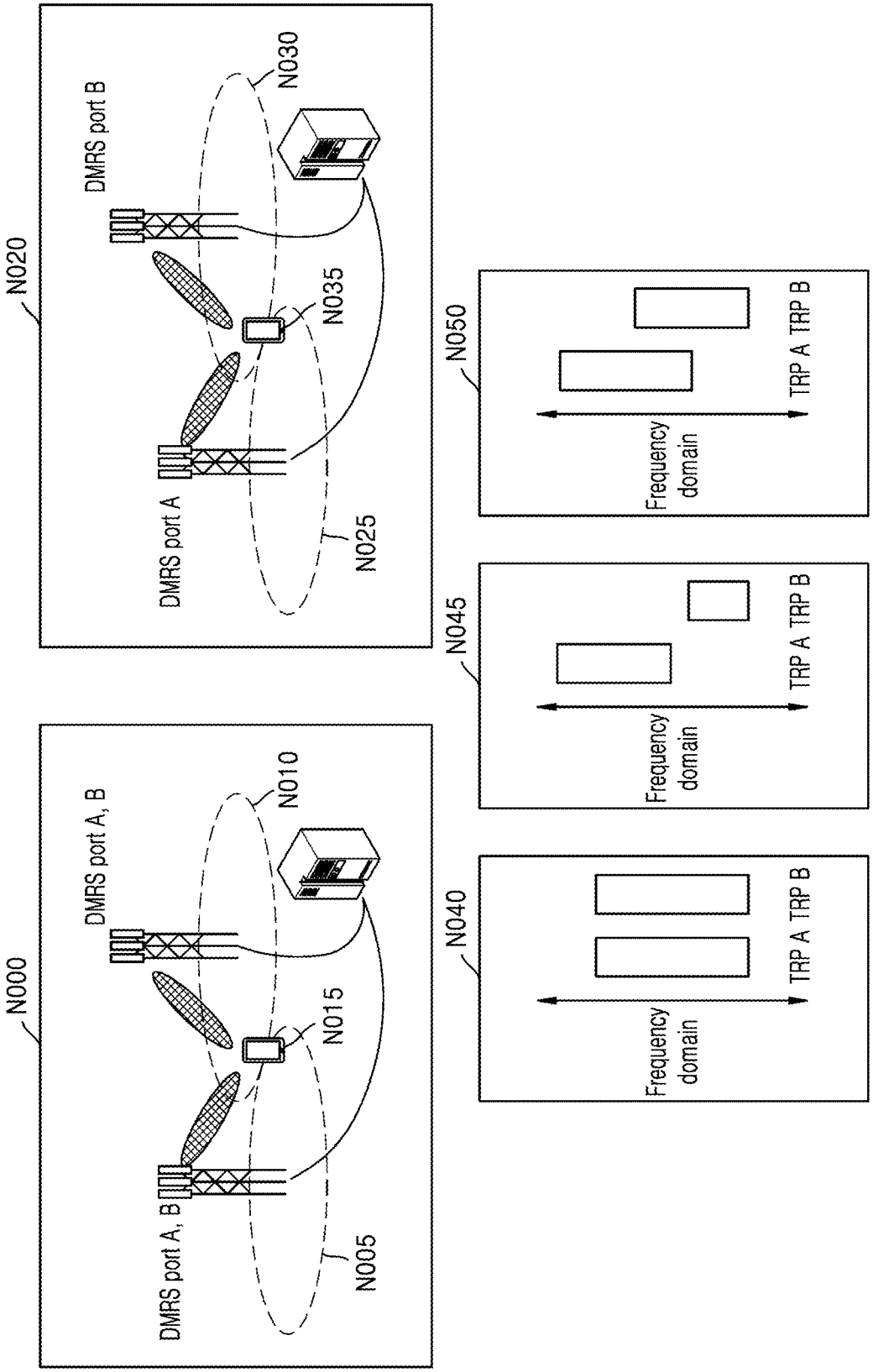
FIG. 19 illustrates antenna port configuration and resource allocation for cooperative communication in a wireless communication system according to an embodiment of the present disclosure.

FIG. 19 illustrates antenna port configuration and resource allocation for PDSCH transmission using cooperative communication in a wireless communication system according to an embodiment of the present disclosure.

Referring to FIG. 19, an illustration of PDSCH transmission in each JT scheme will be described and examples for allocating radio resources for each TRP are shown.

As shown in FIG. 19, coherent JT (C-JT) that supports coherent precoding between respective cells, TRPs and/or beams is illustrated in N000.

For C-JT, TRP A N005 and TRP B N010 transmits single data (a PDSCH) to a UE N015, and joint precoding may be performed in the multiple TRPs. This may mean that a DMRS is transmitted through the same DMRS ports for TRP A N005 and TRP B N010 to transmit the same PDSCH. For example, TRP A N005 and TRP B N010 may transmit a DMRS to the UE through DMRS port A and DMRS port B, respectively. In this case, the UE may receive a piece of DCI information to receive a PDSCH demodulated based on the DMRS transmitted through the DMRS ports A and B.

In FIG. 19, NC-JT that supports non-coherent precoding between the respective cells, TRPs and/or beams for PDSCH transmission is illustrated in N020.

In the case of NC-JT, a PDSCH may be transmitted to the UE N035 for each cell, TRP N025 or N030 and/or beam, and individual precoding may be applied to each PDSCH. Each cell, TRP and/or beam transmits a different PDSCH or a different PDSCH layer to the UE, thereby increasing throughput as compared to singe cell, TRP and/or beam transmission. Furthermore, each cell, TRP and/or beam repetitively transmits the same PDSCH to the UE, thereby increasing reliability as compared to singe cell, TRP and/or beam transmission. For convenience of explanation, a cell, TRP and/or beam will be collectively called a TRP.

In this case, various radio resource allocations such as an occasion when frequency and time resources used at the multiple TRPs for PDSCH transmission are the same in N040, an occasion when frequency and time resources used at the multiple TRPs do not overlap each other in N045, and an occasion when some of the frequency and time resources used at the multiple TRPs overlap each other in N050 may be considered.

To simultaneously allocate multiple PDSCHs to a UE to support NC-JT, various forms, structures and relations of DCI may be considered.

Figure 20:
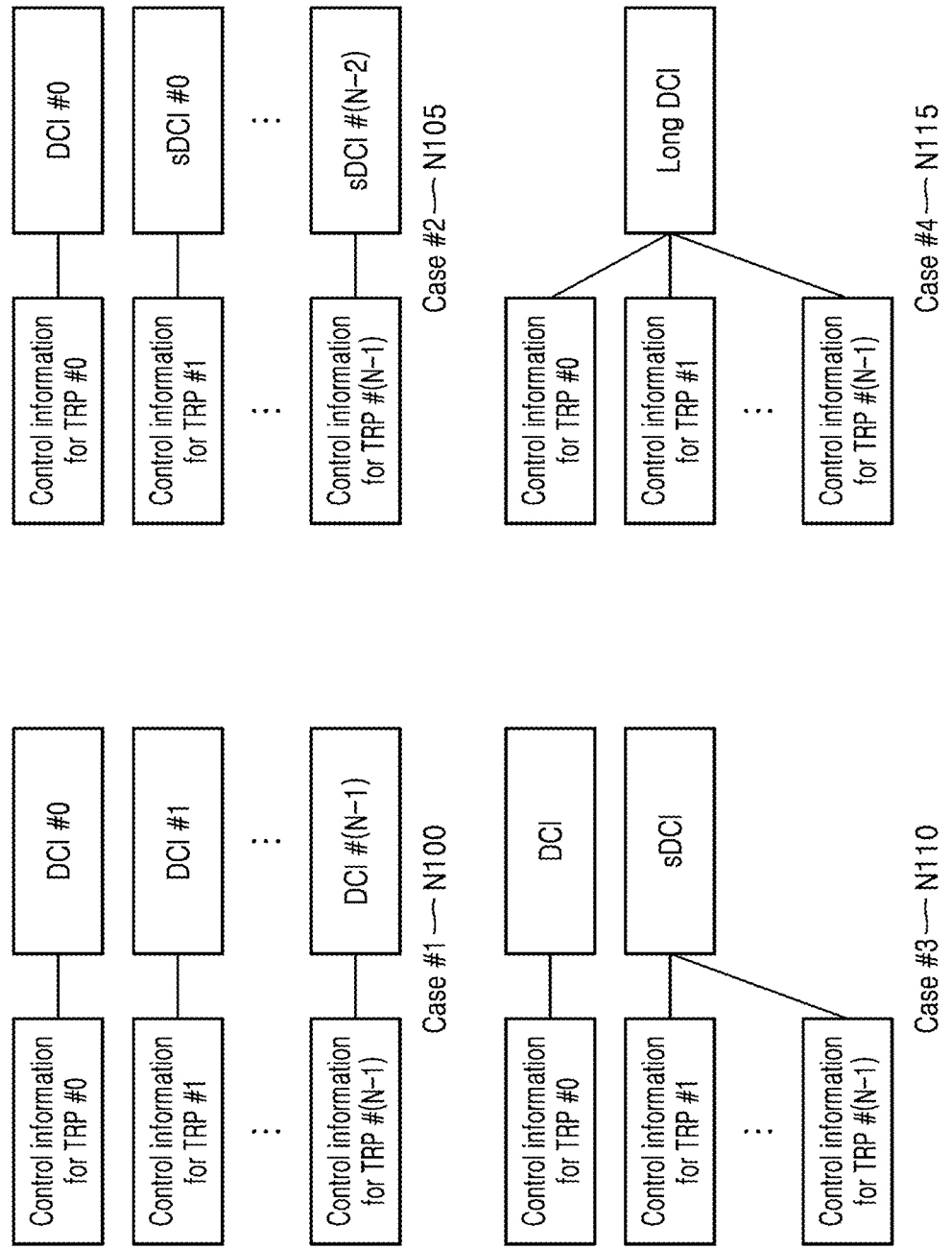
FIG. 20 illustrates an example of configuration of downlink control information (DCI) for cooperative communication in a wireless communication system according to an embodiment of the present disclosure.

FIG. 20 illustrates an example of configuration of DCI for NC-JT where each TRP transmits a different PDSCH or a different PDSCH layer to the UE in a wireless communication system according to an embodiment of the present disclosure.

Referring to FIG. 20, case #1 N100 shows an occasion when N−1 different PDSCHs are transmitted from additional N−1 TRPs, TRP #1 to TRP #(N−1) in addition to a serving TRP, TRP #0, used in single PDSCH transmission, in which case control information for the PDSCHs transmitted from the additional N−1 TRPs is transmitted separately from control information for the PDSCH transmitted from the serving TRP. Specifically, the UE may obtain the control information for the PDSCHs transmitted from different TRPs, TRP #0 to TRP #(N−1), through separate DCI, DCI #0 to DCI #(N−1). Formats of the separate pieces of DCI may be the same or different, and payloads of the pieces of DCI may also be the same or different. In case #1 N100, degrees of freedom of each PDSCH control or allocation may be fully ensured, but when each DCI is transmitted from a different TRP, the reception performance may be degraded due to a coverage difference for each DCI.

Case #2 N105 shows an occasion when N−1 different PDSCHs are transmitted from additional N−1 TRPs, TRP #1 to TRP #(N−1), in addition to a serving TRP, TRP #0, used in single PDSCH transmission, in which case pieces of control information (DCI) for the PDSCHs of the additional N−1 TRPs are transmitted separately and each of the pieces of DCI is dependent on the control information for the PDSCH transmitted from the serving TRP.

For example, DCI #0, control information for the PDSCH transmitted from the serving TRP, TRP #0, may include all information elements of DCI format 1_0, DCI format 1_1, and DCI format 1_2, but shortened DCI (hereinafter sDCI), sDCI #0 to sDCI #(N−2), control information for the PDSCHs transmitted from the cooperative TRPs, TRP #1 to TRP #(N−1), may include only some of the information elements of DCI format 1_0, DCI format 1_1, and DCI format 1_2. Accordingly, the sDCI carrying the control information for the PDSCHs transmitted from the cooperative TRPs has a small payload as compared to normal DCI (nDCI) carrying control information relating to the PDSCH transmitted from the serving TRP, and may thus include reserved bits as compared to the nDCI.

In case #2, the degree of freedom of each PDSCH control or allocation may be limited depending on content of the information element included in the sDCI, but a probability of having coverage difference for each DCI may be reduced because reception performance for the sDCI is better than that of the nDCI.

Case #3 N110 shows an occasion when N−1 different PDSCHs are transmitted from additional N−1 TRPs, TRP #1 to TRP #(N−1), in addition to a serving TRP, TRP #0, used in single PDSCH transmission, in which case a piece of control information (DCI) for the PDSCHs of the additional N−1 TRPs is transmitted and the DCI is dependent on the control information for the PDSCH transmitted from the serving TRP.

For example, DCI #0, control information for the PDSCH transmitted from the serving TRP, TRP #0, may include all information elements of DCI format 1_0, DCI format 1_1, and DCI format 1_2, and control information for the PDSCHs transmitted from the cooperative TRPs, TRP #1 to TRP #(N−1), may collect some of the information elements of DCI format 1_0, DCI format 1_1, and DCI format 1_2 into "secondary" DCI (sDCI) for transmission. For example, the sDCI may include at least one piece of HARQ-related information such as frequency domain resource allocation, time domain resource allocation, an MCS or the like, for the cooperative TRPs. Besides, information that is not included in the sDCI, such as a BWP indicator or a carrier indicator, may follow the DCI of the serving TRP, i.e., DCI #0, normal DCI, nDCI.

Case #3 N110 may have a limited degree of freedom of each PDSCH control or allocation depending on content of an information element included in sDCI, but may control sDCI reception performance and have reduced complexity of DCI blind decoding of the UE as compared to case #1 N100 or case #2 N105.

Case #4 N115 shows an occasion when N−1 different PDSCHs are transmitted from additional N−1 TRPs, TRP #1 to TRP #(N−1), in addition to a serving TRP, TRP #0, used for single PDSCH transmission, in which case control information for the PDSCHs transmitted from the additional N−1 TRPs is transmitted in the same DCI (long DCI) as the control information for the PDSCH transmitted from the serving TRP. That is, the UE may obtain the control information for the PDSCHs transmitted from the different TRPs, TRP #0 to TRP #(N−1) in single DCI. In case #4 N115, DCI blind decoding complexity of the UE may not increase, but a degree of freedom of PDSCH control or allocation may be reduced such as the number of cooperative TRPs being limited due to limitations on the long DCI payload.

In the following description and embodiments of the disclosure, sDCI may refer to various types of auxiliary DCI such as shortened DCI, secondary DCI, or normal DCI (having the aforementioned DCI formats 1_0 to 1_1) carrying control information of a PDSCH transmitted from a cooperative TRP, the description of which may be similarly applied to the various types of auxiliary DCI unless otherwise specified.

In the following description and embodiments of the disclosure, the above cases #1 N100, #2 N105, and #3 N110 in which one or more pieces of DCI (PDCCHs) are used to support NC-JT may be classified as multiple-PDCCH-based NC-JT, and the case #4 in which single DCI (a PDCCH) is used to support NC-JT may be classified as single-PDCCH-based NC-JT. In the multiple-PDCCH based PDSCH transmission, a CORESET scheduling the DCI of the serving TRP, TRP #0, may be distinguished from CORESETs scheduling the DCI of the cooperative TRPs, TRP #1 to TRP #(N−1). As a method of distinguishing between CORESETs, there may be a method of distinguishing between CORESETs by a higher layer indicator for each CORESET, a method of distinguishing between CORESETs through beam configuration for each CORESET, etc. Furthermore, in the single-PDCCH based NC-JT, single DCI schedules a single PDSCH having a plurality of layers instead of scheduling a plurality of PDSCHs, and the plurality of layers may be transmitted from multiple TRPs. In this case, a connection relation between a layer and a TRP to transmit the layer may be indicated by TCI for the layer.

In embodiments of the disclosure, the term "cooperative TRP" may be replaced with various terms including a "cooperative panel" or a "cooperative beam" when actually used.

In embodiments of the disclosure, the expression that "NC-JT is applied" is used herein for convenience of explanation, but it may be variously interpreted to fit the context, such as "the UE simultaneously receives one or more PDSCHs in one BWP," "the UE simultaneously receives PDSCHs based on two or more TCI indication in one BWP," "a PDSCH received by the UE is associated with one or more DMRS port group," etc.

In the disclosure, a radio protocol architecture for NC-JT may be variously used depending on TRP development scenarios. For example, when there is no or little backhaul latency between cooperative TRPs, a structure based on MAC layer multiplexing similar to what is shown in S10 of FIG. 18 may be used (CA-like method). On the other hand, when there is backhaul latency big enough not to be ignored between cooperative TRPs (e.g., when 2 ms or more time is required to exchange information such as CSI, scheduling, HARQ-ACK, etc., between the cooperative TRPs), a separate structure for each TRP from the RLC layer similar to what is shown in S20 of FIG. 18 may be used to secure robustness in the latency (DC-like method).

A UE that supports C-JT/NC-JT may receive C-JT/NC-JT related parameters or setting values from a higher layer configuration, and based on this, RRC parameters of the UE may be set. For higher layer configuration, the UE may use a UE capability parameter, e.g., tci-StatePDSCH. In this case, the UE capability parameter, e.g., tci-StatePDSCH, may define TCI states for PDSCH transmission; the number of TCI states may be set to 4, 8, 16, 32, 64, or 128 at FR1 and 64 or 128 at FR2; and among the set numbers, up to 8 states that may be indicated in 3 bits of a TCI field of DCI may be configured in an MAC CE message. The maximum value 128 refers to a value indicated by maxNumberConfiguredTCIstatesPerCC in parameter tci-StatePDSCH included in capability signaling of the UE. As described above, a series of configuration processes from higher layer configuration to MAC CE configuration may be applied to a beamforming indication or beamforming switching command for at least one PDSCH at one TRP.

In an embodiment of the disclosure, the multi-DCI based multi-TRP transmission method will be described. The multi-DCI based multi-TRP transmission method may include configuring a DL control channel for multi-PDCCH based NC-JT transmission.

The multi-PDCCH based NC-JT may have a CORESET or a search space distinguished for each TRP in DCI transmission for PDSCH scheduling of each TRP. The CORESET or search space for each TRP may be configured as at least one of the followings:

higher layer index configuration for each CORESET: CORESET configuration information configured by a higher layer may include an index value, and a TRP for transmitting the PDCCH in the configured CORESET may be distinguished by the index value for the configured CORESET. For example, in a set of CORESETs having the same higher layer index value, it may be regarded that the same TRP transmits a PDCCH or a PDCCH scheduling a PDSCH of the same TRP is transmitted. The index for each CORESET may be called CORESETPoolIndex, and it may be regarded that a PDCCH is transmitted from the same TRP for CORESETs configured to have the same CORESETPoolIndex value. For a CORESET for which no CORESETPoolIndex value is set, it may be regarded that a basic value of CORESETPoolIndex is set, and the default value may be "0."

In the present disclosure, when each of a plurality of CORESETs included in higher layer signaling PDCCH-Config has more than one type of CORESETPoolIndex, i.e., when each CORESET has different "CORESETPoolIndex's, the UE may regard that the BS may use the multi-DCI based multi-TRP transmission method.

On the other hand, in the disclosure, when each of a plurality of CORESETs included in higher layer signaling PDCCH-Config has one type of CORESETPoolIndex, i.e., when all the CORESETs have the same CORESETPoolIndex of "0" or "1," the UE may regard that the BS may use single TRP for transmission instead of using the multi-DCI based multi-TRP transmission method.

The CORESET or search space for each TRP may be configured as at least one of the followings:

multiple PDCCH-Config configuration: Multiple PDCCH-Configs are configured in one BWP, and each PDCCH-Config may include PDCCH configuration for each TRP. Specifically, one PDCCH-Config may be configured with a list of CORESETs for each TRP and/or a list of search spaces for each TRP, and one or more CORESETs and one or more search spaces included in one PDCCH-Config may be regarded to correspond to a particular TRP;

CORESET beam/beam group configuration: With a beam or beam group configured for each CORESET, a TRP corresponding to the CORESET may be distinguished. For example, when a same TCI state is configured for multiple CORESETs, it may be regarded that the CORESETs are transmitted through the same TRP or a PDCCH scheduling a PDSCH of the same TRP is transmitted in the CORESET;

search space beam/beam group configuration: A beam or beam group is configured for each search space, making it possible to distinguish a TRP for each search space. For example, when a same beam/beam group or TCI state is configured for multiple search spaces, it may be regarded that the same TRP transmits a PDCCH in the search space or a PDCCH scheduling a PDSCH of the same TRP is transmitted in the search space.

Distinguishing the CORESET or search space for each TRP enables classification of PDSCH and HARQ-ACK information for each TRP, which in turn enables separate generation of HARQ-ACK codebook and separate use of a PUCCH resource for each TRP.

The above configuration may be independent for each cell or BWP. For example, two different CORESETPoolIndex values may be set in a PCell while no CORESETPoolIndex value may be set in a particular SCell. In this case, it may be regarded that NC-JT transmission is configured for the PCell while the NC-JT transmission is not configured for a SCell for which no CORESETPoolIndex value is set.

A PDSCH TCI state activation/deactivation MAC CE that may be applied to the multi-dci based multi-TRP transmission method may follow what is shown in FIG. 16. When the UE is not configured with CORESETPoolIndex for each of all CORESETs in higher layer signaling PDCCH-Config, the UE may ignore a CORESET Pool ID field 16-55 in the MAC CE 16-50. When the UE may support the multi-DCI based multi-TRP transmission method, i.e., UE is configured with a different CORESETPoolIndex for each CORESET in higher layer signaling PDCCH-Config, the UE may activate a TCI state in DCI included in the PDCCH transmitted in the CORESETs having the same value of CORESETPoolIndex as the value of the CORESET pool ID field 16-55 in the MAC CE 16-50. For example, when the CORESET Pool ID field 16-55 in the MAC CE 16-50 has a value of "0," a TCI state in DCI included in the PDCCH transmitted in CORE-SETs having CORESETPoolIndex of "0" may follow activation information of the MAC CE 16-50.

When the UE is configured by the BS to be able to use the multi-DCI based multi-TRP transmission method, i.e., there may be more than one type of CORESETPoolIndex for each of the plurality of CORESETs included in higher layer signaling PDCCH-Config or each CORESET has a different CORESETPoolIndex, the UE may interpret that, for PDSCHs scheduled from the PDCCH in each CORESET having two different types of CORESETPoolIndex, there are limitations as follows:

1) when PDSCHs indicated from PDCCHs in the respective CORESETs having two different types of CORE-SETPoolIndex are fully or partially overlapped, the UE may apply TCI states indicated by the respective PDCCHs to different CDM groups. That is, two or more TCI states may not be applied to one CDM group;
2) when PDSCHs indicated from PDCCHs in the respective CORESETs having two different types of CORE-SETPoolIndex are fully or partially overlapped, the UE may expect that the number of front loaded DMRS symbols, the number of actually additional DMRS symbols, an actual position of the DMRS symbol, and a DMRS type are not different for each PDSCH;
3) the UE may expect that BWPs indicated from PDCCHs in respective CORESETs having two different types of CORESETPoolIndex are the SCSs are the same as well; and
4) the UE may expect that information about PDSCHs scheduled from PDCCHs in the respective CORESETs having two different types of CORESETPoolIndex are completely included in the respective PDCCHs.

In an embodiment of the disclosure, the single-DCI based multi-TRP transmission method will be described. The single-DCI based multi-TRP transmission method may include configuring a DL control channel for single-PDCCH based NC-JT transmission.

In the single-DCI based multi-TRP transmission method, PDSCHs transmitted by multiple TRPs may be scheduled in one DCI. In this case, to indicate the number of TRPs that transmit the PDSCHs, the number of TCI states may be used. When the number of TCI states indicated in DCI that schedules the PDSCH is two, it may be regarded as the single-PDCCH based NC-JT transmission, and when the number of TCI states is one, it may be regarded as the single-TRP transmission. TCI states indicated in the DCI may correspond to one or two of TCI states activated in an MAC CE. The TCI states of the DCI correspond to two TCI states activated in an MAC CE when a TCI codepoint indicated in the DCI may have a relation of correspondence with the TCI states activated in the MAC CE and there may be two TCI states activated in the MAC CE corresponding to the TCI codepoint.

In another example, when at least one of all codepoints of the TCI state field in the DCI indicates two TCI states, the UE may regard the transmission of the BS as being based on the single-DCI based multi-TRP method. In this case, at least one codepoint indicating two TCI states in the TCI state field may be activated through an enhanced PDSCH TCI state activation/deactivation MAC CE.

Figure 21:
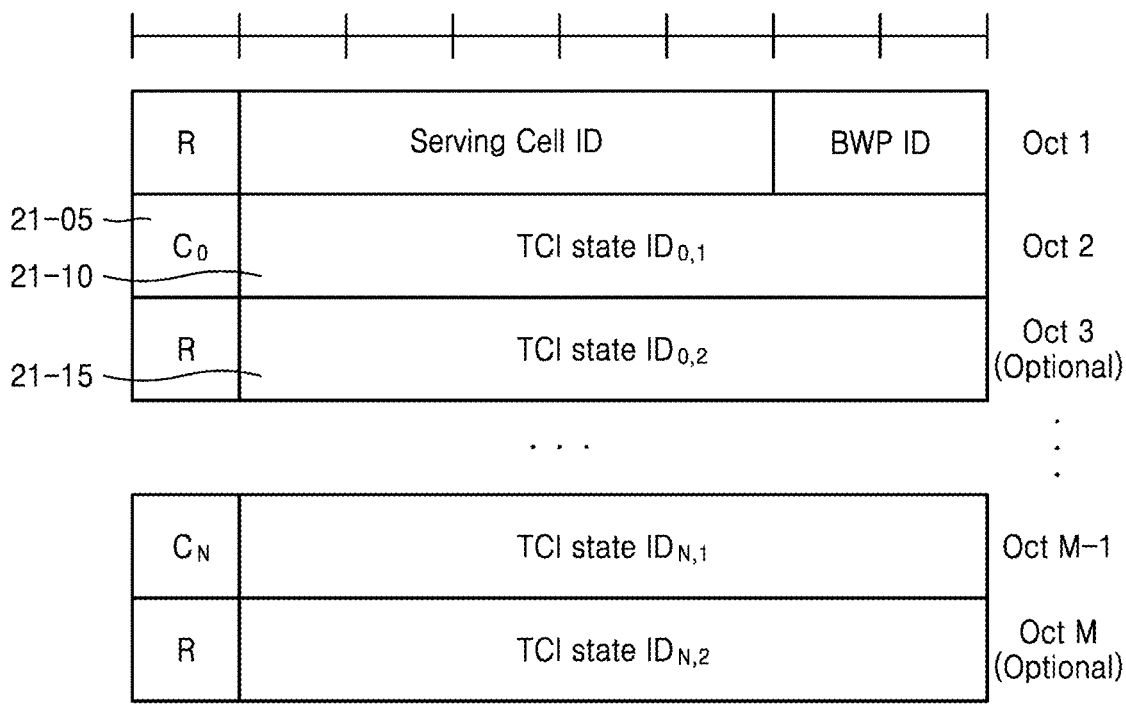
FIG. 21 illustrates an enhanced PDSCH TCI state activation/deactivation MAC CE structure according to an embodiment of the present disclosure.

FIG. 21 illustrates an enhanced PDSCH TCI state activation/deactivation MAC CE structure.

Meaning and configurable values of each field in the MAC CE are as follows:

---

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

-continued

BWP ID: This field indicates a DL BWP for which the MAC CE applies as the codepoint of the DCI bandwidth part indicator field as specified in TS 38.212 [9]. The length of the BWP ID field is 2 bits;
$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;
TCI state $ID_{ij}$: This field indicates the TCI state identified by TCI-StateId as specified in TS 38.331 [5], where i is the index of the codepoint of the DCI Transmission configuration indication field as specified in TS 38.212 [9] and TCI state $ID_{ij}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{ij}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{1,2}$ is optional based on the indication of the Ci field. The maximum number of activated TCI codepoint is 8 and the maximum number of TCI states mapped to a TCI codepoint is 2.
R: Reserved bit, set to "0".

In FIG. 21, when field $C_0$ 21-05 has a value of "1," the corresponding MAC CE may include field TCI state $ID_{0,2}$ 21-15 in addition to field TCI state $ID_{0,1}$ 21-10. This means that TCI state $ID_{0,1}$ and TCI state $ID_{0,2}$ are activated for the 0-th codepoint in the TCI state field included in DCI, and the UE may receive an indication of two TCI states when the BS indicates the corresponding codepoint to the UE.

When field $C_0$ 21-05 has a value of "0," the corresponding MAC CE may not include the field TCI state $ID_{0,2}$ 21-15, which means that one TCI state corresponding to TCI state $ID_{0,1}$ 21-10 for the 0-th codepoint of the TCI state field included in the DCI is activated.

The above configuration may be independent for each cell or BWP. For example, there may be up to two activated TCI states corresponding to one TCI codepoint in the PCell while there may be up to one activated TCI state corresponding to one TCI codepoint in a particular SCell. In this case, it may be regarded that NC-JT transmission is configured for the PCell while the NC-JT transmission is not configured for the SCell.

Next, a method of identifying a single-DCI based multi-TRP PDSCH repetitive transmission scheme will be described. The UE may receive, from the BS, indication of different single-DCI based multi-TRP PDSCH repetitive transmission schemes (e.g., TDM, FDM, and SDM) according to a value indicated in the DCI field and a higher layer signaling configuration. Table 31 below represents a method of distinguishing between single- or multi-TRP based schemes indicated to the UE according to the value of a particular DCI field and the higher layer signaling configuration.

TABLE 31

| combination | The number of TCI states | The number of CDM groups | repetitionNumber configuration and indication condition | repetitionScheme configuration relations | transmission scheme indicated to UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP TDM scheme B |

The respective columns of the table 31 will be described as follows:
- the number of TCI states (second column): indicates the number of TCI states indicated in the TCI state field in DCI, which may be one or two;
- the number of CDM groups (third column): indicates the number of different CDM groups of DMRS ports indicated in an antenna port field in the DCI. It may be one, two, or three; And/or
- repetitionNumber configuration and indication conditions (fourth column): may have three conditions according to whether repetitionNumber for all TDRA entries that may be indicated in a time domain resource allocation field in the DCI is configured and whether a TDRA entry actually indicated has the repetitionNumber configuration:
  (1) Condition 1: At least one of all the TDRA entries that may be indicated in the time domain resource allocation field includes a configuration of repetitionNumber, and the TDRA entry indicated in the time domain resource allocation field in the DCI includes a configuration of repetitionNumber greater than 1,
  (2) Condition 2: At least one of all the TDRA entries that may be indicated in the time domain resource allocation field includes a configuration of repetitionNumber, and a TDRA entry indicated in the time domain resource allocation field in the DCI does not include a configuration of repetitionNumber, and/or
  (3) Condition 3: All the TDRA entries that may be indicated in the time domain resource allocation field do not include a configuration of repetitionNumber;
- relations of a repetitionScheme configuration (fifth column): indicates whether to configure higher layer signaling repetitionScheme. The higher layer signaling repetitionScheme may be configured with one of "tdmSchemeA," "fdmSchemeA," and "fdmSchemeB"; and/or
- transmission scheme indicated to the UE (sixth column): indicates single or multiple TRP schemes indicated according to each combination (first column) represented in the table 31.

Single-TRP: indicates single-TRP based PDSCH transmission. When the UE is configured with pdsch-AggegationFactor in the higher layer signaling PDSCH-config, the UE may receive scheduling of the single-TRP based PDSCH repetitive transmission as many as the number of times the UE is configured. Otherwise, the UE may receive scheduling of the single-TRP based PDSCH single transmission.

Single-TRP TDM scheme B: indicates single-TRP based inter-slot time division based PDSCH transmission. According to the Condition 1 related to repetitionNumber, the UE repetitively transmits a PDSCH in the time domain as many as the number of slots as many as repetitionNumber greater than 1 set for a TDRA entry indicated in the time domain resource allocation. In this case, for each of the slots as many as repetitionNumber, a start symbol and the symbol length of the PDSCH indicated with the TDRA entry are equally applied, and the same TCI state is applied for each PDSCH repetitive transmission. This scheme is similar to a slot aggregation scheme in that inter-slot PDSCH repetitive transmission is performed in the time resource, but differs from the slot aggregation in that whether to indicate repetitive transmission may be dynamically determined based on the time domain resource allocation field in the DCI.

In one example, multi-TRP SDM indicates a multi-TRP based spatial resource division PDSCH transmission scheme. It is a method of dividing a layer and receiving them from each TRP, which is not a repetitive transmission scheme but may increase reliability of PDSCH transmission in that transmission may be performed with a reduced coding rate by increasing the number of layers. The UE may receive the PDSCH by applying two TCI states indicated through the TCI state field in the DCI to the two CDM groups indicated from the BS, respectively.

In one example, multi-TRP FDM scheme A indicates a multi-TRP based frequency resource division PDSCH transmission scheme, which is not repetitive transmission like multi-TRP SDM because the multi-TRP based frequency resource division PDSCH transmission scheme has one PDSCH transmission occasion, but may transmit with high reliability by increasing an amount of frequency resources and thus reducing the coding rate. Multi-TRP FDM scheme A may apply two TCI states indicated through the TCI state field in the DCI to non-overlapping frequency resources. When a PRB bundling size is determined to be wideband, the UE performs reception by applying the first TCI state to first ceil(N/2) RBs and the second TCI state to the remaining floor(N/2) RBs, where N is the number of RBs indicated in the frequency domain resource allocation field. Herein, ceil(.) and floor(.) are operators indicating rounding up and rounding down to the nearest tenth. When the PRB bundling size is determined to be 2 or 4, reception is performed by applying the first TCI state to PRGs at even places while applying the second TCI state to PRGs at odd places.

In one example, multi-TRP FDM scheme B indicates a multi-TRP based frequency resource division PDSCH repetitive transmission scheme, which has two PDSCH transmission occasions and may thus repetitively transmit a PDSCH on each occasion. In the same way as the multi-TRP FDM scheme A, the multi-TRP FDM scheme B may apply two TCI states indicated through the TCI state field in the DCI to non-overlapping frequency resources. When a PRB bundling size is determined to be wideband, the UE performs reception by applying the first TCI state to first ceil(N/2) RBs and the second TCI state to the remaining floor(N/2) RBs, where N is the number of RBs indicated in the frequency domain resource allocation field. Herein, ceil(.) and floor(.) are operators indicating rounding up and rounding down to the nearest tenth. When the PRB bundling size is determined to be 2 or 4, reception is performed by applying the first TCI state to PRGs at even places while applying the second TCI state to PRGs at odd places.

In one example, multi-TRP TDM scheme A indicates a multi-TRP based time resource division intra-slot PDSCH repetitive transmission scheme. The UE has two PDSCH transmission occasions in one slot, and the first reception occasion may be determined based on a start symbol and symbol length of a PDSCH indicated through a time domain resource allocation field in DCI. A start symbol of the second reception occasion of the PDSCH may be a position after a symbol offset as long as higher layer signaling StartingSymbolOffsetK from the last symbol of the first transmission occasion, from which a transmission occasion may be determined to be as long as the symbol length indicated. When the higher layer signaling StartingSymbolOffsetK is not configured, the symbol offset may be assumed to be "0."

In one example, multi-TRP TDM scheme B indicates a multi-TRP based time resource division inter-slot PDSCH repetitive transmission scheme. The UE may have one PDSCH transmission occasion in one slot, and may receive repetitive transmission based on a start symbol and symbol length of the same PDSCH for as many slots as repetitionNumber indicated in the time domain resource allocation field in DCI. When repetitionNumber is two, the UE may receive the PDSCH repetitive transmission in first and second slots by applying first and second TCI states, respectively. When repetitionNumber is greater than two, the UE may use different TCI state application schemes depending on which higher layer signaling tciMapping is configured. When tciMapping is configured as cyclicMapping, the first and second TCI states are applied to the first and second PDSCH transmission occasions, respectively, and this TCI state application method is equally applied to the remaining PDSCH transmission occasions. When tciMapping is configured as sequenticalMapping, the first TCI state is applied to the first and second PDSCH transmission occasions and the second TCI state is applied to the third and fourth PDSCH transmission occasions, and this TCI state application method is equally applied to the remaining PDSCH transmission occasions.

Referring to the above description related to PDCCH transmission/reception configuration and transmission beam configuration, current Rel-15 and Rel16 NR do not support PDCCH repetitive transmission, thereby having difficulty in attaining required reliability in a scenario such as URLLC requiring high reliability. In Rel-17 FeMIMO, standardization of a method of enhancing PDCCH reception reliability through PDCCH repetitive transmission is ongoing. As a representative method of repetitive transmission of a PDCCH, there may be a non-single frequency network (non-SFN) method in which control resource sets associated with a plurality of search spaces explicitly associated in higher layer signaling are separated into time or frequency resources through different TRPs for repetitive transmission, and a method in which a plurality of TCI states are configured in one control resource set, which is repetitively transmitted in an SFN scheme.

Among them, in the non-SFN method, different control resource sets may be associated with a plurality of search spaces explicitly associated in higher layer signaling, respectively, or the same control resource set may be associated with all the search spaces. In this case, to associate the different control resource sets respectively, the multi-TRP based PDCCH repetitive transmission method may be considered on the assumption that each control resource set is transmitted at a different TRP. In addition, to associate the same control resource set with all the search spaces, the single-TRP based PDCCH repetitive transmission method may be considered on the assumption that transmission is performed all at the same TRP.

On the other hand, when the PDCCH repetitive transmission is performed in the SFN scheme by activating a plurality of TCI states for one control resource set, an MAC CE that activates two TCI states for one control resource set may be defined (hereinafter, referred to as an enhanced PDCCH TCI state activation MAC-CE) whereas the existing PDCCH TCI state activation MAC CE activates one TCI state for one control resource set. Similar to the existing PDCCH TCI state activation MAC CE, it is also possible for this enhanced PDCCH TCI state activation MAC CE to simultaneously activate the same TCI states for the same control resource set indexes of a plurality of cells. In this case, however, the method of activating two TCI states needs to be constrained depending on which PDCCH repetitive transmission configuration and scheme is used for the control resource set of the index in question. For example, in a case of performing simultaneous activation for the existing MAC CE and the enhanced MAC CE in consideration of constraints that do not allow each control resource set associated with search spaces explicitly associated to have two TCI states, the constraints need to be defined.

For convenience of explanation, a cell, a transmission point, a panel, a beam or/and a transmission direction, which may be identified by a higher layer/L1 parameter such as a TCI state or spatial relation information, or an indicator such as a cell ID, TRP ID, panel ID, etc., will now be collectively called a TRP. Hence, in actual applications, the TRP may be suitably replaced by one of the aforementioned terms.

In the disclosure, the UE may determine whether to apply the cooperative communication in various ways, by e.g., having PDCCH(s) that allocates a PDSCH, to which the cooperative communication is applied, have a particular format, having PDCCH(s) that allocates a PDSCH, to which the cooperative communication is applied, include a particular indicator to indicate whether the cooperative communication is applied, having PDCCH(s) that allocates a PDSCH, to which the cooperative communication is applied, scrambled by a particular RNTI, or assuming application of the cooperative communication in a particular section indicated by a higher layer. For convenience of explanation, receiving the PDSCH to which the cooperative communication is applied based on similar conditions to those as described above will now be referred to as a non-coherent joint transmission (NC-JT) case.

In the following description, higher layer signaling may correspond to at least one or one or more combinations of the following signaling:
MIB (master information block);
SIB (system information block) or SIB X (X=1, 2, . . . );
RRC (radio resource control); and/or
MAC (medium access control) CE (control element).

Furthermore, L1 signaling may correspond to at least one or one or more combinations of the following signaling methods using a physical layer channel or signaling:
PDCCH (physical downlink control channel);
DCI (downlink control information);
UE-specific DCI;
group-common DCI;
common DCI;
scheduling DCI (e.g., DCI used for the purpose of scheduling DL or UL data);
non-scheduling DCI (e.g., DCI used not for scheduling DL or UL data);
PUCCH; and/or
UCI (uplink control information).

First Embodiment: Multi-TRP Based PDCCH Repetitive Transmission Method

In an embodiment of the disclosure, a multi-TRP based PDCCH repetitive transmission method will be described. The multi-TRP based PDCCH repetitive transmission may have many different methods depending on how to apply each TCI state to be applied to transmit a PDCCH at each TRP to the aforementioned various parameters used for PDCCH transmission. For example, the various parameters used for PDCCH transmission to apply different TCI states may include a CCE, a single PDCCH candidate, a PDCCH candidate group (e.g., a set of a plurality of PDCCH candidates), a control resource set, a search space, etc. For the multi-TRP based PDCCH repetitive transmission, a soft combining scheme, a selection scheme, etc., may be considered as a reception method in the UE.

There may be the following five methods for the multi-TRP based PDCCH repetitive transmission, and the BS may configure the UE with at least one of the five methods through higher layer signaling or indicate the at least one of the five methods by L1 signaling or configure or indicate the at least one of the five methods in a combination of higher layer signaling and L1 signaling.

[Method 1-1] Method of Repetitively Transmitting a Plurality of PDCCHs Having the Same Payload The method 1-1 is to repetitively transmit multiple pieces of control information in the same DCI format and with the same payload. Each piece of the control information may indicate information for scheduling a PDSCH to be repetitively transmitted, e.g., {PDSCH #1, PDSCH #2, ..., PDSCH #Y} transmitted repetitively across multiple slots. That each piece of control information repetitively transmitted having the same payload may be said that PDSCH scheduling information of each piece of control information, e.g., the number of PDSCH repetitive transmissions, time domain PDSCH resource allocation information, i.e., slot offset K_0 between the control information and PDSCH #1 and the number of PDSCH symbols, frequency domain PDSCH resource allocation information, DMRS port allocation information, PDSCH-to-HARQ-ACK timing, a PUCCH resource indicator, etc., are all the same. The UE may increase reception reliability for the control information by soft-combining the pieces of control information transmitted repetitively with the same payload.

For the soft combining, the UE needs to know a resource location of the control information to be transmitted repetitively and the number of repetitive transmissions in advance. For this, the BS may indicate time domain, frequency domain and spatial domain resource configurations of the control information to be transmitted repetitively in advance. In the case that the control information is repetitively transmitted in the time domain, the control information may be repetitively transmitted across different CORESETs, across different search space sets in one CORESET, or across different PDCCH monitoring occasions in one CORESET and one search space set. A resource unit (CORESET unit, search space set unit, or PDCCH monitoring occasion unit) for repetitive transmission in the time domain and a resource location for repetitive transmission (e.g., a PDCCH candidate index) may be indicated e.g., by higher layer configuration of the BS. In this case, the number of PDCCH repetitive transmissions and/or a list of TRPs involved in the repetitive transmission and a transmission pattern may be explicitly indicated, and for the explicit indication, higher layer indication or MAC CE/L1 signaling may be used. The list of TRPs may also be indicated in the form of TCI state or QCL assumption as described above.

In the case that the control information is repetitively transmitted in the frequency domain, the control information may be repetitively transmitted across different CORESETs, across different PDCCH candidates in one CORESET, or in each CCE. The resource unit and the resource location for repetitive transmission in the frequency domain may be indicated by higher layer configuration of the BS. Furthermore, the number of repetitive transmissions and/or a list of TRPs involved in the repetitive transmission and a transmission pattern may be explicitly indicated, and for the explicit indication, higher layer indication or MAC CE/L1 signaling may be used. The list of TRPs may also be indicated in the form of TCI state or QCL assumption as described above.

In the case that the control information is repetitively transmitted in the spatial domain, the control information may be repetitively transmitted across different CORESETs, or by configuring two or more TCI states in one CORESET.

In an embodiment of the disclosure, how the BS repetitively transmits a PDCCH will be described. DCI including scheduling information for a PUSCH or a PDSCH in a wireless communication system may be transmitted from the BS to the UE in a PDCCH.

Figure 22:
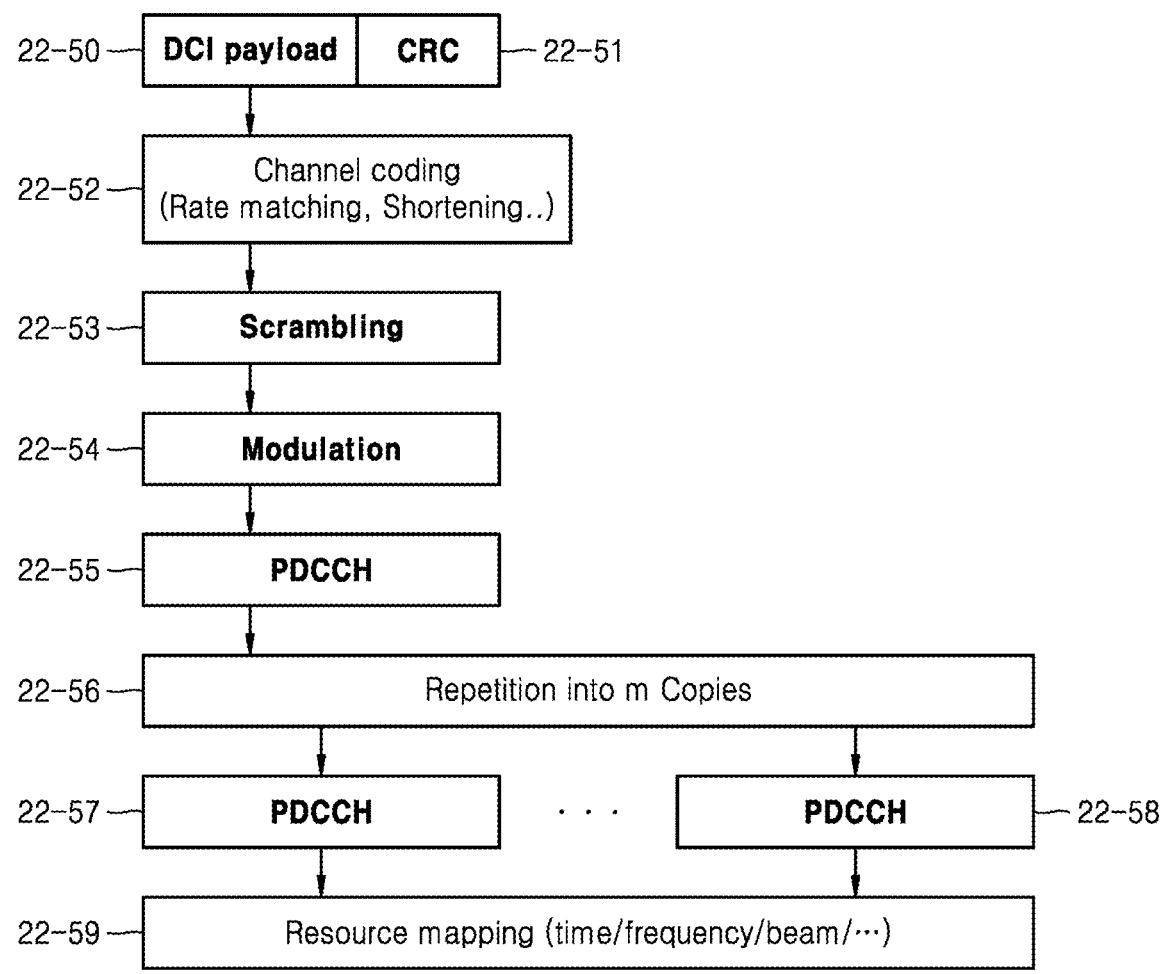
FIG. 22 illustrates a procedure for creating a PDCCH repetitively transmitted through two transmission and reception points (TRPs) according to an embodiment of the present disclosure.

FIG. 22 illustrates a procedure for creating a PDCCH repetitively transmitted through two TRPs according to an embodiment of the present disclosure.

In operation 22-50, the BS may create DCI.

In operation 22-51, the BS may attach CRC to the DCI payload.

In operation 22-52, the BS may perform channel coding on data obtained by attaching CRC to the DCI payload.

The BS may perform scrambling on the channel-coded data in operation 22-53, perform modulation on the scrambled data in operation 22-54, and create a PDCCH in operation 22-55.

Subsequently, the BS may make multiple copies of the PDCCH in operations 22-56 to 22-58, and then transmit the PDCCH using a particular resource (e.g., time, frequency, transmission beams, etc.) in operation 22-59. That is, coded bits for the PDCCH to be repetitively transmitted at the respective TRPs may all be the same. To make the same coded bits, the information value for each DCI field in the PDCCH may also be identically configured. For example, all fields, TDRA, FDRA, TCI, Antenna ports, etc., included in the DCI information may be configured to have the same values. The same values may be generally interpreted as one meaning, but may imply many different (e.g., two) values or may be interpreted as multiple meanings. Related descriptions will now be provided in detail.

For example, as shown in FIG. 22, when the BS repeats transmission of the PDCCH twice, i.e., m=2, the BS may repetitively transmit the PDCCH based on the same or different beams in terms of the spatial domain by mapping the PDCCHs to TRP A and TRP B one on one. In this case, the PDCCH repetitive transmission may be performed based on CORESETs associated respectively with two search spaces explicitly associated with each other in higher layer signaling, in which case the PDCCH repetitive transmission may be performed based on a single TRP when IDs or TCI states of the CORESETs associated with the search spaces are the same and the PDCCH repetitive transmission may be performed based on multiple TRPs when the IDs or TCI states of the CORESETs associated with the search spaces are different. When the BS repeats transmission of the PDCCH four times, the BS may map two PDCCHs to each of TRP A and TRP B, in which case the two PDCCHs for each TRP may be separately transmitted in the time domain. The separate PDCCH repetitive transmission in the time domain may be repeated in a slot based, subslot based or mini-slot based time unit.

It is merely an example and not limited thereto. In the disclosure, the UE and the BS may consider the following methods for the PDCCH repetition:
  PDCCH repetition in terms of the time/frequency/spatial domain in the same slot in the same CORESET;
  PDCCH repetition in terms of the time/frequency/spatial domain in different slots in the same CORESET;
  PDCCH repetition in terms of the time/frequency/spatial domain in the same slot in different CORESETs; and/or
  PDCCH repetition in terms of the time/frequency/spatial domain in different slots in different CORESETs.

Furthermore, when CORESETPoolindex is configured, it may be considered in addition to the CORESET for each CORESETPoolindex. The number of PDCCH repetitions may increase independently, and accordingly, the aforementioned methods may be simultaneously combined and taken into consideration.

The BS may pre-configure the UE with information about which domain is used for the PDCCH repetitive transmission in an RRC message. For example, in the case of PDCCH repetitive transmission in the time domain, the BS may pre-configure the UE with information about which one of the slot based, subslot based, and mini-slot based time units is used for the repetition. In the case of PDCCH repetitive transmission in the frequency domain, the BS may pre-configure the UE with information about which one of CORESET, BWP and component carrier (CC) is used as a basis for the repetition. In the case of PDCCH repetitive transmission in the spatial domain, the BS may pre-configure the UE with information relating to a beam for the PDCCH repetitive transmission through a configuration for each QCL type. Alternatively, the BS may combine the aforementioned pieces of information and transmit the combination to the UE in an RRC message. Accordingly, the BS may repetitively transmit the PDCH according to information pre-configured in an RRC message, and the UE may repetitively receive the PDCCH according to the information pre-configured in the RRC message.

[Method 1-2] Method of Repetitively Transmitting Multiple Pieces of Control Information with Different DCI Formats and/or Payloads Method 1-2 is to repetitively transmit multiple pieces of control information with different DCI format and/or payload. These pieces of control information schedule a PDSCH for repetitive transmission, and each piece of the control information may indicate a different number of repetitive transmissions of the PDSCH. For example, PDCCH #1 may indicate information scheduling {PDSCH #1, PDSCH #2, . . . , PDSCH #Y}, PDCCH #2 may indicate information scheduling {PDSCH #2, . . . , PDSCH #Y}, . . . , and PDCCH #X may indicate information scheduling {PDSCH Y}. This method of repetitively transmitting the control information has an advantage of reducing the total delay time required for control information and PDSCH repetitive transmission as compared to Method 1-1. However, each control information to be repetitively transmitted may have a different payload, so soft combining of pieces of the control information to be repetitively transmitted is not possible, which may lead to reduction in reliability as compared to Method 1-1.

In Method 1-2, there may be no need for the UE to know in advance of a resource location and the number of repetitive transmissions of the control information to be repetitively transmitted, and the UE may separately decode and process each control information repetitively transmitted. When the UE decodes a plurality of pieces of repetitive transmission control information scheduling the same PDSCH, the UE may process the first repetitive transmission control information and discard the subsequent pieces of repetitive transmission control information. Alternatively, the BS may indicate a resource location, the number of repetitive transmissions, etc., of the control information to be repetitively transmitted to the UE in advance, and the indication may be performed in the same method as what is described in Method 1-1.

[Method 1-3] Method of Repetitively Transmitting Each of Multiple Pieces of Control Information with Different DCI Formats and/or Payloads Method 1-3 is to repetitively transmit each of multiple pieces of control information with different DCI formats and/or payloads. Each control information may be repetitively transmitted in the same DCI format and payload. Method 1-2 may have lower reliability than Method 1-1 because it is not possible to soft-combine the multiple pieces of the control information, and Method 1-1 may have a long total delay time required for control information and PDSCH repetitive transmission. Method 1-3 uses advantages of Method 1-1 and Method 1-2, so that the Method 1-3 may transmit control information with high reliability as compared to Method 1-2 while reducing the total delay time required for control information and PDSCH repetitive transmission as compared to Method 1-1.

In Method 1-3, to decode and soft-combine the repetitively transmitted control information, soft-combining of Method 1-1 and individual decoding of Method 1-2 may be used. For example, during repetitive transmission of multiple pieces of control information with different DCI formats and/or payloads, control information transmitted first may be decoded as in Method 1-2 and repetitive transmissions of the decoded control information may be soft-combined as in Method 1-1.

The BS may select and configure one of Method 1-1, Method 1-2 and Method 1-3 for control information repetitive transmission. The control information repetitive transmission method may be explicitly indicated by the BS to the UE through higher layer signaling. Alternatively, the control information repetitive transmission method may be indicated by being combined with other configuration information. For example, indication of the control information repetitive transmission may be combined with an upper layer configuration that indicates a PDSCH repetitive transmission method. When the PDSCH is indicated to be repetitively transmitted in an FDM method, the control information may be interpreted as being repetitively transmitted only in Method 1-1 because the FDM based PDSCH repetitive transmission has no delay time reduction effect according to Method 1-2. For a similar reason, when the PDSCH is indicated to be repetitively transmitted in an intra-slot TDM method, the control information may be interpreted to be repetitively transmitted in Method 1-1. On the other hand, when the PDSCH is indicated to be repetitively transmitted in a multiple inter-slot TDM method, the aforementioned Method 1-1, Method 1-2 or Method 1-3 for control information repetitive transmission may be selected by higher layer signaling or L1 signaling.

The BS may explicitly indicate a control information repetitive transmission unit to the UE through e.g., a higher layer configuration. Alternatively, the control information repetitive transmission unit may be indicated by being combined with other configuration information. For example, the control information repetitive transmission unit may be combined with an upper layer configuration that indicates a PDSCH repetitive transmission method. When the PDSCH is indicated to be repetitively transmitted in the FDM method, the control information may be interpreted as being repetitively transmitted in FDM or SDM, because repetitive transmission of the control information as in such a multiple inter-slot TDM method, the delay time reduction effect due to PDSCH repetitive transmission in the FDM method is not attained. For a similar reason, when the PDSCH is indicated to be repetitively transmitted in an intra-slot TDM method, the control information may be interpreted as being repetitively transmitted in intra-slot TDM, FDM or SDM. On the other hand, when the PDSCH is indicated to be repetitively transmitted in multiple inter-slot TDM method, multiple inter-slot TDM, intra-slot TDM, FDM, or SDM may be selected by higher layer signaling to repetitively transmit the control information.

[Method 1-4] PDCCH Transmission Method in which Each TCI State is Applied to a Different CCEs in One PDCCH Candidate/Candidate Group In Method 1-4, the BS may transmit a PDCCH candidate/candidate group to the UE by applying different TCI states, which mean transmissions from multiple TRPs, to different CCEs in each PDCCH candidate/candidate group to improve PDCCH reception performance without PDCCH repetitive transmission. This method may be a method of obtaining spatial diversity in each PDCCH candidate/candidate group because a different CCE in each PDCCH candidate/candidate group is transmitted by applying a different TCI state at each TRP. Different CCEs to which different TCI states are applied may be separated into time or frequency resources, and the UE needs to know in advance of resource locations in which to apply different TCI states. The UE may receive a PDCCH candidate group including different CCEs to which different TCI states are applied in the PDCCH candidate group, and decode the received PDCCH candidates/candidate groups separately or all at once.

For example, when there are first and second PDCCH candidates, and the first PDCCH candidate includes first and second CCEs and the second PDCCH candidate includes third and fourth CCEs, the BS may apply first and second TCI states to the first and second CCEs, respectively, and apply first and second TCI states to the third and fourth CCEs, respectively.

[Method 1-5] PDCCH Transmission Method in which a Plurality of TCI States are Applied to all CCEs in the Same PDCCH Candidate/Candidate Group In Method 1-5, the BS may transmit a PDCCH candidate/candidate group in the SFN method by applying a plurality of TCI states to each of all CCEs in each PDCCH candidate/candidate group to improve PDCCH reception performance without PDCCH repetitive transmission. This method is not PDCCH repetitive transmission but may be a method of obtaining spatial diversity through SFN transmission at the same CCE location in each PDCCH candidate group. The UE may receive a PDCCH candidate/candidate group including CCEs to which different TCI states are applied in the PDCCH candidate/candidate group, and decode the received PDCCH candidates/candidate groups by using some or all of the plurality of TCI states separately or all at once.

For example, when there are first and second PDCCH candidates, and the first PDCCH candidate includes first and second CCEs and the second PDCCH candidate includes third and fourth CCEs, the BS may apply both the first and second TCI states to each of the first to fourth CCEs.

Second Embodiment: Soft-Combining Related UE Capability Report in PDCCH Repetitive Transmission The UE may report UE capability related to soft combining in PDCCH repetitive transmission to the BS, which may be performed in several methods. The methods may be described in detail as follows:

[UE capability reporting method 1] UE may report, to the BS, UE capability in the form of "enabled" or "disabled" only for soft combining in PDCCH repetitive transmission.

For example, when the UE reports information indicating that soft combining is enabled in PDCCH repetitive transmission to the BS in the UE capability, the BS may determine whether the soft combining of the UE is enabled as flexibly as possible (e.g., determine that the UE is able to perform soft combining at an LLR level) and notify a PDCCH repetitive transmission related configuration to the UE with maximum flexibility during the PDCCH transmission related configuration. In this case, as an example of PDCCH repetitive configuration, the BS may assume that soft combining between CORESETs or search spaces with different configurations, soft combining between PDCCH candidates at the same aggregation level, or soft combining between PDCCH candidates with different aggregation levels is enabled in the UE, and notify the corresponding configuration to the UE.

In another example, when the UE reports information indicating that soft combining is enabled in PDCCH repetitive transmission to the BS in the UE capability, the BS may make the most conservative decision on the level of soft combining enabled in the UE (e.g., determine that soft combining at an OFDM symbol level is enabled in the UE), and notify a PDCCH repetitive transmission related configuration to the UE most restrictedly. In this case, as an example of PDCCH repetitive configuration, the BS may assume that soft combining between a plurality of CORESETs having the same configuration or soft combining between PDCCH candidates with different aggregation levels is enabled in the UE, and notify the corresponding configuration to the UE.

[UE capability reporting method 2] to represent the operation of soft combining enabled in the UE in the UE capability in more detail than the UE capability reporting method 1, the UE may divide possibility of soft combining into different levels and report them in the UE capability to the BS during PDCCH repetitive transmission. Specifically, the UE may determine a signal level at which the UE may apply soft combining for the PDCCH repetitive transmission among respective signal levels occurring from receiving procedures of the UE, and report the information to the BS in the UE capability. For example, the UE may report to the BS that soft combining is enabled at an OFDM symbol level as a signal level at which soft combining is applicable, that soft combining is enabled at a modulation symbol level, or that soft combining is enabled at an LLR level. Based on the signal level reported by the UE, the BS may notify the UE of a suitable configuration allowing the UE to perform soft combining according to the reported UE capability.

[UE capability reporting method 3] UE may inform the BS of constraints in the UE capability required to perform soft combining on the UE side in PDCCH repetitive transmission. For example, the UE may report the BS that configurations of respective CORESETs including two repetitive PDCCHs need to be identical. In another example, the UE may report the BS that two repetitive PDCCH candidates need to at least have the same aggregation level.

[UE capability reporting method 4] when the UE receives PDCCH repetitive transmissions from the BS, the UE may report the BS about which PDCCH repetitive transmission scheme is supported in the UE capability. For example, the UE may report the BS that the UE supports Method 1-5 (SFN transmission method). In another example, the UE may report the BS that the UE supports an intra-slot TDM, inter-slot TDM or FDM scheme in Method 1-1 (method of repetitively transmitting a plurality of PDCCHs having the same payload). For TDM in particular, the UE may report the BS of a maximum value of a time gap between two repetitive PDCCHs. For example, when the UE reports the BS that the maximum value of the time gap between two repetitive PDCCHs has four OFDM symbols, the BS may need to adjust the time gap between the two repetitive PDCCHs to four or less OFDM symbols when performing TDM based PDCCH repetitive transmission to the UE based on the corresponding information.

[UE capability reporting method 5] when the UE receives PDCCH repetitive transmission from the BS, the UE may report the BS about the number of times of blind decoding consumed in the UE capability. For example, the UE may report the BS of the number of times of blind decoding consumed in receiving PDCCH repetitive transmissions as 1, 2, or 3 regardless of a receiving method in the UE (e.g., individual decoding, soft combining, other receiving schemes, or a combination thereof). The BS assumes that the UE is consumed as much as the reported number of times of blind decoding when the UE receives PDCCH repetitive transmissions, and inform the UE of a configuration about a search space and a CORESET not to exceed the maximum number of times of blind decoding that the UE is able to use in a slot or span.

It is possible to combine two or more of the aforementioned UE capability reporting methods for actual application. For example, the UE may simultaneously report the BS that soft combining is enabled at a LLR level according to the UE capability reporting method 2, that two repetitive PDCCH candidates need to have at least the same aggregation level according to the UE capability reporting method 3, and that TDMed PDCCH repetitive transmission is supported and a maximum value of a time gap between two repetitive PDCCHs has four symbols according to the UE capability reporting method 4. There may also be applications based on any combination of other various UE capability reporting methods, but further description thereof will not be provided.

Third Embodiment: Method of Configuring PDCCH Repetitive Transmission and Explicit Association In an embodiment of the disclosure, a PDCCH repetitive transmission method for allowing soft combining in PDCCH repetitive transmission will be described. When the BS performs PDCCH repetitive transmission to the UE based on Method 1-1 (a method of repetitively transmitting a plurality of PDCCHs having the same payload) among various PDCCH repetitive transmission methods, the BS may configure information indicating that there is explicit linkage or association between repetitive PDCCH candidates by higher layer signaling, indicate the information by L1 signaling, or configure and indicate the information through a combination of higher layer signaling and L1 signaling to reduce the number of times of blind decoding taking into account whether soft combining of the UE is enabled. Specifically, there may be various association methods as follows.

There may be the following various configuration methods related to PDCCH repetitive transmission and explicit association by higher layer signaling:

[PDCCH repetitive configuration method 1] when there is configuration information in higher layer signaling PDCCH-config.

The BS may configure PDCCH-repetition-config in higher layer signaling PDCCH-config for PDCCH repetitive transmission and explicit association related configuration for the UE, and PDCCH-repetition-config may include the following information:

PDCCH repetitive transmission scheme: one of TDM, FDM, and SFN;
CORESET-search space combination(s) to be used in PDCCH repetitive transmission;
CORESET index(es): optional;
Search space index(es): optional;
aggregation level(s) for explicit association: optional;
PDCCH candidate index(es) for explicit association: optional; and/or
frequency resource for explicit association: optional.

Based on the above information, the BS may configure the UE with PDCCH repetitive transmission by higher layer signaling. For example, when the PDCCH repetitive transmission scheme is set to SFN, and the CORESET index is set to "1" while the search space index is not set for the CORESET-search space combination to be used in PDCCH repetitive transmission, the UE may expect a PDCCH to be repetitively transmitted in Method 1-5 (SFN transmission scheme) in a CORESET indexed by "1." In this case, the CORESET may be configured with one or multiple TCI states by higher layer signaling, may receive an indication of the one or multiple TCI states by L1 or MAC CE signaling, or may receive configuration and indication of the one or multiple TCI states by a combination of higher layer signaling, L1 signaling and MAC CE signaling. When the PDCCH repetitive transmission scheme is set to SFN, the UE may not expect the search space index to be set in the CORESET-search space combination to be used in PDCCH repetitive transmission.

In another example, when the PDCCH repetitive transmission scheme is set to TDM or FDM and a total of two CORESET-search space combinations to be used in PDCCH repetitive transmission are configured, the first combination having the CORESET index 1 and search space index 1 and the second combination having the CORESET index 2 and search space index 2, the UE may expect a PDCCH to be repetitively transmitted in the TDM or FDM scheme in Method 1-1 by using the two CORESET-search space combinations. In this case, the CORESET may receive configuration of the same or different multiple TCI states by higher layer signaling, may receive an indication of the same or different multiple TCI states by L1 or MAC CE signaling, or may receive configuration and indication of the same or different multiple TCI states by a combination of higher layer signaling, L1 signaling and MAC CE signaling. Furthermore, when the PDCCH repetitive transmission scheme is set to TDM or FDM, the UE may expect up to two CORESET-search space combinations to be configured to be used in PDCCH repetitive transmission and expect both the CORESET and search space indexes to be configured in each combination.

The five information items may be updated on an MAC CE basis without RRC reconfiguration. When the BS does not configure the UE with PDCCH-repetition-config, the UE may expect PDCCH single transmission without expecting PDCCH repetitive transmission. Any of the aforementioned aggregation level for explicit association, PDCCH candidate index, and frequency resources may not be configured or at least one of them may be configured according to an explicit association method as will be described later.

[PDCCH repetitive configuration method 2] when there is configuration information in higher layer signaling for a search space, the BS may add a higher layer signal to searchSpace which is a higher layer signal about a search space for PDCCH repetitive transmission and notify the searchSpace to the UE. For example, a parameter "repetition," which is an additional higher layer signal set to "on" or "off," may be added to higher layer signal searchSpace to indicate whether the search space is used for repetitive transmission. There may be one or two search spaces with "repetition" set to "on" for each BWP.

For example, when "searchSpaceId" is set to "1," "controlResourceSetId" is set to "1" and "repetition" is set to "on" in the higher layer signal "searchSpace" with search space index 1, the UE may expect that PDCCH repetitive transmission is performed according to Method 1-5 (SFN transmission method) in CORESET #1 associated with search space #1.

In another example, when "searchSpaceId" is set to "1," "controlResourceSetId" is set to "1," and "repetition" is set to "on" in higher layer signal "searchSpace" with search space index 1 and "searchSpaceId" is set to "2," "controlResourceSetId" is set to "2," and "repetition" is set to "on" in higher layer signal "searchSpace" with search space index 2, the UE may be aware that PDCCH repetitive transmission is performed in TDM or FDM in Method 1-1 in a combination of CORESET #1 and search space #1 or a combination of CORESET #2 and search space #2.

TDM and FDM may be distinguished by time and frequency settings through higher layer signaling of CORESET #1 or 2 and search space #1 or 2. Furthermore, an aggregation level for explicit association or PDCCH candidate indexes specified in the PDCCH repetitive configuration method 1 may be configured in higher layer signaling for a search space with "repetition" set to "on," or both of them may not be configured according to an explicit association method as will be described at a later time, or either or both of them may be configured.

Fourth Embodiment: Method of Simultaneously Applying PDCCH TCI State Activation MAC CE to Multiple Cells In an embodiment of the disclosure, a method of simultaneously applying a PDCCH TCI state activation MAC CE to multiple cells will be described. In the following embodiment 4-1 and 4-2, a method of simultaneously applying a PDCCH TCI state activation MAC CE to multiple cells and a method of simultaneously applying an enhanced PDCCH TCI state activation MAC CE will be described.

Embodiment 4-1: Method of Simultaneously Applying PDCCH TCI State Activation MAC CE to Multiple Cells In an embodiment of the disclosure, a method of simultaneously applying a PDCCH TCI state activation MAC CE to multiple cells will be described. Table 32 below represents descriptions of respective components in the PDCCH TCI state activation MAC CE as shown in FIG. 9.

When, for serving cell ID in the table 32, a serving cell ID indicated in the MAC CE is included in higher layer signaling "simultaneousTCI-UpdateList1" or "simultaneousTCI-UpdateList2," the UE may simultaneously apply a TCI state ID indicated in the MAC CE to a CORESET index indicated in the MAC CE even for other serving cell ID(s) included in "simultaneousTCI-UpdateList1" or "simultaneousTCI-UpdateList2." For example, when a serving cell ID included in "simultaneousTCI-UpdateList1" is 1 to 4 and a serving cell ID, a CORESET index, and a TCI state ID indicated in the MAC CE are 2, 1, and 0, respectively, the UE may simultaneously activate TCI state ID "0" even for CORESET #1 present in serving cells 1, 3 and 4 through the MAC CE.

Embodiment 4-2: Method of Simultaneously Applying Enhanced PDCCH TCI State Activation MAC CE to Multiple Cells In an embodiment of the disclosure, a method of simultaneously applying an enhanced PDCCH TCI state activation MAC CE to multiple cells will be described.

Figure 23:
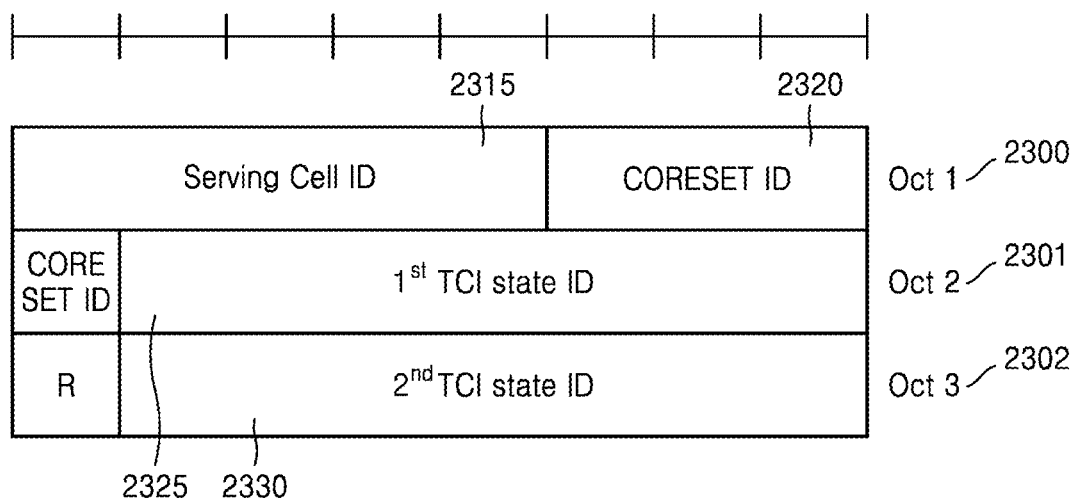
FIG. 23 illustrates an enhanced PDSCH TCI state activation MAC CE according to an embodiment of the present disclosure.

FIG. 23 illustrates an enhanced PDSCH TCI state activation MAC CE, according to an embodiment of the disclosure.

The enhanced PDSCH TCI state activation MAC CE as shown in FIG. 23 is obtained by adding a third octet 2302 to the basic structure of FIG. 9, and it may be seen that a second TCI state ID 2330 is additionally indicated to activate the second TCI state ID 2330 and a first TCI state ID 2325 indicated in the MAC CE for an indicated serving cell ID and a CORESET index.

Similar to the embodiment 4-1, when a serving cell ID indicated in the enhanced PDSCH TCI state activation MAC CE is included in higher layer signaling "simultaneousTCI-UpdateList1-r16" or "simultaneousTCI-UpdateList2-r16," the UE may simultaneously apply the first TCI state ID and the second TCI state ID indicated in the MAC CE to the CORESET index indicated in the MAC CE even for other serving cell ID(s) included in "simultaneousTCI-UpdateList1-r16" or "simultaneousTCI-UpdateList2-r16."

For example, when a serving cell ID included in "simultaneousTCI-UpdateList1-r16" is 1 to 4 and the serving cell ID, the CORESET index, and the first and second TCI state IDs indicated in the MAC CE are 2, 1, 0, and 1, respectively, the UE may simultaneously activate TCI state IDs "0" and "1" even for CORESET #1 present in serving cells 1, 3 and 4 through the MAC CE.

TABLE 32

Serving Cell ID: This field indicates the identity of the Serving Cell for which the MAC CE applies. The length of the field is 5 bits. If the indicated Serving Cell is configured as part of a simultaneousTCI-UpdateList1 or similtaneousTCI-UpdateList2 as specified in TS 38.331 [5], this MAC CE applies to all theServing Cells in the set simultaneousTCI-UpdateList1 or simultaneousTCI-UpdateList2, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

Embodiment 4-3: Method of Simultaneously Applying Enhanced PDCCH TCI State Activation MAC CE to Multiple Cells in Consideration of PDCCH Repetitive Transmission In an embodiment of the disclosure, a method of simultaneously applying an enhanced PDCCH TCI state activation MAC CE to multiple cells in consideration of PDCCH repetitive transmission will be described. As described above, PDCCH repetitive transmission may be performed based on the same or different CORESETs respectively associated with two search spaces explicitly associated based on Method 1-1, or performed based on one CORESET transmitted in the SFN scheme as in Method 1-5.

In the case of Method 1-1 based PDCCH repetitive transmission, each CORESET associated with each search space may constrain activation of two TCI states or require an additional UE capability report and higher layer signaling configuration of the BS to activate two TCI states. A method of simultaneously applying the enhanced PDCCH TCI state activation MAC CE to multiple cells will now be described in detail in the following methods. At least one of the following methods may be dynamically indicated by L1 signaling, semi-statically configured by higher layer signaling, or dynamically indicated or semi-statically configured by a combination of L1 signaling and higher layer signaling.

[Method 4-3-1] Non-Application of Simultaneous Activation of Two TCI States for a Particular CORESET Associated with Search Spaces Explicitly Associated When the UE receives an enhanced PDCCH TCI state activation MAC CE, and there is a serving cell ID indicated in the MAC CE in a cell list configured by higher layer signaling, the UE may not apply simultaneous activation of two TCI states for a CORESET associated with search spaces explicitly associated, among CORESETs corresponding to a CORESET index indicated in the MAC CE to which simultaneous application of two TCI states for all the cells included in the cell list is to be applied.

For example, when serving cell ID 1, CORESET #1, first TCI state ID 1 and second TCI state ID 2 are indicated in an enhanced PDCCH TCI state activation MAC CE, a cell list having the serving cell ID 1 also includes serving cell IDs 2 and 3, and one of CORESETs associated with search spaces explicitly associated is the CORESET #1 present for a serving cell ID 2, the UE may exclude the CORESET #1 present for the serving cell ID 2 from among those to be subject to application of simultaneous activation of two TCI states to multiple cells based on the enhanced PDCCH TCI state activation MAC CE.

[Method 4-3-2] Application of One of Two TCI States to be Simultaneously Activated to a Particular CORESET Associated with Search Spaces Explicitly Associated When the UE receives an enhanced PDCCH TCI state activation MAC CE, and there is a serving cell ID indicated in the MAC CE in a cell list configured by higher layer signaling, the UE may not apply simultaneous activation of two TCI states for a CORESET associated with search spaces explicitly associated, among CORESETs corresponding to a CORESET index indicated in the MAC CE to which simultaneous application of two TCI states for all the cells included in the cell list is to be applied, but may activate only one of the TCI states indicated in the MAC-CE. In this case, the activated TCI state may correspond to the first TCI state ID or the second TCI state ID, or correspond to the lower or the higher of the two indicated TCI state IDs. This activation method may be applied to either occasion when CORESETs associated with search spaces explicitly associated are the same or different from each other.

For example, when serving cell ID 1, CORESET #1, first TCI state ID 1 and second TCI state ID 2 are indicated in an enhanced PDCCH TCI state activation MAC CE, a cell list having the serving cell ID 1 also includes serving cell IDs 2 and 3, and one of CORESETs associated with search spaces explicitly associated is the CORESET #1 present for a serving cell ID 2, the UE may activate only the TCI state #1 having the first TCI state ID for the CORESET #1 present for the serving cell ID 2 among those to be subject to application of simultaneous activation of two TCI states to multiple cells based on the enhanced PDCCH TCI state activation MAC CE.

[Method 4-3-3] Application of Two TCI States to be Simultaneously Activated to all CORESETs Associated with Search Spaces Explicitly Associated When the UE receives an enhanced PDCCH TCI state activation MAC CE, and a serving cell ID indicated in the MAC CE is on a cell list configured by higher layer signaling, in which case there is one search space associated with a particular CORESET among CORESETs corresponding to CORESET index N indicated in the MAC CE, to which simultaneous activation of two TCI states for all the cells included in the cell list is applied, among search spaces explicitly associated, and a CORESET associated with another search space among the search spaces explicitly associated does not correspond to the CORESET index indicated in the MAC-CE, e.g., CORESET M, the UE may apply the two TCI states indicated in the MAC CE to CORESETs N and M, respectively.

For example, when serving cell ID 1, CORESET #1, first TCI state ID 1 and second TCI state ID 2 are indicated in an enhanced PDCCH TCI state activation MAC CE, a cell list having the serving cell ID 1 also includes serving cell IDs 2 and 3, and one of CORESETs associated with search spaces explicitly associated is the CORESET #1 present for a serving cell ID 2, the UE may apply activation of the TCI states IDs 1 and 2 indicated in the enhanced PDCCH TCI state activation MAC CE to the CORESETs #1 and #2, respectively, the CORESETs #1 and #2 being associated with search spaces 1 and 2 explicitly associated. That is, TCI state ID 1 may be activated for CORESET #1 and TCI state ID 2 may be activated for CORESET #2.

For example, serving cell ID 1 is included in the cell list that may have a serving cell ID 2. Furthermore, there may be search spaces #1 and #2 explicitly associated with each other in the serving cell ID 2, and the search spaces #1 and #2 may be associated with the CORESETs #1 and #2, respectively. In this case, when the BS indicates serving cell ID 1, CORESET #1, TCI state ID 1 for the first TCI state and TCI state ID 2 for the second TCI state to the UE in the enhanced PDDCH TCI state activation MAC CE, the UE may consider simultaneous activation of TCI state even for CORESET #1 present for serving cell ID 2 to apply simultaneous activation of TCI state for all serving cells included in the cell list. As described above, after receiving the MAC CE, the UE may not activate two TCI states for the CORESET #1 in the serving cell ID 2 but may activate TCI state ID 1 and TCI state ID 2 for CORESET #1 and CORESET #2 in the serving cell ID 2, respectively.

[Method 4-3-4] determination of whether to release explicit association after application of two TCI states during simultaneous activated of two TCI states to a particular CORESET associated with search spaces explicitly associated.

When the UE receives an enhanced PDCCH TCI state activation MAC CE, and there is a serving cell ID indicated in the MAC CE in a cell list configured by higher layer signaling, the UE may apply simultaneous activation of two TCI states for a CORESET associated with search spaces explicitly associated, among CORESETs corresponding to a CORESET index indicated in the MAC CE to which simultaneous application of two TCI states for all the cells included in the cell list is to be applied. This activation method may be applied to either occasion when CORESETs associated with search spaces explicitly associated are the same or different from each other. Furthermore, when two TCI states are activated for at least one of CORESETs associated with search spaces explicitly associated, signaling to release explicit association between two search spaces may be used by using the MAC-CE indication. The BS may indicate whether to release the explicit association by using a reserved bit field R in a third octet 2302 of the enhanced PDCCH TCI state activation MAC CE as shown in FIG. 23 (R=1 means an indication of release of explicit association and R=0 means no indication of release of explicit association), or semi-statically configure the UE with whether to release the explicit association by higher layer signaling.

For example, when serving cell ID 1, CORESET #1, first TCI state ID 1 and second TCI state ID 2 are indicated in an enhanced PDCCH TCI state activation MAC CE, a cell list having the serving cell ID 1 also includes serving cell IDs 2 and 3, one of CORESETs associated with search spaces explicitly associated is the CORESET #1 present for a serving cell ID 2 and CORESET #1 is associated with both search space #1 and search space #2 explicitly associated, the UE may activate both the two TCI state IDs 1 and 2 for the CORESET #1 present for the serving cell ID 2 among those to be subject to application of simultaneous activation of two TCI states to multiple cells based on the enhanced PDCCH TCI state activation MAC CE, and release explicit association between the search spaces 1 and 2 according to whether to release explicit association based on the MAC CE or higher layer signaling.

For example, serving cell ID 1 is included in the cell list that may have a serving cell ID 2. Furthermore, there may be search spaces 1 and 2 explicitly associated with each other in the serving cell ID 2, and both the search spaces #1 and #2 may be associated with the CORESET #1. In this case, when the BS indicates serving cell ID 1, CORESET #1, TCI state ID 1 for the first TCI state and TCI state ID 2 for the second TCI state to the UE in the enhanced PDDCH TCI state activation MAC CE, the UE may consider simultaneous activation of TCI state even for CORESET #1 present for serving cell ID 2 to apply simultaneous activation of TCI state for all serving cells included in the cell list. As described above, after receiving the MAC CE, the UE may activate two TCI states for CORESET #1 in serving cell ID 2, and release explicit association between search spaces #1 and #2 according to whether to release explicit association based on the MAC CE or higher layer signaling.

Similar to the above example, even for an occasion when different CORESETs are associated with search spaces explicitly associated, respectively (e.g., when CORESETs #1 and #2 are associated with search spaces #1 and #2 explicitly associated, respectively), both the two TCI state IDs 1 and 2 may be activated for CORESET #1 present for serving cell ID 2 among those to be subject to application of simultaneous activation of two TCI states for multiple cells based on the enhanced PDCCH TCI state activation MAC CE, and release explicit association between search spaces #1 and #2 according to whether to release explicit association based on the MAC CE or higher layer signaling.

The cell list as mentioned in Method 4-3-1 to Method 4-3-4 may be differently represented according to higher layer signaling configurations and conditions.

[Configuration and condition 4-3-1] the cell list as described in Method 4-3-1 to Method 4-3-4 refers to higher layer signaling "simultaneousTCI-UpdateList1-r16" or "simultaneousTCI-UpdateList2-r16," Method 4-3-1 to Method 4-3-4 may be applied to all serving cell IDs included in the cell list, and an extra cell list for simultaneous application to multiple cells based on the enhanced PDCCH TCI state activation MAC CE is not configured by higher layer signaling.

[Configuration and condition 4-3-2] the cell list as described in Method 4-3-1 to Method 4-3-4 does not refer to higher layer signaling "simultaneousTCI-UpdateList1-r16" or "simultaneousTCI-UpdateList2-r16," but may refer to "simultaneousTCI-UpdateList1-r17" or "simultaneousTCI-UpdateList12-r17" configured by higher layer signaling as an extra cell list for simultaneous application to multiple cells based on the enhanced PDCCH TCI state activation MAC CE.

Furthermore, as Method 4-3-1 to Method 4-3-4 may be applied to all CORESETs corresponding to CORESET IDs indicated in the MAC-CE in all serving cell IDs included in the cell list including the serving cell ID indicated in the enhanced PDCCH TCI state activation MAC CE, a particular CORESET may be subject to simultaneous activation of two TCI states as the serving cell ID for which there is the CORESET is directly indicated in the MAC CE, and another CORESET may be indirectly subject to simultaneous activation of two TCI states for the reason that the serving cell ID for which the CORESET is present is included in the cell list even though the serving cell ID is not directly indicated in the MAC CE. As described above, depending on the situation of being directly or indirectly subject to TCI state activation, Method 4-3-1 to Method 4-3-4 may be applied differently. For example, in the case of being directly subject to TCI state activation, activation of two TCI states may be performed according to Method 4-3-4, and when a search space associated with the CORESET is one of search spaces explicitly associated, a method of releasing the explicit association between the search space pair may be applied, and in the case of being indirectly subject to TCI state activation, activation of two TCI states may not be applied when a search space associated with the CORESET is one of search spaces explicitly associated according to Method 4-3-1.

Embodiment 4-4: UE Capability Reporting Method

In an embodiment of the disclosure, a UE capability reporting method for simultaneously applying an enhanced PDCCH TCI state activation MAC CE to multiple cells in consideration of PDCCH repetitive transmission will be described. The UE may report, to the BS, UE capability for simultaneously applying an enhanced PDCCH TCI state activation MAC CE to multiple cells in consideration of PDCCH repetitive transmission by using at least one of the following methods:

1) the UE may report whether to enable simultaneous application of the enhanced PDCCH TCI state activation MAC CE to multiple cells to the BS in the UE capability;
2) the UE may report whether there is a need to configure an extra cell list for simultaneous application of the enhanced PDCCH TCI state activation MAC CE to multiple cells to the BS in the UE capability;

3) the UE may report whether one of Method 4-3-1 to Method 4-3-4 is supported to the BS in the UE capability; And/or 4) the UE may report whether different methods of Method 4-3-1 to Method 4-3-4 are supported in an occasion of being directly and indirectly subject to simultaneous application of the enhanced PDCCH TCI state activation MAC CE as described above, in the UE capability.

Figure 24A:
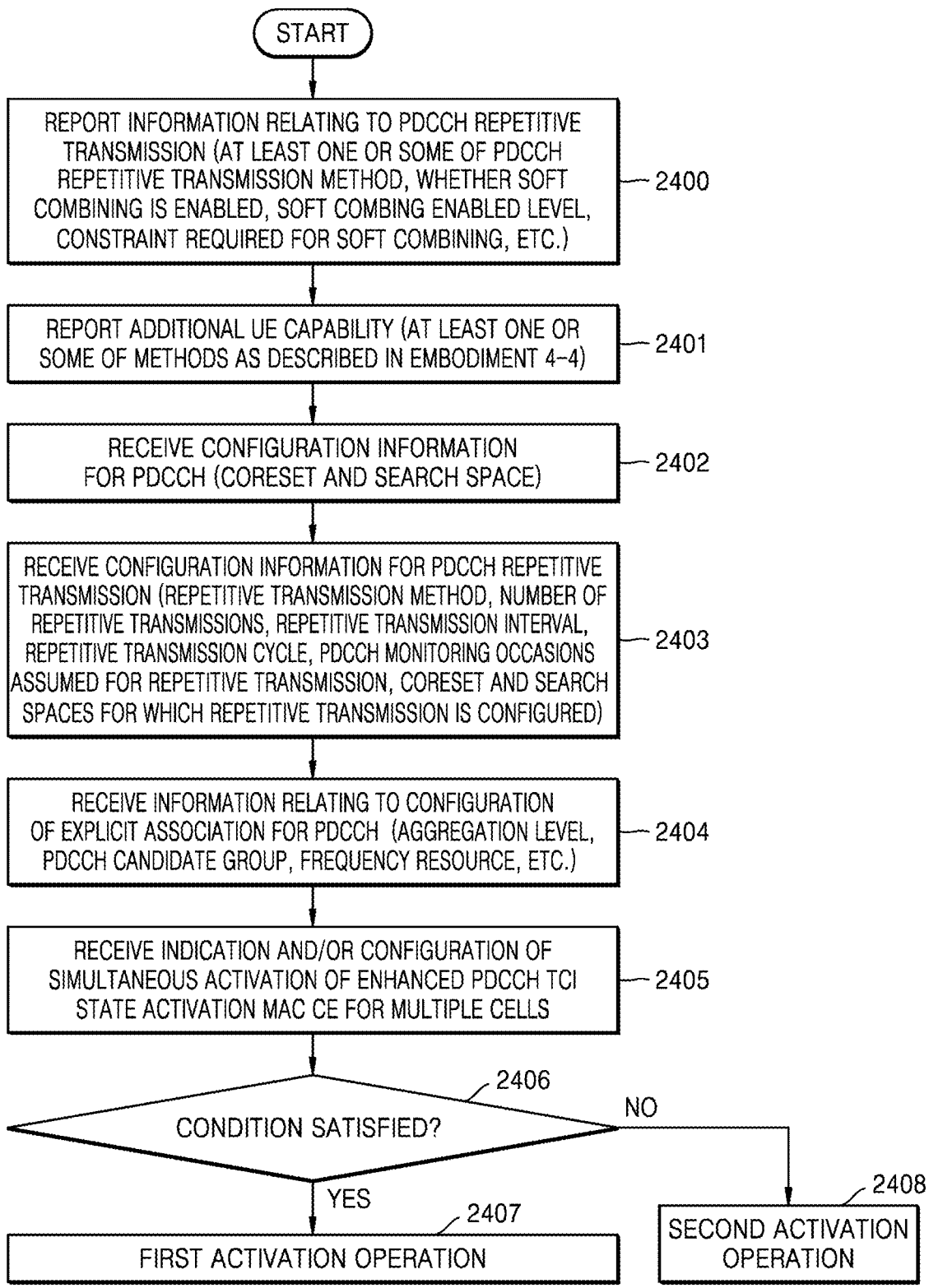
FIG. 24A is a flowchart of UE operations illustrating a procedure for simultaneously applying an enhanced PDCCH TCI state activation MAC CE for multiple cells in consideration of PDCCH repetitive transmission according to an embodiment of the present disclosure.

FIG. 24A is a flowchart of UE operations illustrating a procedure for simultaneously applying an enhanced PDCCH TCI state activation MAC CE to multiple cells in consideration of PDCCH repetitive transmissions according to an embodiment of the present disclosure.

In operation 2400, the UE may report information relating to PDCCH repetitive transmission (e.g., at least one or some of a PDCCH repetitive transmission method, whether soft combining is enabled, a soft combing enabled level, a constraint required for soft combining, etc.) to the BS in the UE capability.

In operation 2401, the UE may report the UE capability related to simultaneous application of the enhanced PDCCH TCI state activation MAC CE to multiple cells in consideration of PDCCH repetitive transmission (e.g., at least one or some of UE capabilities as described in the embodiment 4-4) to the BS.

In operation 2402, the UE may receive configuration information for a PDCCH (e.g., configuration information for CORESET and search space) from the BS.

In operation 2403, the UE may receive additional configuration information for PDCCH repetitive transmission (e.g., a repetitive transmission method, the number of repetitive transmissions, a repetitive transmission interval, a repetitive transmission cycle, PDCCH monitoring occasions assumed for repetitive transmission, CORESETs and search spaces for which repetitive transmission is configured, etc.) from the BS.

In operation 2404, the UE may receive additional information relating to configuration of explicit association in PDCCH repetitive transmission (e.g., an aggregation level, a PDCCH candidate group, a frequency resource, etc.) from the BS.

In operation 2405, the UE may receive information about a method of simultaneous activation of the enhanced PDCCH TCI state activation MAC CE for multiple cells from the BS by L1 signaling, higher layer signaling, or a combination of L1 signaling and higher layer signaling. This may be a combination of three methods: at least one of Method 4-3-1 to Method 4-3-4, one of the configuration and condition 1 and the configuration and condition 2, and a method of applying a different one of Method 4-3-1 to Method 4-3-4 depending on whether it is the direct subject or the indirect subject.

Subsequently, in operation 2406, the UE may determine whether the UE has received an indication to simultaneously activate the enhanced PDCCH TCI state activation MAC CE for multiple cells from the BS and determine whether the indication is applied to one of CORESETs associated with search spaces explicitly associated.

When the UE has received the indication to simultaneously activate the enhanced PDCCH TCI state activation MAC CE for multiple cells from the BS and the indication is applied to one of the CORESETs associated with the search spaces explicitly associated in operation 2406), the UE may perform a first activation operation in operation 2407. The first activation operation may be changed depending on a combination of three methods: at least one of Method 4-3-1 to Method 4-3-4, one of the configuration and condition 4-3-1 and the configuration and condition 4-3-2, and a method of applying a different one of Method 4-3-1 to Method 4-3-4 depending on whether it is the direct subject or the indirect subject.

When the UE has received the indication to simultaneously activate the enhanced PDCCH TCI state activation MAC CE for multiple cells from the BS but the indication is not applied to one of the CORESETs associated with the search spaces explicitly associated in operation 2406, the UE may perform a second activation operation in operation 2408. The second activation operation may refer to an operation of activating two TCI states indicated in the MAC CE for a CORESET indicated in the MAC CE for all the cells present in a serving cell ID or present in a cell list including the serving cell ID indicated in the MAC CE.

Figure 24B:
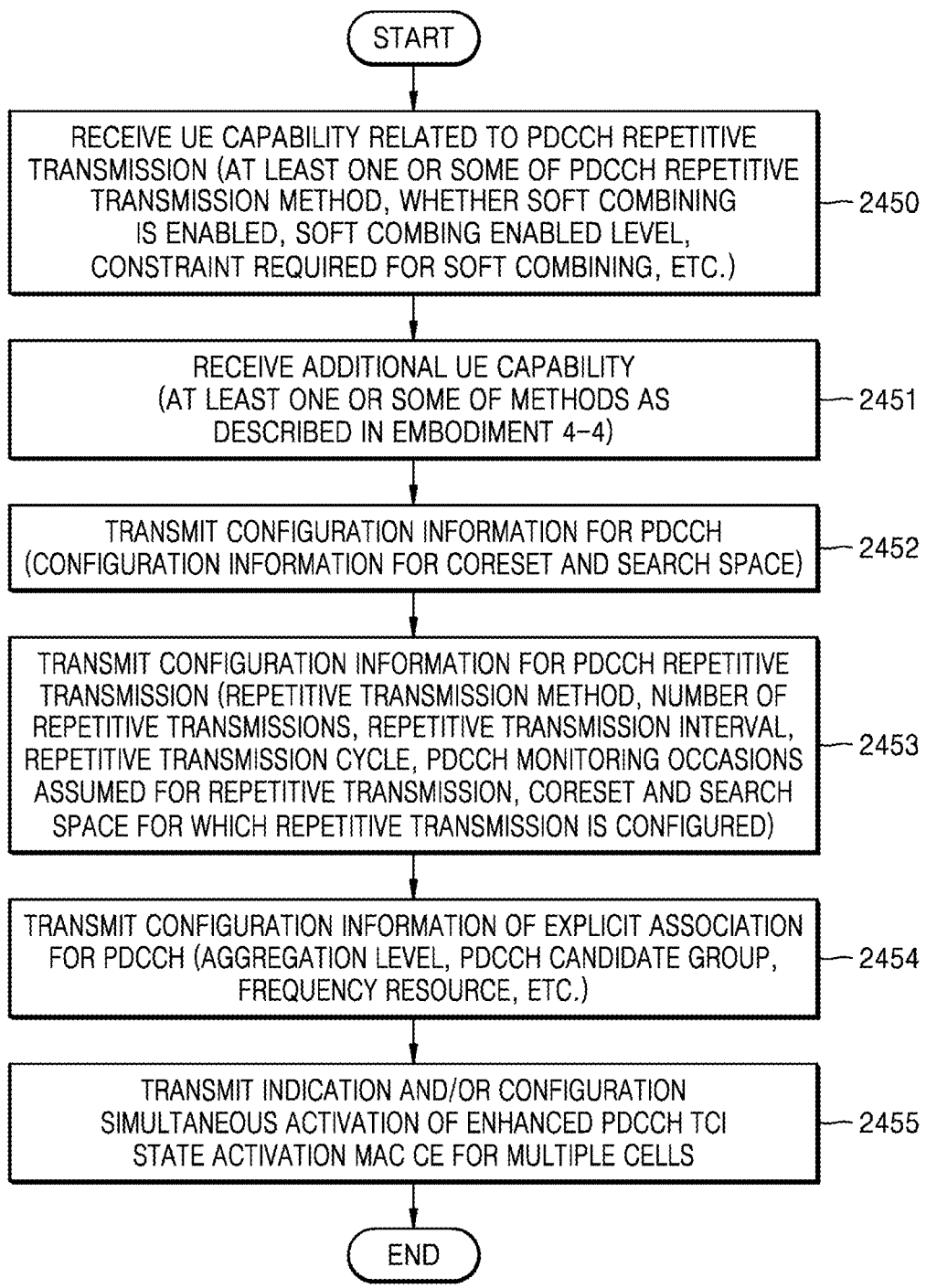
FIG. 24B is a flowchart of BS operations illustrating a procedure for simultaneously applying an enhanced PDCCH TCI state activation MAC CE for multiple cells in consideration of PDCCH repetitive transmission according to an embodiment of the present disclosure.

FIG. 24B is a flowchart of BS operations illustrating a procedure for simultaneously applying an enhanced PDCCH TCI state activation MAC CE for multiple cells in consideration of PDCCH repetitive transmission according to an embodiment of the present disclosure.

In operation 2450, the BS may receive information relating to PDCCH repetitive transmission (e.g., at least one or some of a PDCCH repetitive transmission method, whether soft combining is enabled, a soft combing enabled level, a constraint required for soft combining, etc.) from the UE in the UE capability.

In operation 2451, the BS may receive UE capability related to simultaneous application of the enhanced PDCCH TCI state activation MAC CE to multiple cells in consideration of PDCCH repetitive transmission (e.g., at least one or some of UE capabilities as described in the embodiment 4-4) from the UE.

In operation 2452, the BS may receive the UE capability and transmit configuration information for a PDCCH (e.g., configuration information for CORESET and search space) to the UE, and in operation 2453, the BS may transmit additional configuration information for PDCCH repetitive transmission (e.g., a repetitive transmission method, the number of repetitive transmissions, a repetitive transmission interval, a repetitive transmission cycle, PDCCH monitoring occasions assumed for repetitive transmission, CORESETs and search spaces for which repetitive transmission is configured, etc.) to the UE.

In operation 2454, the BS may transmit additional information relating to configuration of explicit association in PDCCH repetitive transmission (e.g., an aggregation level, a PDCCH candidate group, a frequency resource, etc.) to the UE.

Figure 25:
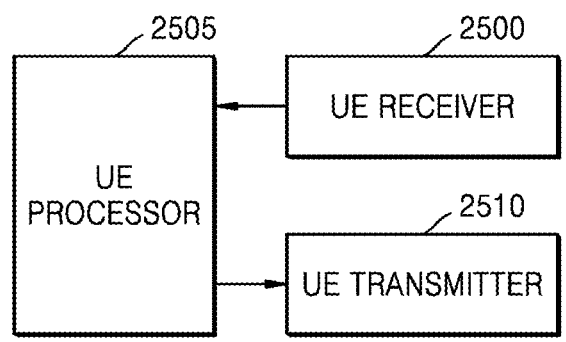
FIG. 25 is a block diagram of a UE in a wireless communication system according to an embodiment of the present disclosure.

In operation 2455, the BS may indicate a method of simultaneous activation of the enhanced PDCCH TCI state activation MAC CE for multiple cells to the UE by L1 signaling, configure the method by higher layer signaling, or indicate and configure the method by a combination of L1 signaling and higher layer signaling. This may be a combination of three methods: at least one of Method 4-3-1 to Method 4-3-4, one of the configuration and condition 4-3-1 and the configuration and condition 4-3-2, and a method of applying a different one of Method 4-3-1 to Method 4-3-4 depending on whether it is the direct subject or the indirect subject. FIG. 25 is a block diagram of a UE in a wireless communication system, according to an embodiment of the disclosure.

Referring to FIG. 25, the UE may include a transceiver including a UE receiver 2500 and a UE transmitter 2510, a memory (not shown), and a UE processor 2505 (or referred to as a UE controller or a processor). The transceiver 2500 and 2510, the memory and the UE processor 2505 of the UE may operate according to the aforementioned communication method of the UE. Components of the UE are not, however, limited thereto. For example, the UE may include more or fewer elements than described above. In addition, the transceiver 2500 and 2510, the memory and the UE processor 2505 may be incorporated in a single chip.

The transceiver may transmit or receive signals to or from a BS. The signals may include control information and data. For this, the transceiver 2500 and 2510 may include an RF transmitter for up-converting the frequency of a signal to be transmitted and amplifying the signal and an RF receiver for low-noise amplifying a received signal and down-converting the frequency of the received signal. It is, however, merely an example of the transceiver 2500 and 2510, and the elements of the transceiver 2500 and 2510 are not limited to the RF transmitter and RF receiver.

In addition, the transceiver 2500 and 2510 may receive a signal on a wireless channel and output the signal to the processor 2505, or transmit a signal output from the processor 2505 on a wireless channel.

The memory may store a program and data required for operation of the UE. Furthermore, the memory may store control information or data included in a signal transmitted or received by the UE. The memory may include a storage medium such as a read only memory (ROM), a random access memory (RAM), a hard disk, a compact disc ROM (CD-ROM), and a digital versatile disc (DVD), or a combination of storage mediums. Moreover, the memory may be in the plural.

The processor 2505 may control a series of processes for the UE to be operated according to the embodiments of the disclosure. For example, the processor 2505 may control the components of the UE so that the UE receives DCI including two layers to receive multiple PDSCHs at the same time. The processor 2505 may be in the plural and may perform operations to control components of the UE by executing the program stored in the memory.

Figure 26:
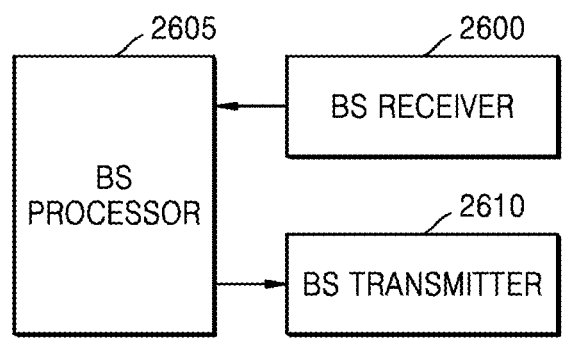
FIG. 26 is a block diagram of a BS in a wireless communication system according to an embodiment of the present disclosure.

FIG. 26 is a block diagram of a BS in a wireless communication system, according to an embodiment of the disclosure.

Referring to FIG. 26, the BS may include a transceiver including a BS receiver 2600 and a BS transmitter 2610, a memory (not shown), and a BS processor 2605 (or referred to as a BS controller or a processor). The transceiver 2600 and 2610, the memory and the BS processor 2605 of the BS may operate according to the aforementioned communication method of the BS. Components of the BS are not, however, limited thereto. For example, the BS may include more or fewer elements than described above. In addition, the transceiver 2600 and 2610, the memory and the processor 2605 may be incorporated in a single chip.

The transceiver may transmit or receive signals to or from a UE. The signals may include control information and data. For this, the transceiver 2600 and 2610 may include an RF transmitter for up-converting the frequency of a signal to be transmitted and amplifying the signal and an RF receiver for low-noise amplifying a received signal and down-converting the frequency of the received signal. It is, however, merely an example of the transceiver 2600 and 2610, and the elements of the transceiver 2600 and 2610 are not limited to the RF transmitter and RF receiver.

In addition, the transceiver 2600 and 2610 may receive a signal on a wireless channel and output the signal to the processor 2605, or transmit a signal output from the processor 2605 on a wireless channel.

The memory may store a program and data required for operation of the BS. Furthermore, the memory may store control information or data included in a signal transmitted or received by the BS. The memory may include a storage medium such as a ROM, a RAM, a hard disk, a CD-ROM, and a DVD, or a combination of storage mediums. Moreover, the memory may be in the plural.

The processor 2605 may control a series of processes for the BS to be operated according to the embodiments of the disclosure. For example, the processor 2605 may control the components of the BS to configure and transmit pieces of DCI of two layers, which include allocation information for multiple PDSCHs. The processor 2605 may be in the plural and may perform operations to control components of the BS by executing the program stored in the memory.

In accordance with an embodiment of the disclosure, a method performed by a terminal in a wireless communication system is disclosed. the method may comprise: receiving, from a base station via a medium access control (MAC) control element (CE), information associated with activation of one or more transmission configuration indication (TCI) states, wherein the information associated with the activation of one or more TCI states indicates a first serving cell identifier (ID), a control resource set (CORESET) index, and one or more TCI state IDs; and in case that the first serving cell ID is included in a list of a plurality of serving cells that are configured to be simultaneously updated for a TCI relation with the MAC CE, activating the one or more TCI state IDs for the CORESET index of each of the first serving cell ID and at least one second serving cell ID included in the list.

In an embodiment, the method may further comprise: receiving, from the base station, configuration information associated with a physical downlink control channel (PDCCH) repetition, wherein the configuration information indicates search spaces configured for the PDCCH repetition and one or more CORESETs corresponding to the search spaces, and wherein the search spaces are explicitly connected.

In an embodiment, the method may further comprise: identifying one or more serving cell IDs other than the first serving cell ID, from among the list of serving cells; and identifying, from among the one or more serving cell IDs, a serving cell ID corresponding to the CORESET index associated with the one or more CORESETs.

In an embodiment, the method may further comprise identifying the at least one second serving cell ID to be activated, by excluding the identified serving cell ID from the one or more serving cell IDs.

In an embodiment, wherein the activating of the one or more TCI state IDs may comprise: activating one among the TCI state IDs for the CORESET index of the identified serving cell ID.

In an embodiment, wherein the activating of the one or more TCI state IDs may comprise: activating the one or more TCI state IDs respectively for the one or more CORESETs of the identified serving cell ID.

In an embodiment, wherein the activation of the one or more TCI state IDs may comprise: activating the one or more TCI state IDs for each of the one or more CORESETs of the identified serving cell ID; receiving, from the base station, information associated with a release of the connection of the search spaces; and releasing the connection of the search spaces, based on the information associated with the release.

In an embodiment, wherein information associated with the list of the plurality of serving cells is received via higher-layer signaling.

In an embodiment, the method may further comprise receiving, from the base station, a reference signal, based on the one or more TCI state IDs.

In accordance with an embodiment of the discourse, a terminal in a wireless communication system is disclosed. The terminal may comprise: a transceiver; and at least one processor coupled to the transceiver and configured to: receive, from a base station via the transceiver, information associated with activation of one or more transmission configuration indication (TCI) states via a medium access control (MAC) control element (CE), wherein the information associated with the activation of one or more TCI states indicates a first serving cell identifier (ID), a control resource set (CORESET) index, and one or more TCI state IDs; and in case that the first serving cell ID is included in a list of a plurality of serving cells that are configured to be simultaneously updated for a TCI relation with the MAC CE, activate the one or more TCI state IDs for the CORESET index of each of the first serving cell ID and at least one second serving cell ID included in the list.

In an embodiment, wherein the at least one processor is further configured to: receive, from the base station via the transceiver, configuration information associated with a physical downlink control channel (PDCCH) repetition, wherein the configuration information indicates search spaces configured for the PDCCH repetition and one or more CORESETs corresponding to the search spaces, and wherein the search spaces are explicitly connected.

In an embodiment, wherein the at least one processor is further configured to: identify one or more serving cell IDs other than the first serving cell ID, from among the list of serving cells; and identify, from among the one or more serving cell IDs, a serving cell ID corresponding to the CORESET index associated with the one or more CORESETs.

In an embodiment, the at least one processor is further configured to: identify the at least one second serving cell ID to be activated, by excluding the identified serving cell ID from the one or more serving cell IDs.

In an embodiment, wherein the at least one processor is further configured to: activate one among the TCI state IDs for the CORESET index of the identified serving cell ID.

In an embodiment, wherein the at least one processor is further configured to: activate the one or more TCI state IDs respectively for the one or more CORESETs of the identified serving cell ID.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. The memory may include a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

The embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments may be operated by being combined with one another if necessary. For example, an embodiment of the disclosure and some of another embodiment of the disclosure may be combined to operate the BS and the UE. For example, an embodiment of the disclosure and some of another embodiment of the disclosure may be combined to operate the BS and the UE. Although the embodiments of the disclosure are provided with respect to an FDD LTE system, modifications of the embodiments of the disclosure based on the technical idea of the above embodiments of the disclosure may also be employed by other systems such as a TDD LTE system, a 5G or NR system, etc.

According to embodiments of the disclosure, a method of simultaneously activating DL control information transmission beams may be provided.

The description order of the method of the disclosure as in the drawings may not exactly correspond to actual execution order, but may be performed reversely or in parallel.

Some of the components shown in the drawings may be omitted within a range that does not deviate the scope of the disclosure.

In the disclosure, a method may be performed by combining some or all of what are described in the respective embodiments of the disclosure within the scope of the disclosure.

Various embodiments of the disclosure have thus far been described. The aforementioned embodiments of the disclosure are merely for illustration, and are not limited thereto. Several embodiments have been described, but a person of ordinary skill in the art will understand and appreciate that various modifications can be made without departing the scope of the disclosure. The scope of the disclosure is defined by the appended claims, and it will be understood by those of ordinary skill in the art that various changes in form and details may be made without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a radio resource control (RRC) message including information indicating a list of serving cells for simultaneous transmission configuration indication TCI) state activation;
   receiving, from the base station, a medium access control (MAC) control element (CE) including a serving cell identifier (ID) field, a control resource set (CORESET) ID field, a reserved field, and a first TCI state ID field and a second TCI state ID field, wherein a length of the serving cell ID field is 5 bits, a length of the CORESET ID field is 4 bits, a length of the reserved field is 1 bit, a length of the first TCI state ID field is 7 bits, and a length of the second TCI state ID field is 7 bits; and
   in case that a serving cell indicated by the serving cell ID field is configured as part of the list of serving cells, applying the MAC CE to all serving cells in the list of serving cells.

2. The method of claim 1, wherein a first TCI state identified by the first TCI state ID field and a second TCI state identified by the second TCI state ID field are applicable to a CORESET identified by the CORESET ID field, and
   wherein in case that the serving cell indicated by the serving cell ID field is configured as part of the list of serving cells, the first TCI state identified by the first TCI state ID field and the second TCI state identified by the second TCI state ID field are applied to the CORESET, for all serving cells in the list of serving cells.

3. The method of claim 2, further comprising:
   transmitting, to the base station, capability information indicating whether the terminal supports simultaneous activation of the first TCI state and the second TCI state for the CORESET to the serving cells.

4. The method of claim 1, wherein the list of serving cells includes a simultaneousTCI-UpdateList1 or a simultaneousTCI-UpdateList2.

5. The method of claim 4, wherein in case that the serving cell is configured as part of the simultaneousTCI-UpdateList1, the MAC CE is applied to first serving cells in the simultaneousTCI-UpdateList1.

6. The method of claim 4, wherein in case that the serving cell is configured as part of the simultaneousTCI-UpdateList2, the MAC CE is applied to second serving cells in the simultaneousTCI-UpdateList2.

7. A method performed by a base station in a wireless communication system, the method comprising:
   transmitting, to a terminal, a radio resource control (RRC) message including information indicating a list of serving cells for simultaneous transmission configuration indication (TCI) state activation; and
   transmitting, to the terminal, a medium access control (MAC) control element (CE) including a serving cell identifier (ID) field, a control resource set (CORESET) ID field, a reserve field, and a first TCI state ID field and a second TCI state ID field, wherein a length of the serving cell ID field is 5 bits, a length of the CORESET ID field is 4 bits, a length of the reserved field is 1 bit, a length of the first TCI state ID field is 7 bits, and a length of the second TCI state ID field is 7 bits,
   wherein in case that a serving cell indicated by the serving cell ID field is configured as part of the list of serving cells, the MAC CE is applied to all serving cells in the list of serving cells.

8. The method of claim 7, wherein a first TCI state identified by the first TCI state ID field and a second TCI state identified by the second TCI state ID field are applicable to a CORESET identified by the CORESET ID field, and
   wherein in case that the serving cell indicated by the serving cell ID field is configured as part of the list of serving cells, the first TCI state identified by the first TCI state ID field and the second TCI state identified by the second TCI state ID field are applied to the CORESET, for all serving cells in the list of serving cells.

9. The method of claim 8, further comprising:
   receiving, from the terminal, capability information indicating whether the terminal supports simultaneous activation of the first TCI state and the second TCI state for the CORESET to the serving cells.

10. The method of claim 7, wherein the list of serving cells includes a simultaneousTCI-UpdateList1 or a simultaneousTCI-UpdateList2.

11. The method of claim 10, wherein in case that the serving cell is configured as part of the simultaneousTCI-UpdateList1, the MAC CE is applied to first serving cells in the simultaneousTCI-UpdateList1.

12. The method of claim 10, wherein in case that the serving cell is configured as part of the simultaneousTCI-UpdateList2, the MAC CE is applied to second serving cells in the simultaneousTCI-UpdateList2.

13. A terminal in a wireless communication system, the terminal comprising:
   a transceiver; and
   at least one processor coupled with the transceiver and configured to:
      receive, from a base station via the transceiver, a radio resource control (RRC) message including information indicating a list of serving cells for simultaneous transmission configuration indication (TCI) state activation;
      receive, from the base station via the transceiver, a medium access control (MAC) control element (CE) including a serving cell identifier (ID) field, a control resource set (CORESET) ID field, a reserved field, and a first TCI state ID field and a second TCI state ID field, wherein a length of the serving cell ID field is 5 bits, a length of the CORESET ID field is 4 bits, a length of the reserved field is 1 bit, a length of the first TCI state ID field is 7 bits, and a length of the second TCI state ID field is 7 bits; and
      in case that a serving cell indicated by the serving cell ID field is configured as part of the list of serving cells, apply the MAC CE to all serving cells in the list of serving cells.

14. A base station in a wireless communication system, the base station comprising:
   a transceiver; and
   at least one processor coupled with the transceiver and configured to:
      transmit, to a terminal via the transceiver, a radio resource control (RRC) message including information indicating a list of serving cells for simultaneous transmission configuration indication (TCI) state activation, and
      transmit, to the terminal via the transceiver, a medium access control (MAC) control element (CE) including a serving cell identifier (ID) field, a control resource set (CORESET) ID field, a reserved field, and a first TCI state ID field and a second TCI state ID field, wherein a length of the serving cell ID field is 5 bits, a length of the CORESET ID field is 4 bits, a length of the reserved field is 1 bit, a length of the first TCI state ID field is 7 bits, and a length of the second TCI state ID field is 7 bits, wherein in case that a serving cell indicated by the serving cell ID field is configured as part of the list of serving cells, the MAC CE is applied to all serving cells in the list of serving cells.

* * * * *